US008345038B2

(12) United States Patent
Kerofsky

(10) Patent No.: US 8,345,038 B2
(45) Date of Patent: Jan. 1, 2013

(54) METHODS AND SYSTEMS FOR BACKLIGHT MODULATION AND BRIGHTNESS PRESERVATION

(75) Inventor: Louis J. Kerofsky, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1298 days.

(21) Appl. No.: 11/929,796

(22) Filed: Oct. 30, 2007

(65) Prior Publication Data

US 2009/0109232 A1 Apr. 30, 2009

(51) Int. Cl.

| | |
|---|---|
| ***G06F 3/038*** | (2006.01) |
| ***G06F 3/033*** | (2006.01) |
| ***G09G 5/00*** | (2006.01) |
| ***G09G 3/36*** | (2006.01) |
| ***G09G 5/08*** | (2006.01) |
| ***G06T 15/50*** | (2011.01) |
| ***G06T 15/60*** | (2006.01) |
| ***G06K 9/00*** | (2006.01) |
| ***G06K 9/40*** | (2006.01) |

(52) U.S. Cl. .......... 345/214; 345/89; 345/102; 345/158; 345/426; 382/169; 382/263

(58) Field of Classification Search .......... 345/418–689, 345/102

See application file for complete search history.

(56) References Cited

U.S. PATENT DOCUMENTS

| | | | |
|---|---|---|---|
| 4,223,340 | A | 9/1980 | Bingham et al. |
| 4,268,864 | A | 5/1981 | Green |
| 4,399,461 | A | 8/1983 | Powell |
| 4,402,006 | A | 8/1983 | Karlock |
| 4,523,230 | A | 6/1985 | Harlan |
| 4,549,212 | A | 10/1985 | Bayer |
| 4,553,165 | A | 11/1985 | Bayer |
| 4,709,262 | A | 11/1987 | Spieth |
| 4,847,603 | A | 7/1989 | Blanchard |
| 4,962,426 | A | 10/1990 | Naoi et al. |
| 5,025,312 | A | 6/1991 | Faroudja |
| 5,046,834 | A | 9/1991 | Dietrich |
| 5,081,529 | A | 1/1992 | Collette |
| 5,176,224 | A | 1/1993 | Spector |
| 5,235,434 | A | 8/1993 | Wober |
| 5,260,791 | A | 11/1993 | Lubin |
| 5,270,818 | A | 12/1993 | Ottenstein |
| 5,389,978 | A | 2/1995 | Jeong-Hun |
| 5,526,446 | A | 6/1996 | Adelson |
| 5,528,257 | A | 6/1996 | Okumura et al. |

(Continued)

FOREIGN PATENT DOCUMENTS

| | | |
|---|---|---|
| EP | 0841652 | 5/1998 |

(Continued)

OTHER PUBLICATIONS

U.S. Appl. No. 11/293,066—Final Office Action dated Oct. 1, 2010.

(Continued)

*Primary Examiner* — Alexander S Beck
*Assistant Examiner* — Charles V Hicks
(74) *Attorney, Agent, or Firm* — Chernoff, Vilhauer, McClung & Stenzel

(57) ABSTRACT

Elements of the present invention relate to systems and methods for image enhancement for color enhancement, brightness enhancement and/or backlight modulation compensation. Some elements comprise backlight illumination level selection.

16 Claims, 54 Drawing Sheets

U.S. PATENT DOCUMENTS

| | | | | |
|---|---|---|---|---|
| 5,760,760 | A | 6/1998 | Helms | |
| 5,808,697 | A | 9/1998 | Fujimura et al. | |
| 5,857,033 | A | 1/1999 | Kim | |
| 5,920,653 | A | 7/1999 | Silverstein | |
| 5,952,992 | A | 9/1999 | Helms | |
| 5,956,014 | A | 9/1999 | Kuriyama | |
| 6,055,340 | A | 4/2000 | Nagao | |
| 6,075,563 | A | 6/2000 | Hung | |
| 6,275,207 | B1 | 8/2001 | Nitta et al. | |
| 6,278,421 | B1 | 8/2001 | Ishida | |
| 6,285,798 | B1 | 9/2001 | Lee | |
| 6,317,521 | B1 | 11/2001 | Gallagher | |
| 6,335,735 | B1 | 1/2002 | Denda et al. | |
| 6,424,730 | B1 | 7/2002 | Wang et al. | |
| 6,445,835 | B1 | 9/2002 | Qian | |
| 6,507,668 | B1 | 1/2003 | Park | |
| 6,516,100 | B1 | 2/2003 | Qian | |
| 6,546,741 | B2 | 4/2003 | Yun | |
| 6,560,018 | B1 | 5/2003 | Swanson | |
| 6,573,961 | B2 | 6/2003 | Jiang et al. | |
| 6,583,579 | B2 | 6/2003 | Tsumura | |
| 6,593,934 | B1 | 7/2003 | Liaw et al. | |
| 6,594,388 | B1 | 7/2003 | Gindele et al. | |
| 6,600,470 | B1 | 7/2003 | Tsuda | |
| 6,618,042 | B1 | 9/2003 | Powell | |
| 6,618,045 | B1 | 9/2003 | Lin | |
| 6,628,823 | B1 | 9/2003 | Holm | |
| 6,753,835 | B1 | 6/2004 | Sakai | |
| 6,782,137 | B1 | 8/2004 | Avinash | |
| 6,792,160 | B2 * | 9/2004 | Shaw et al. | 382/272 |
| 6,795,063 | B2 | 9/2004 | Endo et al. | |
| 6,809,717 | B2 | 10/2004 | Asao | |
| 6,809,718 | B2 | 10/2004 | Wei et al. | |
| 6,816,141 | B1 | 11/2004 | Fergason | |
| 6,816,156 | B2 | 11/2004 | Sukeno et al. | |
| 6,856,704 | B1 * | 2/2005 | Gallagher et al. | 382/263 |
| 7,006,688 | B2 | 2/2006 | Zaklika et al. | |
| 7,010,160 | B1 | 3/2006 | Yoshida | |
| 7,068,328 | B1 | 6/2006 | Mino | |
| 7,088,388 | B2 | 8/2006 | MacLean et al. | |
| 7,098,927 | B2 | 8/2006 | Daly et al. | |
| 7,142,712 | B2 | 11/2006 | Maruoka et al. | |
| 7,158,686 | B2 | 1/2007 | Gindele | |
| 7,199,776 | B2 | 4/2007 | Ikeda et al. | |
| 7,221,408 | B2 | 5/2007 | Kim | |
| 7,253,814 | B2 | 8/2007 | Kim et al. | |
| 7,287,860 | B2 | 10/2007 | Yoshida et al. | |
| 7,289,154 | B2 | 10/2007 | Gindele | |
| 7,317,439 | B2 | 1/2008 | Hata et al. | |
| 7,330,287 | B2 | 2/2008 | Sharman | |
| 7,352,352 | B2 | 4/2008 | Oh et al. | |
| 7,394,448 | B2 | 7/2008 | Park et al. | |
| 7,403,318 | B2 | 7/2008 | Miyazawa et al. | |
| 7,433,096 | B2 | 10/2008 | Chase et al. | |
| 7,443,377 | B2 | 10/2008 | Kim | |
| 7,532,239 | B2 | 5/2009 | Hayaishi | |
| 7,564,438 | B2 | 7/2009 | Kao et al. | |
| 7,639,220 | B2 | 12/2009 | Yoshida et al. | |
| 7,768,496 | B2 * | 8/2010 | Daly | 345/102 |
| 7,808,478 | B2 * | 10/2010 | Choi et al. | 345/158 |
| 2001/0031084 | A1 | 10/2001 | Cannata et al. | |
| 2002/0008784 | A1 | 1/2002 | Shirata et al. | |
| 2002/0057238 | A1 | 5/2002 | Nitta | |
| 2002/0181797 | A1 | 12/2002 | Young | |
| 2003/0001815 | A1 | 1/2003 | Cui | |
| 2003/0012437 | A1 | 1/2003 | Zaklika et al. | |
| 2003/0021488 | A1 | 1/2003 | Shaw et al. | |
| 2003/0051179 | A1 | 3/2003 | Tsirkel | |
| 2003/0053690 | A1 | 3/2003 | Trifonov | |
| 2003/0058464 | A1 | 3/2003 | Loveridge et al. | |
| 2003/0146919 | A1 | 8/2003 | Kawashima | |
| 2003/0179213 | A1 | 9/2003 | Liu | |
| 2003/0193472 | A1 | 10/2003 | Powell | |
| 2003/0201968 | A1 | 10/2003 | Itoh | |
| 2003/0223634 | A1 | 12/2003 | Gallagher et al. | |
| 2003/0227577 | A1 | 12/2003 | Allen et al. | |
| 2003/0235342 | A1 | 12/2003 | Gindele | |
| 2004/0001184 | A1 | 1/2004 | Gibbons | |
| 2004/0081363 | A1 | 4/2004 | Gindele et al. | |
| 2004/0095531 | A1 | 5/2004 | Jiang et al. | |
| 2004/0113905 | A1 | 6/2004 | Mori et al. | |
| 2004/0113906 | A1 | 6/2004 | Lew | |
| 2004/0119950 | A1 | 6/2004 | Penn | |
| 2004/0130546 | A1 * | 7/2004 | Porikli | 345/423 |
| 2004/0130556 | A1 | 7/2004 | Nokiyama | |
| 2004/0160435 | A1 | 8/2004 | Cui | |
| 2004/0170316 | A1 | 9/2004 | Saquib | |
| 2004/0201562 | A1 | 10/2004 | Funamoto | |
| 2004/0207609 | A1 | 10/2004 | Hata | |
| 2004/0207635 | A1 | 10/2004 | Miller | |
| 2004/0208363 | A1 | 10/2004 | Berge et al. | |
| 2004/0239612 | A1 | 12/2004 | Asao | |
| 2004/0257324 | A1 | 12/2004 | Hsu | |
| 2005/0041034 | A1 * | 2/2005 | Luo et al. | 345/589 |
| 2005/0057484 | A1 | 3/2005 | Diefenbaugh | |
| 2005/0104837 | A1 | 5/2005 | Baik | |
| 2005/0104839 | A1 | 5/2005 | Baik | |
| 2005/0104840 | A1 | 5/2005 | Sohn | |
| 2005/0104841 | A1 | 5/2005 | Sohn et al. | |
| 2005/0117186 | A1 | 6/2005 | Li et al. | |
| 2005/0117798 | A1 | 6/2005 | Patton et al. | |
| 2005/0140616 | A1 | 6/2005 | Sohn et al. | |
| 2005/0140639 | A1 | 6/2005 | Oh et al. | |
| 2005/0147317 | A1 | 7/2005 | Daly et al. | |
| 2005/0152614 | A1 | 7/2005 | Daly et al. | |
| 2005/0184952 | A1 | 8/2005 | Konno | |
| 2005/0195212 | A1 | 9/2005 | Kurumisawa | |
| 2005/0200868 | A1 | 9/2005 | Yoshida | |
| 2005/0212972 | A1 | 9/2005 | Suzuki | |
| 2005/0232482 | A1 | 10/2005 | Ikeda et al. | |
| 2005/0244053 | A1 | 11/2005 | Hayaishi | |
| 2005/0248503 | A1 | 11/2005 | Schobben et al. | |
| 2005/0248593 | A1 | 11/2005 | Feng et al. | |
| 2005/0270265 | A1 | 12/2005 | Plut | |
| 2006/0012987 | A9 | 1/2006 | Ducharme et al. | |
| 2006/0015758 | A1 | 1/2006 | Yoon | |
| 2006/0061563 | A1 | 3/2006 | Fleck | |
| 2006/0072158 | A1 | 4/2006 | Christie | |
| 2006/0077405 | A1 | 4/2006 | Topfer et al. | |
| 2006/0119612 | A1 | 6/2006 | Kerofsky et al. | |
| 2006/0119613 | A1 | 6/2006 | Kerofsky | |
| 2006/0120489 | A1 | 6/2006 | Lee | |
| 2006/0174105 | A1 | 8/2006 | Park | |
| 2006/0209003 | A1 | 9/2006 | Kerofsky | |
| 2006/0209005 | A1 * | 9/2006 | Pedram et al. | 345/102 |
| 2006/0221046 | A1 | 10/2006 | Takashi | |
| 2006/0238827 | A1 | 10/2006 | Ikeda | |
| 2006/0250396 | A1 * | 11/2006 | Anderson | 345/426 |
| 2006/0256840 | A1 | 11/2006 | Alt | |
| 2006/0274026 | A1 | 12/2006 | Kerofsky | |
| 2006/0284822 | A1 | 12/2006 | Kerofsky et al. | |
| 2007/0001997 | A1 | 1/2007 | Kim et al. | |
| 2007/0018951 | A1 | 1/2007 | Nobori et al. | |
| 2007/0067745 | A1 | 3/2007 | Choi et al. | |
| 2007/0092139 | A1 | 4/2007 | Daly | |
| 2007/0097069 | A1 | 5/2007 | Kurokawa | |
| 2007/0103418 | A1 | 5/2007 | Ogino | |
| 2007/0126757 | A1 | 6/2007 | Itoh | |
| 2007/0146236 | A1 | 6/2007 | Kerofsky et al. | |
| 2007/0268524 | A1 | 11/2007 | Nose | |
| 2008/0037867 | A1 | 2/2008 | Lee | |
| 2008/0055228 | A1 | 3/2008 | Glen | |
| 2008/0074372 | A1 | 3/2008 | Baba | |
| 2008/0180373 | A1 | 7/2008 | Mori | |
| 2008/0208551 | A1 | 8/2008 | Kerofsky et al. | |
| 2008/0231581 | A1 | 9/2008 | Fujine | |
| 2008/0238840 | A1 | 10/2008 | Raman et al. | |
| 2009/0002285 | A1 | 1/2009 | Baba | |
| 2009/0015602 | A1 | 1/2009 | Rumreich et al. | |
| 2009/0051714 | A1 | 2/2009 | Ohhara | |
| 2009/0167658 | A1 * | 7/2009 | Yamane et al. | 345/89 |
| 2009/0167673 | A1 | 7/2009 | Kerofsky et al. | |
| 2009/0174636 | A1 | 7/2009 | Kohashikawa et al. | |

FOREIGN PATENT DOCUMENTS

| | | |
|---|---|---|
| EP | 1788550 | 5/2007 |
| JP | 3102579 | 4/1991 |

| | | | |
|---|---|---|---|
| JP | 3284791 | | 12/1991 |
| JP | 8009154 | | 1/1996 |
| JP | 11194317 | | 7/1999 |
| JP | 200056738 | | 2/2000 |
| JP | 2001057650 | | 2/2001 |
| JP | 2001083940 | | 3/2001 |
| JP | 2001086393 | | 3/2001 |
| JP | 2001298631 | | 10/2001 |
| JP | 2001350134 | | 12/2001 |
| JP | 2002189450 | | 7/2002 |
| JP | 2003259383 | | 9/2003 |
| JP | 2003271106 | | 9/2003 |
| JP | 2003316318 | | 11/2003 |
| JP | 2004007076 | | 1/2004 |
| JP | 200445634 | | 2/2004 |
| JP | 2004133577 | | 4/2004 |
| JP | 2004177547 | | 6/2004 |
| JP | 2004272156 | | 9/2004 |
| JP | 2004287420 | | 10/2004 |
| JP | 2005346032 | | 12/2005 |
| JP | 2006042191 | | 2/2006 |
| JP | 2006317757 | | 11/2006 |
| JP | 2007093990 | | 4/2007 |
| JP | 2007212628 | | 8/2007 |
| JP | 2007272023 | | 10/2007 |
| JP | 2007299001 | | 11/2007 |
| JP | 2009109876 | | 5/2009 |
| WO | WO02099557 | | 12/2002 |
| WO | WO2004075155 | | 9/2004 |
| WO | WO2005029459 | | 3/2005 |
| WO | 2006060662 | A2 | 6/2006 |
| WO | 2006060666 | A2 | 6/2006 |

OTHER PUBLICATIONS

U.S. Appl. No. 11/460,768—Non-Final Office Action dated Sep. 3, 2010.
U.S. Appl. No. 11/680,312—Non-Final Office Action dated Sep. 9, 2010.
U.S. Appl. No. 11/948,969—Non-Final Office Action dated Oct. 4, 2010.
U.S. Appl. No. 11/564,203—Non-final Office Action dated Sep. 24, 2009.
U.S. Appl. No. 11/154,052—Non-final Office Action dated Nov. 10, 2009.
U.S. Appl. No. 11/154,054—Final Office Action dated Jun. 24, 2009.
U.S. Appl. No. 11/154,053—Non-final Office Action dated Jul. 23, 2009.
U.S. Appl. No. 11/202,903—Non-final Office Action dated Aug. 7, 2009.
U.S. Appl. No. 11/202,903—Final Office Action dated Dec. 28, 2009.
U.S. Appl. No. 11/224,792—Non-final Office Action dated Nov. 18, 2009.
U.S. Appl. No. 11/371,466—Non-final Office Action dated Dec. 14, 2009.
U.S. Appl. No. 11/154,054—Non-final Office Action dated Jan. 7, 2009.
U.S. Appl. No. 11/293,562—Non-final Office Action dated Jan. 7, 2009.
U.S. Appl. No. 11/154,054—Final Office Action dated Aug. 9, 2010.
U.S. Appl. No. 11/293,562—Final Office Action dated Jul. 8, 2010.
U.S. Appl. No. 11/371,466—Notice of Allowance dated Jul. 13, 2010.
U.S. Appl. No. 11/460,907—Non-Final Office Action dated Aug. 30, 2010.
U.S. Appl. No. 11/564,203—Notice of Allowance dated Apr. 2, 2010.
U.S. Appl. No. 11/154,052—Notice of Allowance dated May 21, 2010.
U.S. Appl. No. 11/154,053—Final Office Action dated Mar. 4, 2010.
U.S. Appl. No. 11/293,066—Non-Final Office Action dated Mar. 2, 2010.
U.S. Appl. No. 11/465,436—Notice of Allowance dated Apr. 20, 2010.
U.S. Appl. No. 11/680,539—Non-Final Office Action dated May 19, 2010.
U.S. Appl. No. 11/224,792—Final Office Action dated Jun. 11, 2010.
Wei-Chung Cheng and Massoud Pedram, "Power Minimization in a Backlit TFT-LCD Display by Concurrent Brightness and Contrast Scaling" IEEE Transactions on Consumer Electronics, Vo. 50, No. 1, Feb. 2004.
Insun Hwang, Cheol Woo Park, Sung Chul Kang and Dong Sik Sakong, "Image Synchronized Brightness Control" SID Symposium Digest 32, 492 (2001).
Inseok Choi, Hojun Shim and Naehyuck Chang, "Low-Power Color TFT LCD Display for Hand-Held Embedded Systems", In ISLPED, 2002.
A. Iranli, H. Fatemi, and M. Pedram, "HEBS: Histogram equalization for backlight scaling," Proc. of Design Automation and Test in Europe, Mar. 2005, pp. 346-351.
Chang, N., Choi, I., and Shim, H. 2004. DLS: dynamic backlight luminance scaling of liquid crystal display. IEEE Trans. Very Large Scale Integr. Syst. 12, 8 (Aug. 2004), 837-846.
S. Pasricha, M Luthra, S. Mohapatra, N. Dutt, N. Venkatasubramanian, "Dynamic Backlight Adaptation for Low Power Handheld Devices," to appear in IEEE Design and Test (IEEE D&T), Special Issue on Embedded Systems for Real Time Embedded Systems, Sep. 2004. 8.
H. Shim, N. Chang, and M. Pedram, "A backlight power management framework for the battery-operated multi-media systems." IEEE Design and Test Magazine, Sep./Oct. 2004, pp. 388-396.
F. Gatti, A. Acquaviva, L. Benini, B. Ricco', "Low-Power Control Techniques for TFT LCD Displays," Compiler, Architectures and Synthesis of Embedded Systems, Oct. 2002.
Ki-Duk Kim, Sung-Ho Baik, Min-Ho Sohn, Jae-Kyung Yoon, Eui-Yeol Oh and In-Jae Chung, "Adaptive Dynamic Image Control for IPS-Mode LCD TV", SID Symposium Digest 35, 1548 (2004).
Raman and Hekstra, "Content Based Contrast Enhancement for Liquid Crystal Displays with Backlight Modulation", IEEE Transactions on Consumer Electronics, vol. 51, No. 1, Feb. 2005.
E.Y. Oh, S. H. Balik, M. H. Sohn, K. D. Kim, H. J. Hong, J.Y. Bang, K.J. Kwon, M.H. Kim, H. Jang, J.K. Yoon and I.J. Chung, "IPS-mode dynamic LCD-TV realization with low black luminance and high contrast by adaptive dynamic image control technology", Journal of the Society for Information Display, Mar. 2005, vol. 13, Issue 3, pp. 181-266.
Fabritus, Grigore, Muang, Loukusa, Mikkonen, "Towards energy aware system design", Online via Nokia (http://www.nokia.com/nokia/0,,53712,00.html).
Choi, I., Kim, H.S., Shin, H. and Chang, N. "LPBP: Low-power basis profile of the Java 2 micro edition" In Proceedings of the 2003 International Symposium on Low Power Electronics and Design (Seoul, Korea, Aug. 2003) ISLPED '03. ACM Press, New York, NY, p. 36-39.
U.S. Appl. No. 11/154,054—Office Action dated Mar. 25, 2008.
U.S. Appl. No. 11/293,066—Office Action dated Jan. 1, 2008.
U.S. Appl. No. 11/371,466—Office Action dated Oct. 5, 2007.
U.S. Appl. No. 11/371,466—Office Action dated Apr. 11, 2008.
International Application No. PCT/US05/043646 International Search Report.
International Application No. PCT/JP08/069815 International Search Report.
International Application No. PCT/JP08/072215 International Search Report.
International Application No. PCT/JP08/073898 International Search Report.
International Application No. PCT/JP08/073146 International Search Report.
International Application No. PCT/JP08/072715 International Search Report.
International Application No. PCT/JP08/073020 International Search Report.
International Application No. PCT/JP08/072001 International Search Report.
International Application No. PCT/JP04/013856 International Search Report.
PCT App. No. PCT/JP08/071909—Invitation to Pay Additional Fees dated Jan. 13, 2009.
U.S. Appl. No. 11/154,052—Office Action dated Apr. 27, 2009.

U.S. Appl. No. 11/154,053—Office Action dated Jan. 26, 2009.
U.S. Appl. No. 11/202,903—Office Action dated Feb. 5, 2009.
U.S. Appl. No. 11/224,792—Office Action dated Apr. 15, 2009.
U.S. Appl. No. 11/293,066—Office Action dated May 16, 2008.
U.S. Appl. No. 11/371,466—Office Action dated Apr. 14, 2009.
International Application No. PCT/JP08/071909 International Search Report.
PCT App. No. PCT/JP08/073020—Replacement Letter dated Apr. 21, 2009.
International Application No. PCT/JP08/064669 International Search Report.
Richard J. Qian, et al, "Image Retrieval Using Blob Histograms", Proceeding of 2000 IEEE International Conference on Multimedia and Expo, vol. 1, Aug. 2, 2000, pp. 125-128.
U.S. Appl. No. 11/154,054—Office Action dated Dec. 30, 2008.
U.S. Appl. No. 11/154,053—Office Action dated Oct. 1, 2008.
U.S. Appl. No. 11/460,940—Notice of Allowance dated Dec. 15, 2008.
U.S. Appl. No. 11/202,903—Office Action dated Oct. 3, 2008.
U.S. Appl. No. 11/224,792—Office Action dated Nov. 10, 2008.
U.S. Appl. No. 11/371,466—Office Action dated Sep. 23, 2008.
PCT App. No. PCT/JP2008/064669—Invitation to Pay Additional Fees dated Sep. 29, 2008.
PCT App. No. PCT/JP2008/069815—Invitation to Pay Additional Fees dated Dec. 5, 2005.
International Application No. PCT/US05/043560 International Search Report.
International Application No. PCT/US05/043560 International Preliminary Examination Report.
International Application No. PCT/US05/043641 International Search Report.
International Application No. PCT/US05/043641 International Preliminary Examination Report.
International Application No. PCT/US05/043647 International Search Report.
International Application No. PCT/US05/043647 International Preliminary Examination Report.
International Application No. PCT/US05/043640 International Search Report.
International Application No. PCT/US05/043640 International Preliminary Examination Report.
International Application No. PCT/US05/043646 International Preliminary Examination Report.
Office Action by Russian Federation Patent Office for Russian App. No. 2010105854, dated Apr. 27, 2011, including English translation, 17 pgs.
Rafal Mantiuk, Scott Daly, Louis Kerofsky, "Display Adaptive Tone Mapping", ACM Transactions on Graphics, Aug. 2008, vol. 27, No. 3, Article 68.
Pierre De Greef and Hendriek Groot Hulze NXP Semiconductors (Founded by Philips) et al: "39.1: Adaptive Dimming and Boosting Backlight for LCD-TV Systems", SID 2007, 2007 SID International Symposium, Society for Information Display, Los Angeles, USA, vol. XXXVIII, May 20, 2007, pp. 1332-1335, XP007013259, ISSN: 0007-966X.
International Application No. PCT/JP2010/064123 International Search Report.
International Application No. PCT/JP2008/072215 European Search Report.
International Application No. PCT/JP2008/0723020 European Search Report.
International Application No. PCT/JP2008/069815 European Search Report.
U.S. Appl. No. 11/293,562—Notice of Allowance dated Dec. 8, 2010.
U.S. Appl. No. 11/224,792—Notice of Allowance dated Feb. 9, 2011.
U.S. Appl. No. 11/964,683—Non-final Office Action dated Dec. 28, 2010.
U.S. Appl. No. 11/154,053—Non-final Office Action dated Mar. 1, 2011.
U.S. Appl. No. 11/202,903—Non-final Office Action dated Mar. 1, 2011.
U.S. Appl. No. 11/964,691—Non-final Office Action dated Mar. 3, 2011.
Japanese Office Action dated Dec. 13, 2011, App. No. 2008-276065, 4 pgs.
Kerofsky et al., "26.2: Distinguished Paper: Brightness Preservation for LCD Backlight Reduction," SID Symposium Digest of Technical Papers, Jun. 2006, vol. 37, Issue 1, pp. 1242-1245.
Kerofsky et al., "Brightness preservation for LCD backlight dimming," Journal of the Society for Information Display, Dec. 2006, vol. 14, Issue 12, pp. 1111-1118.
Qian et al., "Image Retrieval Using Blob Histograms," Proceedings of 2000 IEEE International Conference on Multimedia and Expo, Aug. 2, 2000, pp. 125-128.
Decision on Grant, received Apr. 9, 2012, Russian Patent App. No. 2010105854, Sharp Kabushiki Kaisha, 18 pgs.

* cited by examiner

METHODS AND SYSTEMS FOR BACKLIGHT MODULATION AND BRIGHTNESS PRESERVATION

RELATED REFERENCES

The following applications are hereby incorporated herein by reference: U.S. patent application Ser. No. 11/465,436, entitled "Methods and Systems for Selecting a Display Source Light Illumination Level," filed on Aug. 17, 2006; U.S. patent application Ser. No. 11/293,562, entitled "Methods and Systems for Determining a Display Light Source Adjustment," filed on Dec. 2, 2005; U.S. patent application Ser. No. 11/224,792, entitled "Methods and Systems for Image-Specific Tone Scale Adjustment and Light-Source Control," filed on Sep. 12, 2005; U.S. patent application Ser. No. 11/154,053, entitled "Methods and Systems for Enhancing Display Characteristics with High Frequency Contrast Enhancement," filed on Jun. 15, 2005; U.S. patent application Ser. No. 11/154,054, entitled "Methods and Systems for Enhancing Display Characteristics with Frequency-Specific Gain," filed on Jun. 15, 2005; U.S. patent application Ser. No. 11/154,052, entitled "Methods and Systems for Enhancing Display Characteristics," filed on Jun. 15, 2005; U.S. patent application Ser. No. 11/393,404, entitled "A Color Enhancement Technique using Skin Color Detection," filed 30, 2006; U.S. patent application Ser. No. 11/460,768, entitled "Methods and Systems for Distortion-Related Source Light Management," filed Jul. 28, 2006; U.S. patent application Ser. No. 11/202,903, entitled "Methods and Systems for Independent View Adjustment in Multiple-View Displays," filed Aug. 8, 2005; U.S. patent application Ser. No. 11/371,466, entitled "Methods and Systems for Enhancing Display Characteristics with Ambient Illumination Input," filed Mar. 8, 2006; U.S. patent application Ser. No. 11/293,066, entitled "Methods and Systems for Display Mode Dependent Brightness Preservation," filed Dec. 2, 2005; U.S. patent application Ser. No. 11/460,907, entitled "Methods and Systems for Generating and Applying Image Tone Scale Corrections," filed Jul. 28, 2006; U.S. patent application Ser. No. 11/160,940, entitled "Methods and Systems for Color Preservation with Image Tonescale Corrections," filed Jul. 28, 2006; U.S. patent application Ser. No. 11/564,203, entitled "Methods and Systems for Image Tonescale Adjustment to Compensate for a Reduced Source Light Power Level," filed Nov. 28, 2006; U.S. patent application Ser. No. 11/680,312, entitled "Methods and Systems for Brightness Preservation Using a Smoothed Gain Image," filed Feb. 28, 2007; U.S. patent application Ser. No. 11/845,651, entitled "Methods and Systems for Tone Curve Generation, Selection and Application," filed Aug. 27, 2007; and U.S. patent application Ser. No. 11/605,711, entitled "A Color Enhancement Technique using Skin Color Detection," filed Nov. 28, 2006.

FIELD OF THE INVENTION

Embodiments of the present invention comprise methods and systems for image enhancement. Some embodiments comprise color enhancement techniques, some embodiments comprise brightness preservation, some embodiments comprise brightness enhancement, and some embodiments comprise bit-depth-extension techniques.

BACKGROUND

A typical display device displays an image using a fixed range of luminance levels. For many displays, the luminance range has 256 levels that are uniformly spaced from 0 to 255. Image code values are generally assigned to match these levels directly.

In many electronic devices with large displays, the displays are the primary power consumers. For example, in a laptop computer, the display is likely to consume more power than any of the other components in the system. Many displays with limited power availability, such as those found in battery-powered devices, may use several illumination or brightness levels to help manage power consumption. A system may use a full-power mode when it is plugged into a power source, such as A/C power, and may use a power-save mode when operating on battery power.

In some devices, a display may automatically enter a power-save mode, in which the display illumination is reduced to conserve power. These devices may have multiple power-save modes in which illumination is reduced in a stepwise fashion. Generally, when the display illumination is reduced, image quality drops as well. When the maximum luminance level is reduced, the dynamic range of the display is reduced and image contrast suffers. Therefore, the contrast and other image qualities are reduced during typical power-save mode operation.

Many display devices, such as liquid crystal displays (LCDs) or digital micro-mirror devices (DMDs), use light valves which are backlit, side-lit or front-lit in one way or another. In a backlit light valve display, such as an LCD, a backlight is positioned behind a liquid crystal panel. The backlight radiates light through the LC panel, which modulates the light to register an image. Both luminance and color can be modulated in color displays. The individual LC pixels modulate the amount of light that is transmitted from the backlight and through the LC panel to the user's eyes or some other destination. In some cases, the destination may be a light sensor, such as a coupled-charge device (CCD).

Some displays may also use light emitters to register an image. These displays, such as light emitting diode (LED) displays and plasma displays use picture elements that emit light rather than reflect light from another source.

SUMMARY

Some embodiments of the present invention comprise systems and methods for varying a light-valve-modulated pixel's luminance modulation level to compensate for a reduced light source illumination intensity or to improve the image quality at a fixed light source illumination level.

Some embodiments of the present invention may also be used with displays that use light emitters to register an image. These displays, such as light emitting diode (LED) displays and plasma displays use picture elements that emit light rather than reflect light from another source. Embodiments of the present invention may be used to enhance the image produced by these devices. In these embodiments, the brightness of pixels may be adjusted to enhance the dynamic range of specific image frequency bands, luminance ranges and other image subdivisions.

In some embodiments of the present invention, a display light source may be adjusted to different levels in response to image characteristics. When these light source levels change, the image code values may be adjusted to compensate for the change in brightness or otherwise enhance the image.

Some embodiments of the present invention comprise ambient light sensing that may be used as input in determining light source levels and image pixel values.

Some embodiments of the present invention comprise distortion-related light source and battery consumption control.

Some embodiments of the present invention comprise systems and methods for generating and applying image tone scale corrections.

Some embodiments of the present invention comprise methods and systems for image tone scale correction with improved color fidelity.

Some embodiments of the present invention comprise methods and systems for selecting a display source light illumination level.

Some embodiments of the present invention comprise methods and systems for developing a panel tone curve and a target tone curve. Some of these embodiments provide for development of a plurality of target tone curves with each curve related to a different backlight or source light illumination level. In these embodiments, a backlight illumination level may be selected and the target tone curve related to the selected backlight illumination level may be applied to the image to be displayed. In some embodiments, a performance goal may effect selection of tone curve parameters.

Some embodiments of the present invention comprise methods and systems for color enhancement. Some of these embodiments comprise skin-color detection, skin-color map refinement and color processing.

Some embodiments of the present invention comprise methods and systems for bit-depth extension. Some of these embodiments comprise application of a spatial and temporal high-pass dither pattern to an image prior to a bit-depth reduction.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 38A:
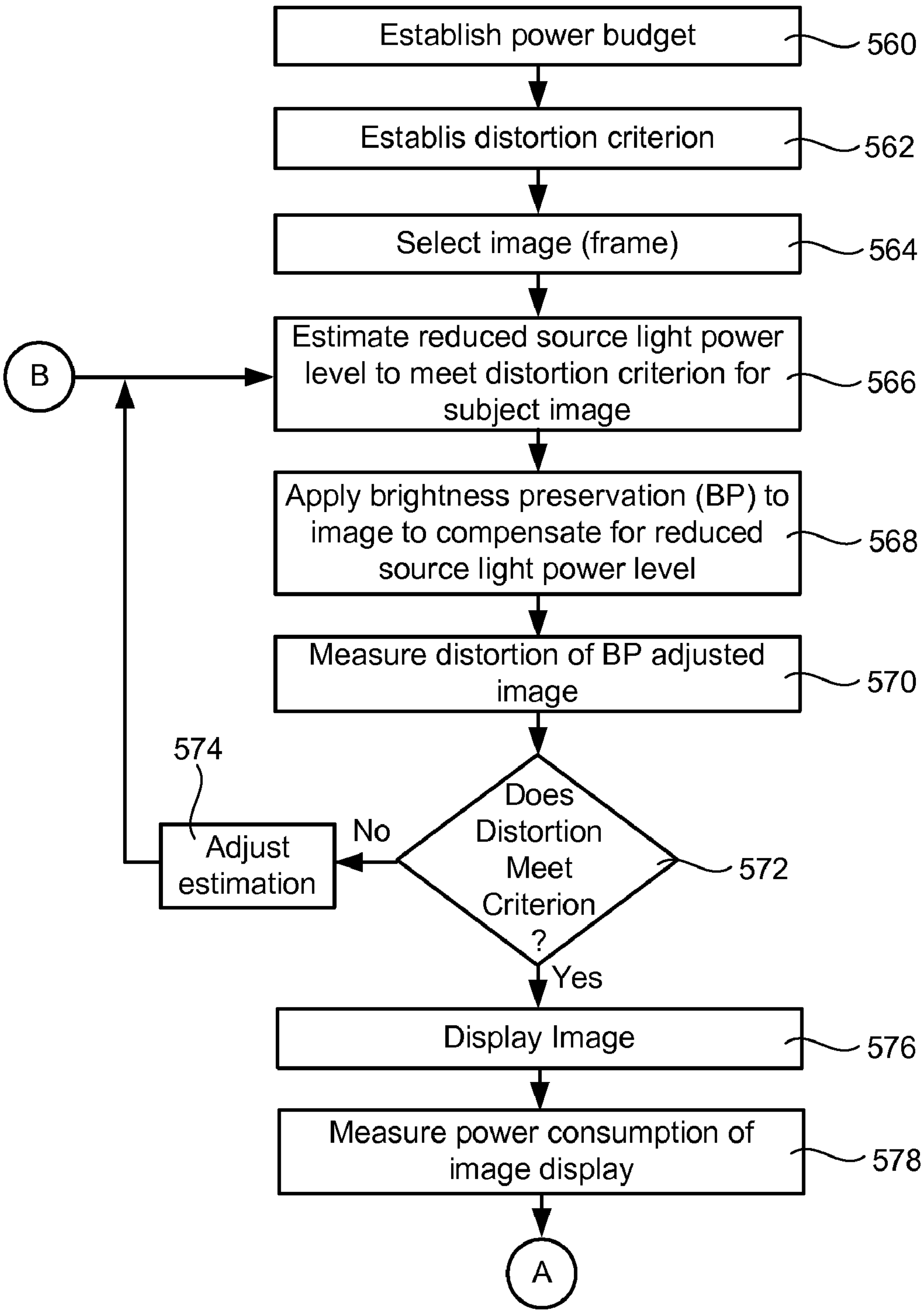
Figure 39:
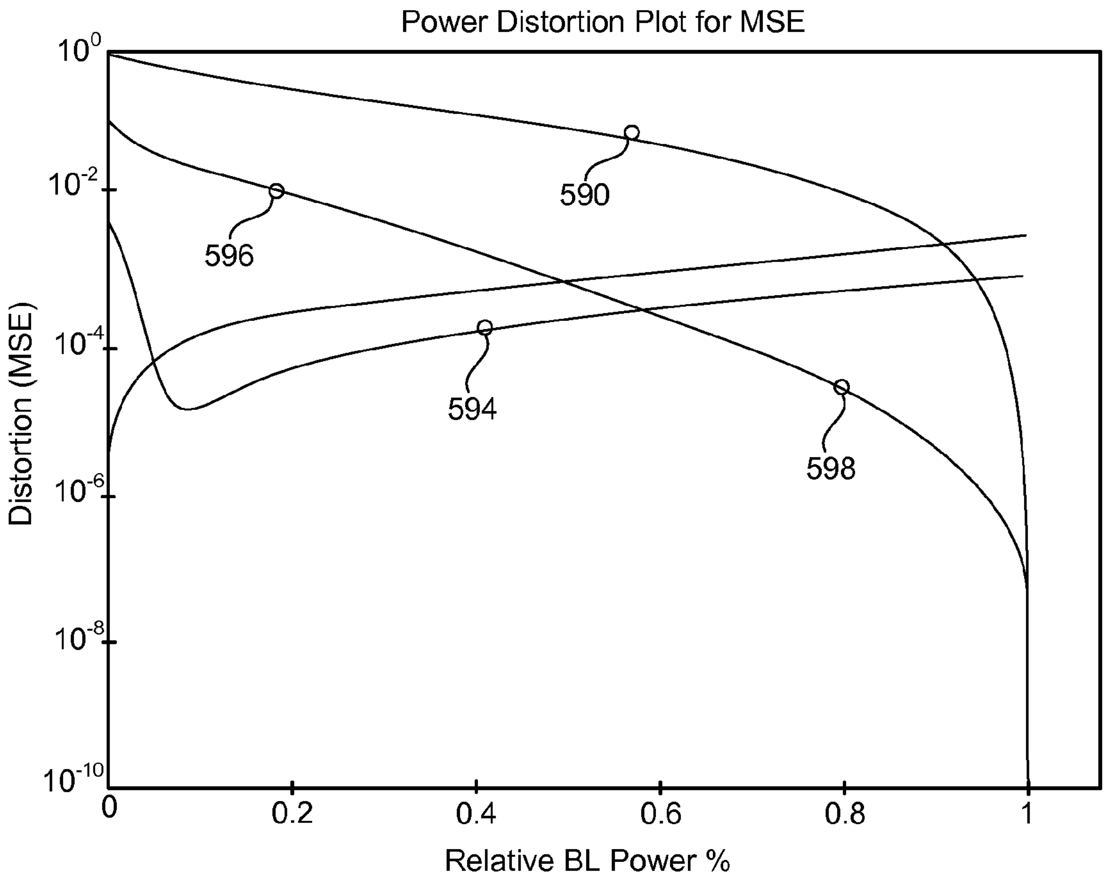
Figure 40:
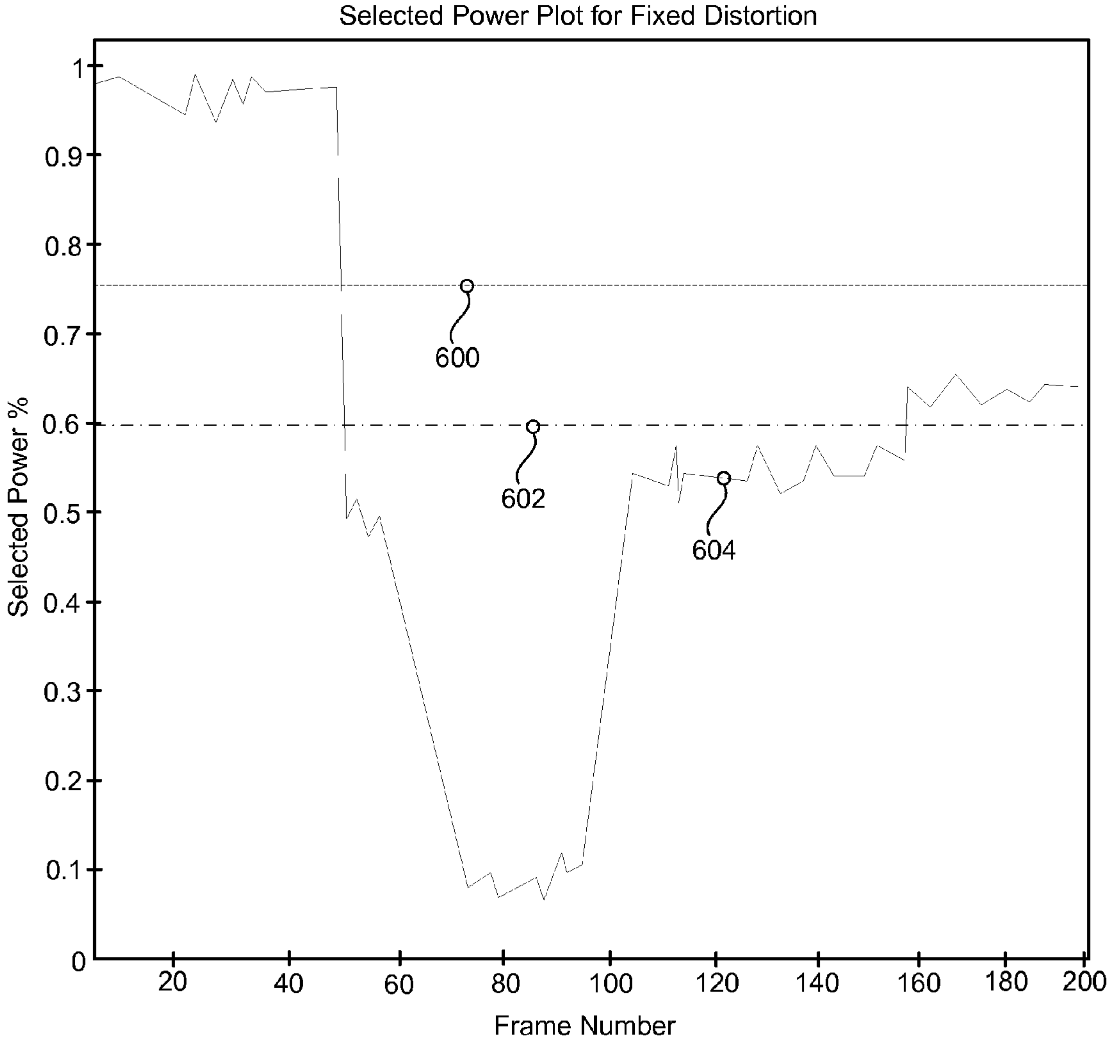
Figure 41:
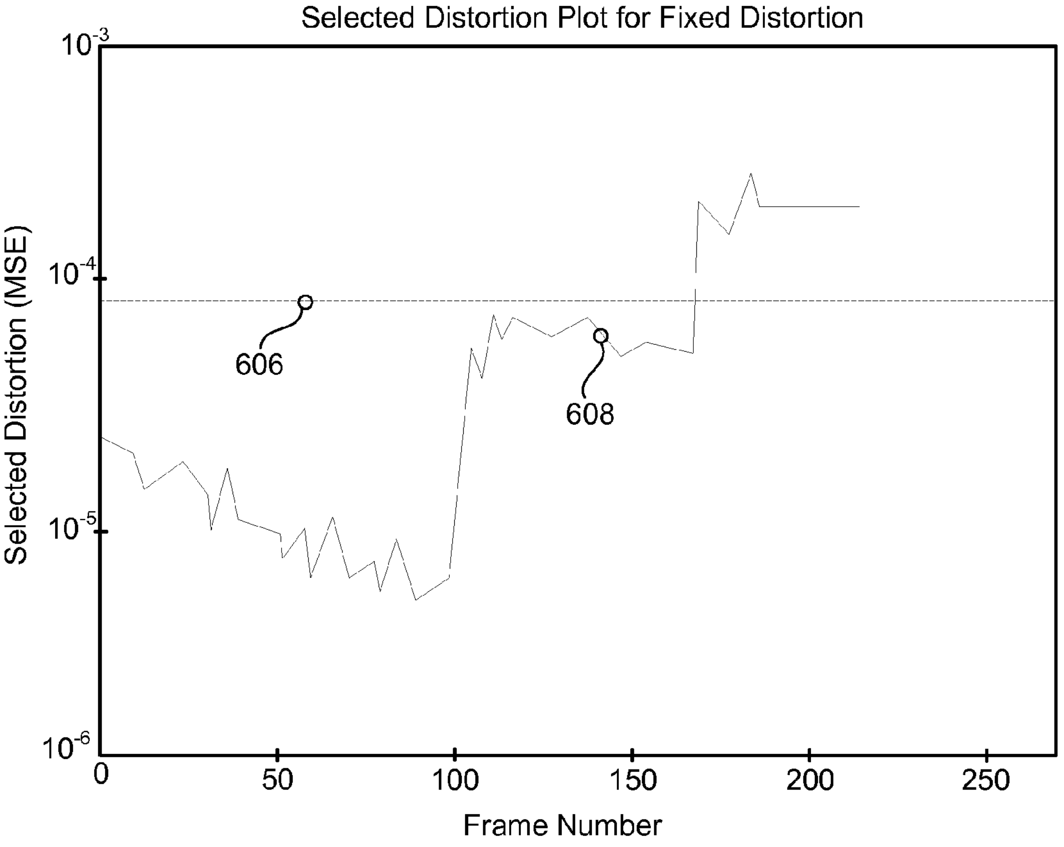
Figure 42:
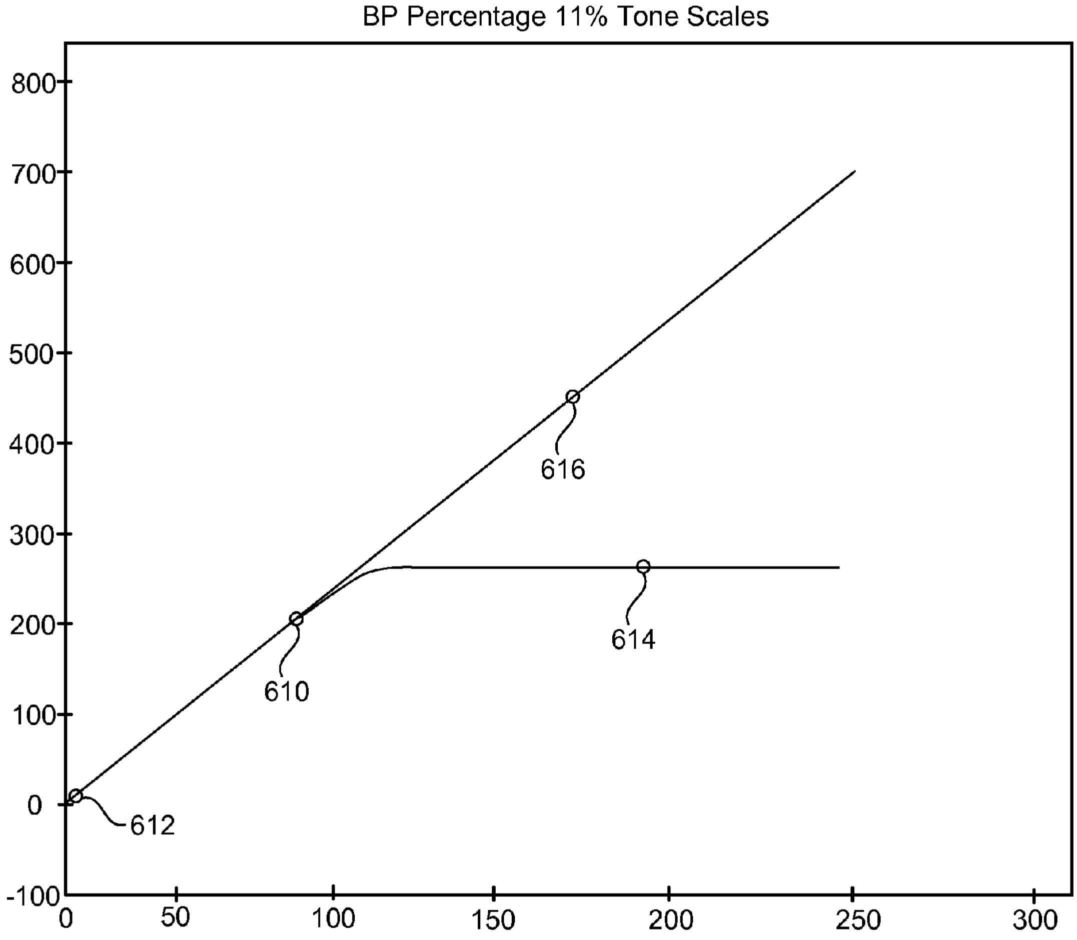
Figure 43:
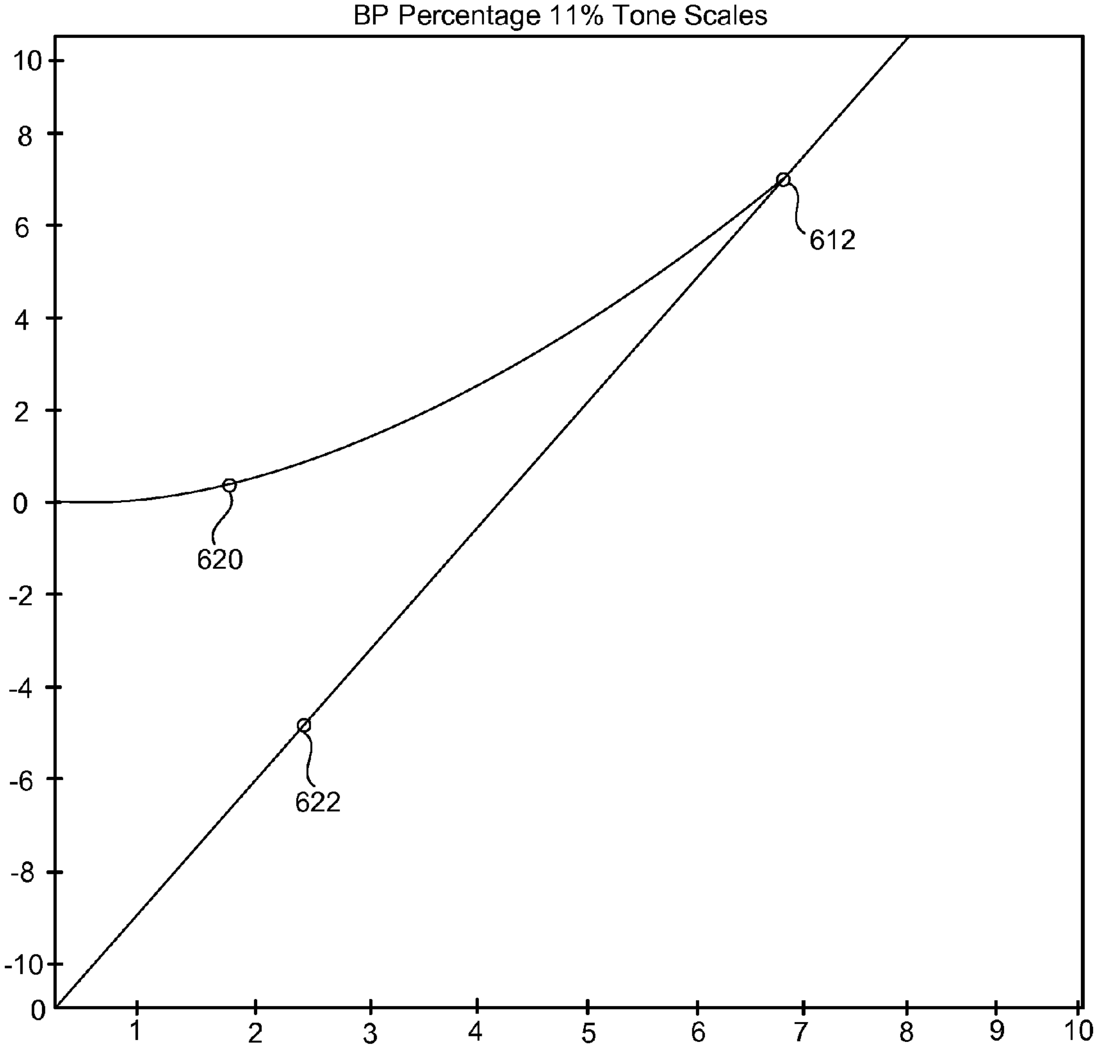
Figure 44:
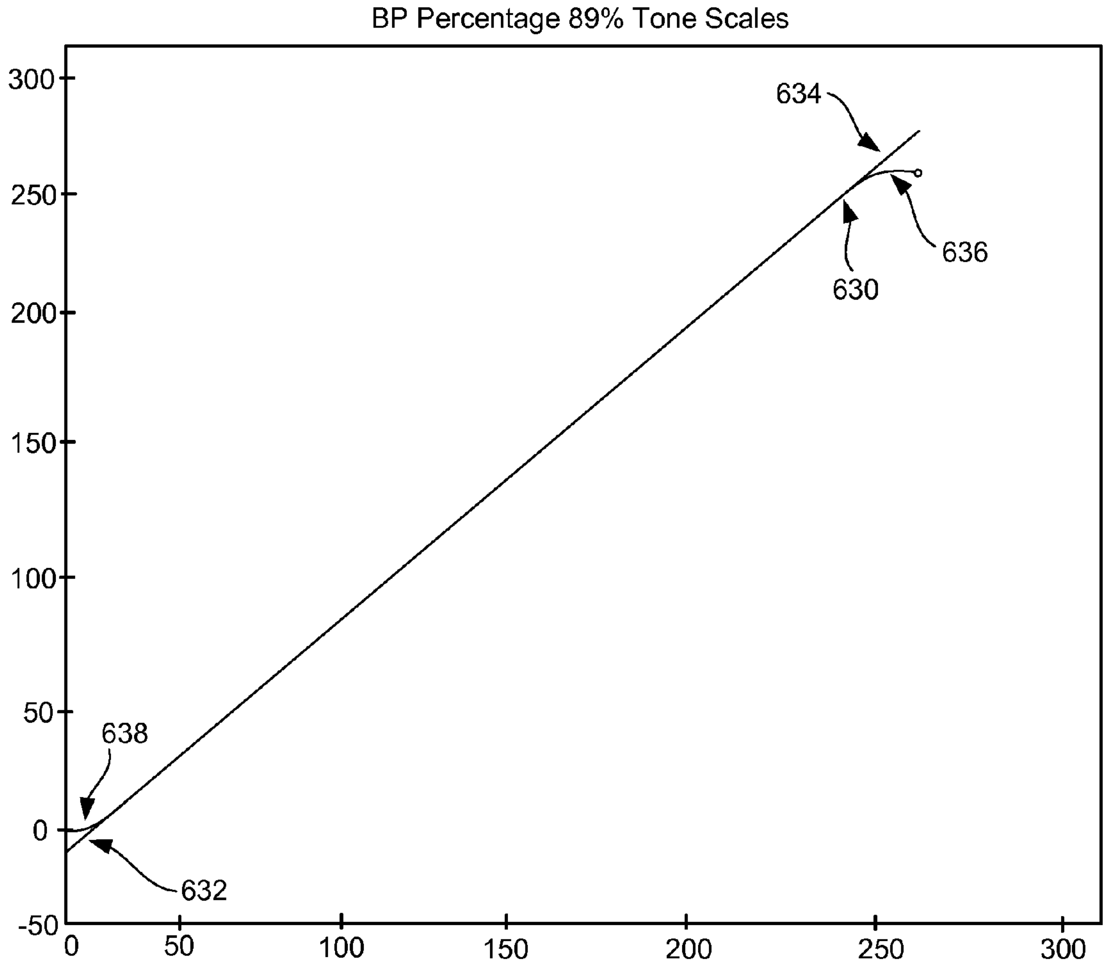
Figure 45:
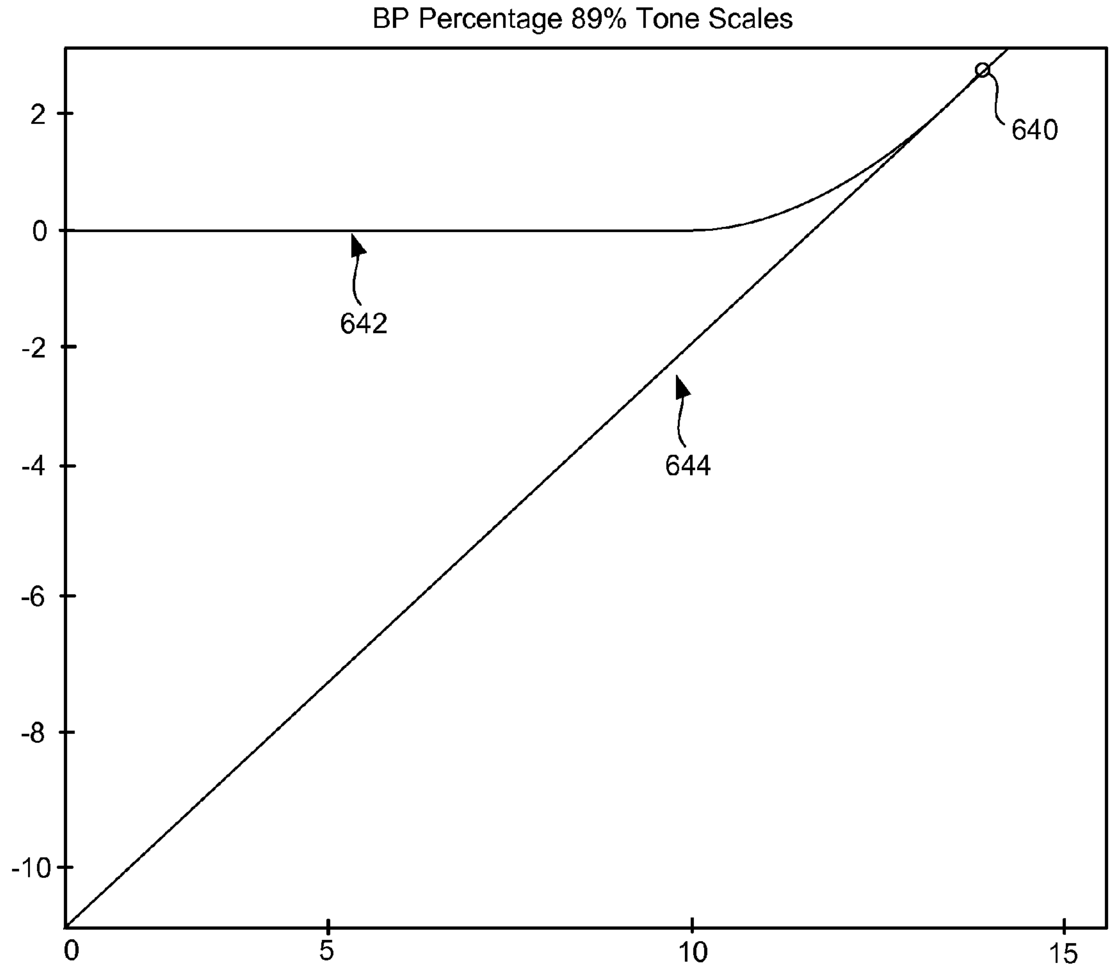
Figure 46:
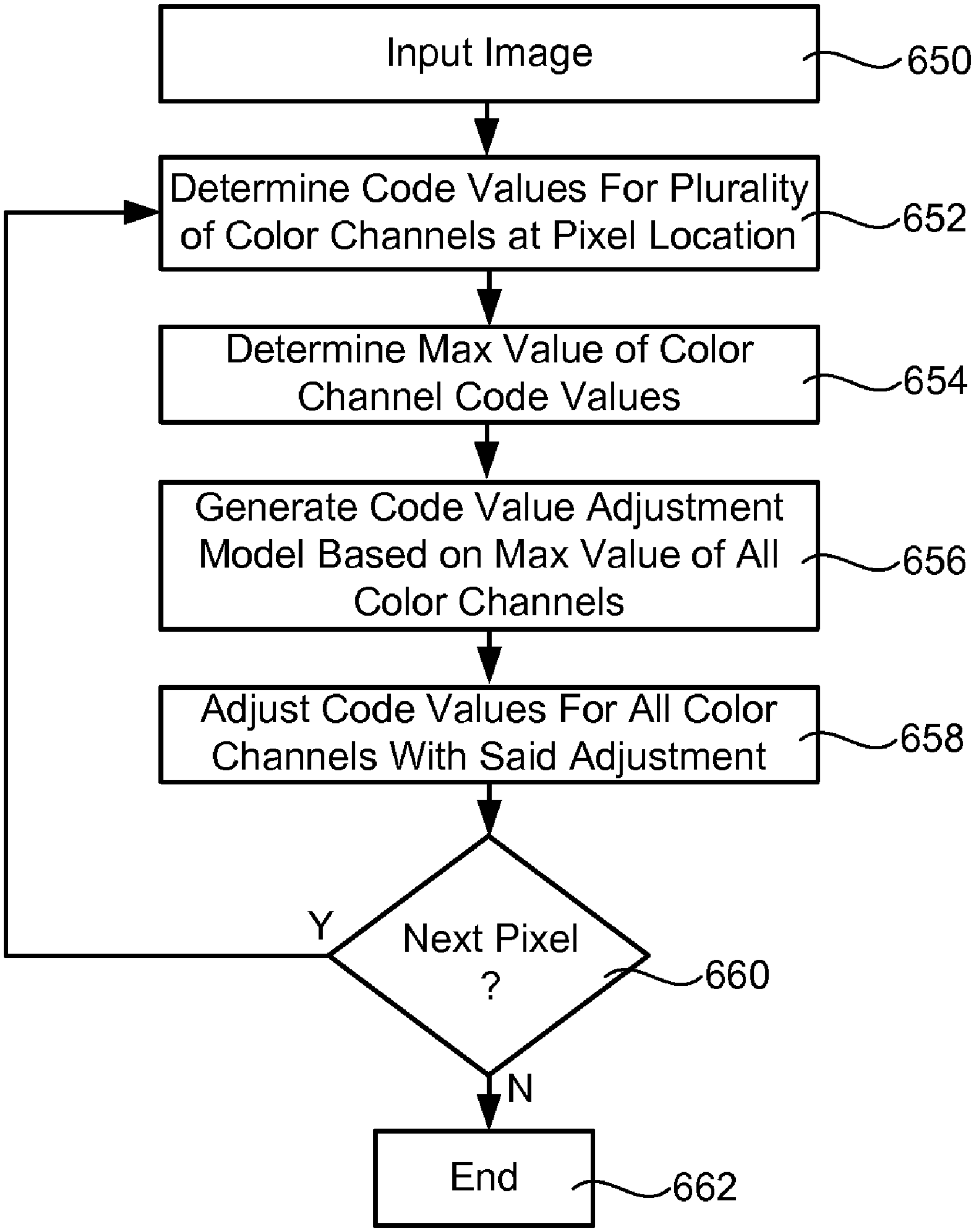
Figure 47:
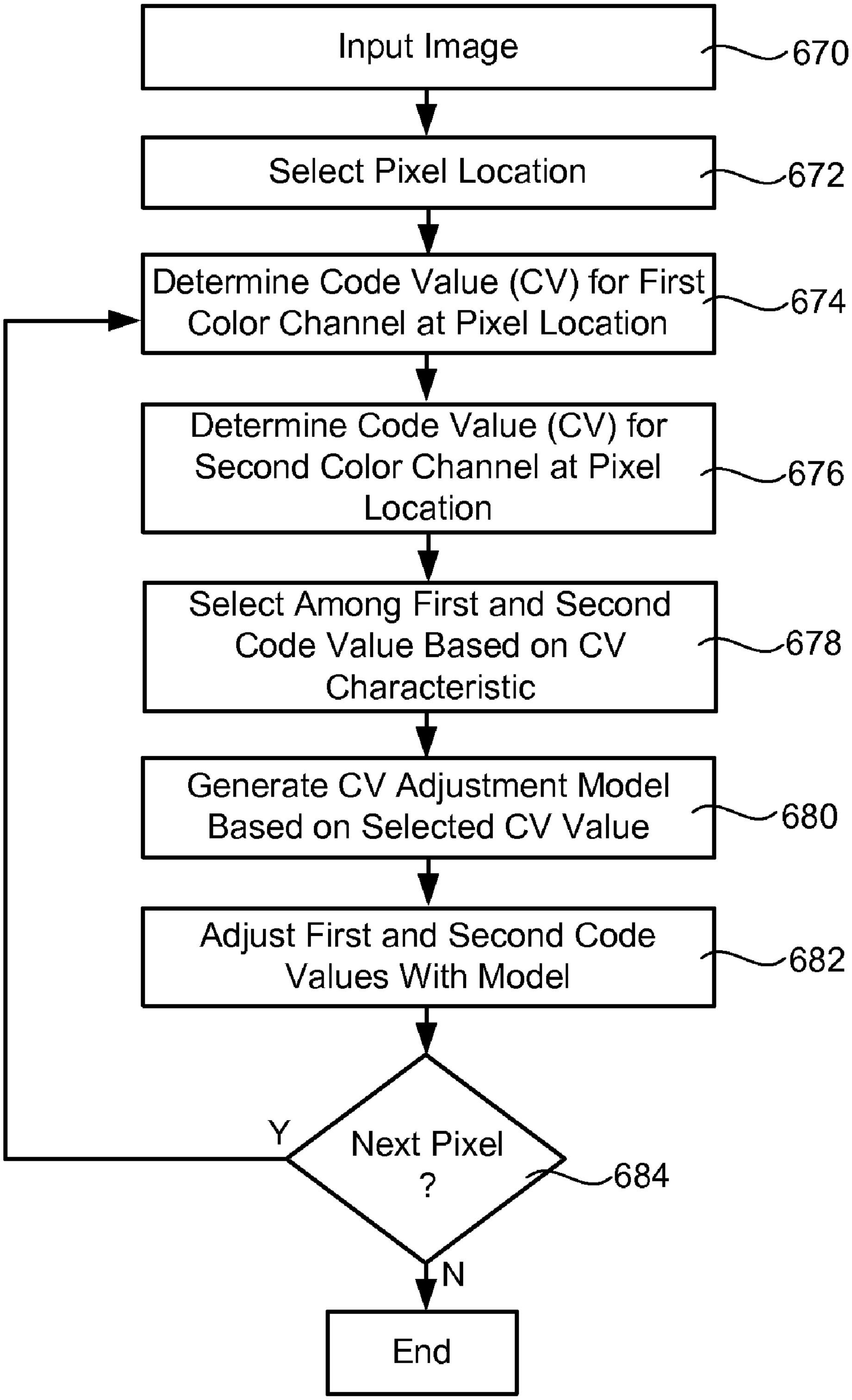
Figure 48:
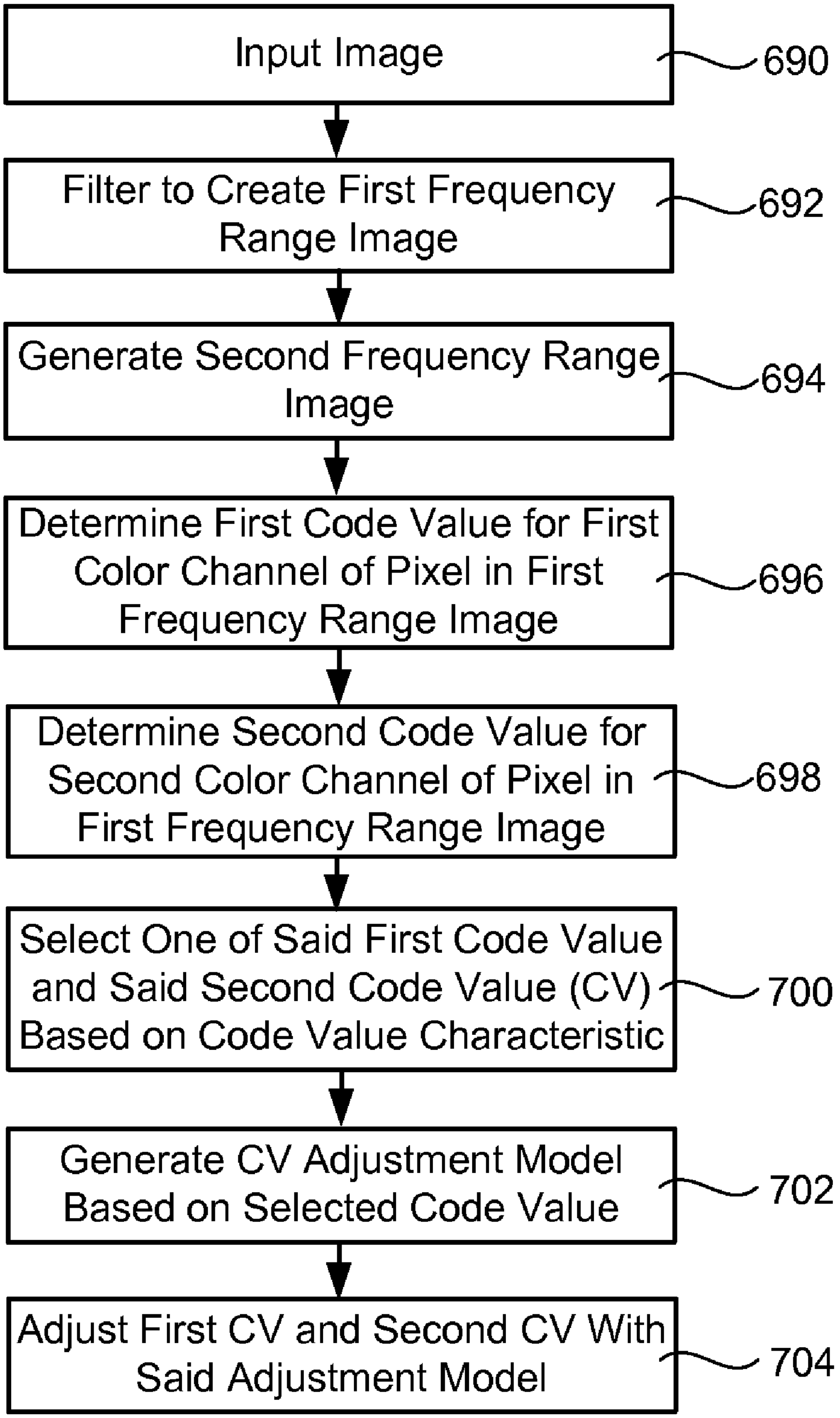
Figure 49:
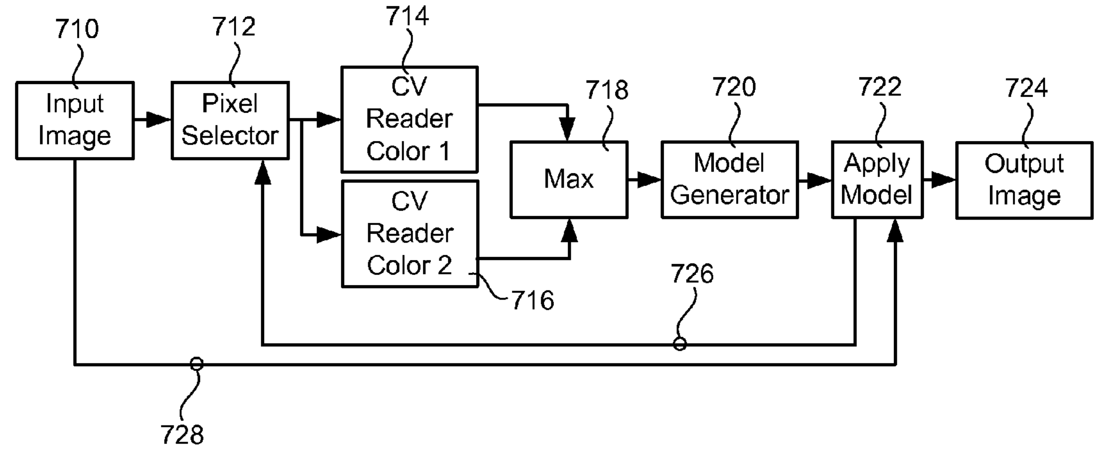
Figure 50:
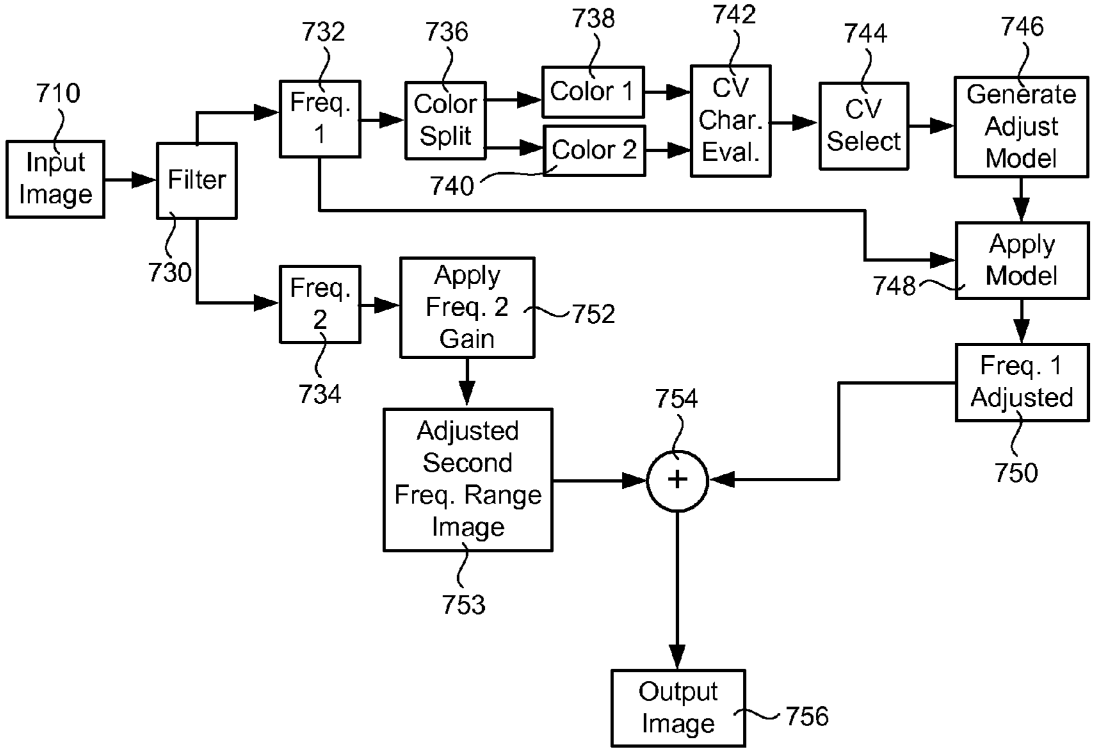
Figure 51:
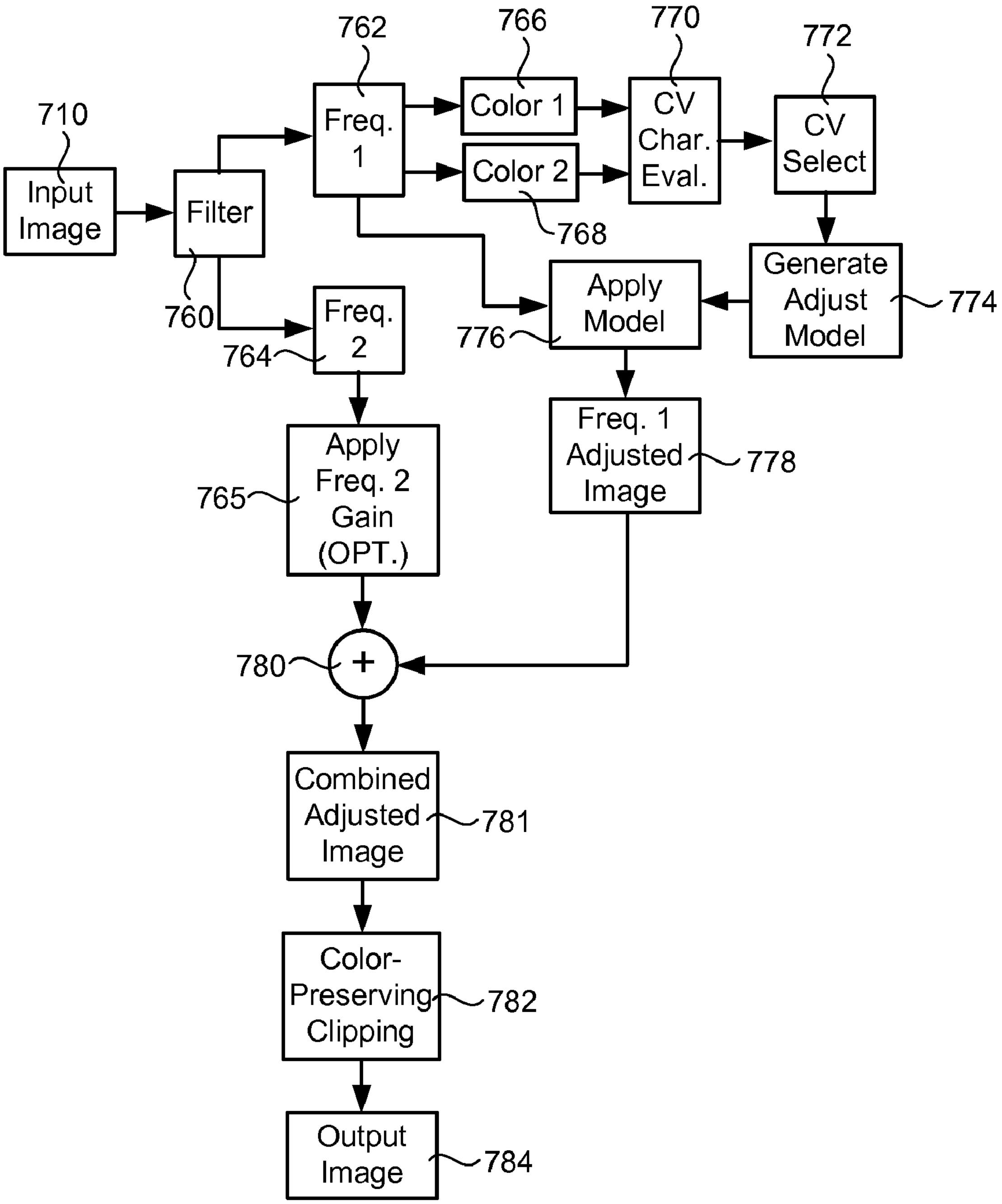
Figure 52:
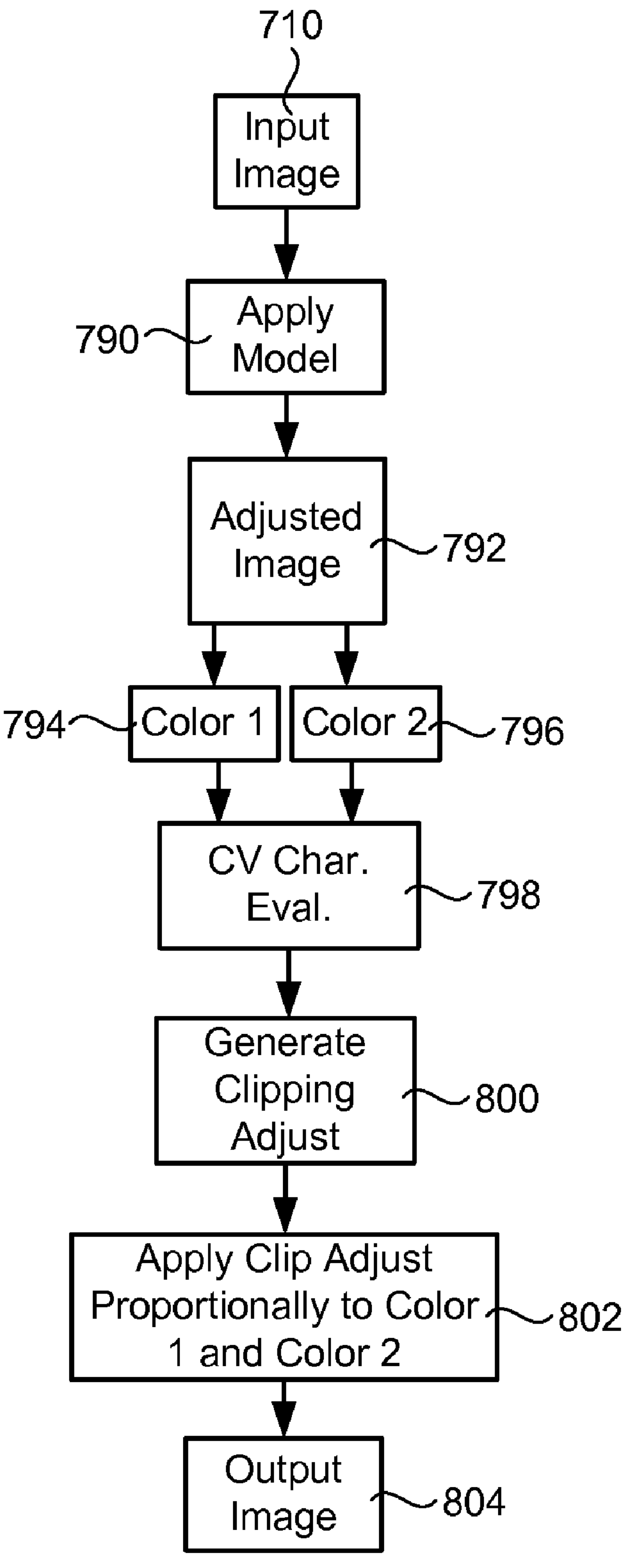
Figure 53:
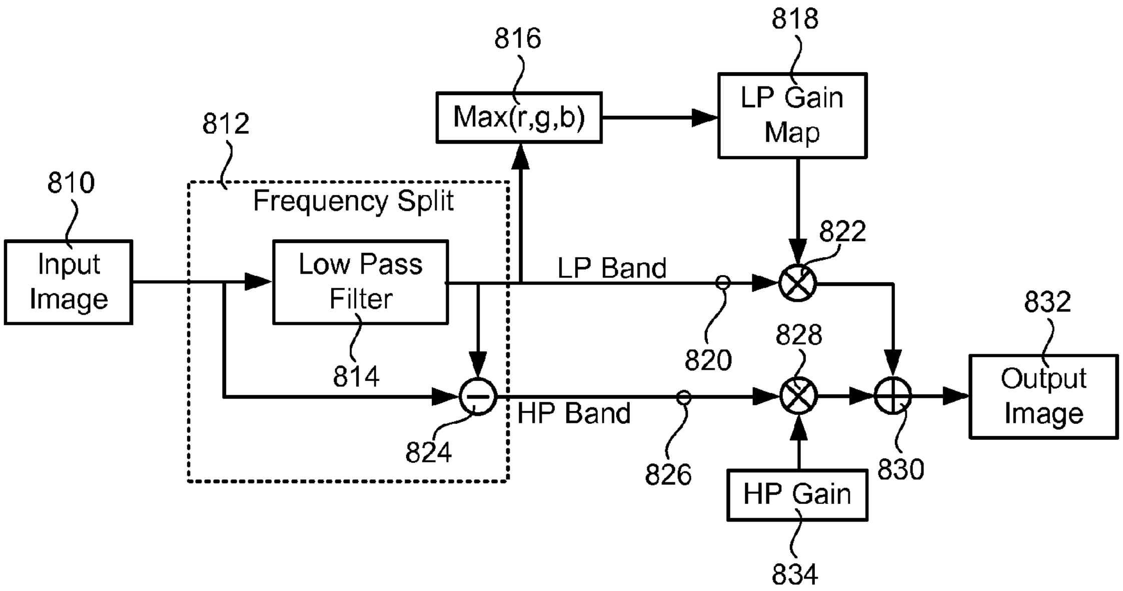
Figure 54:
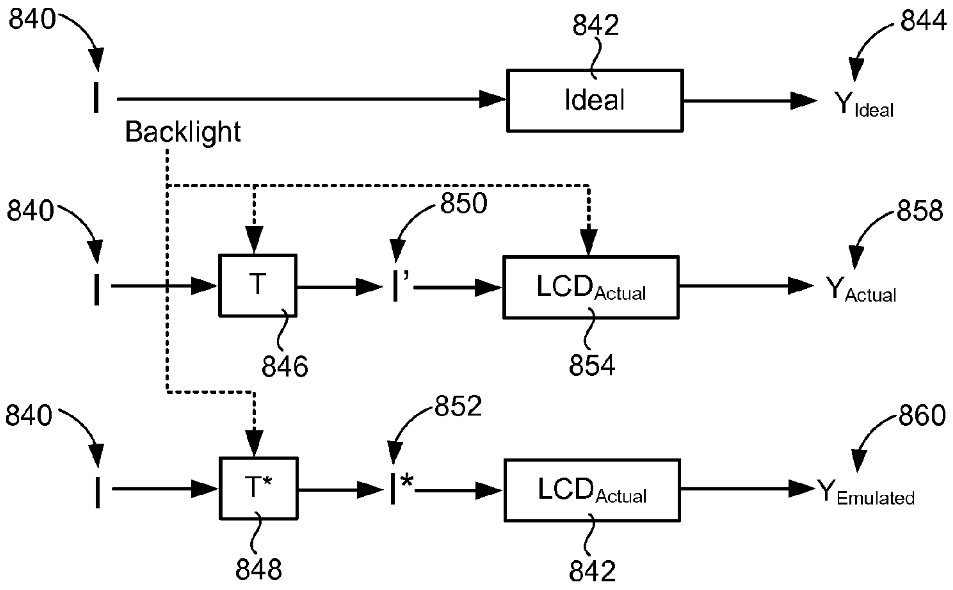
Figure 55:
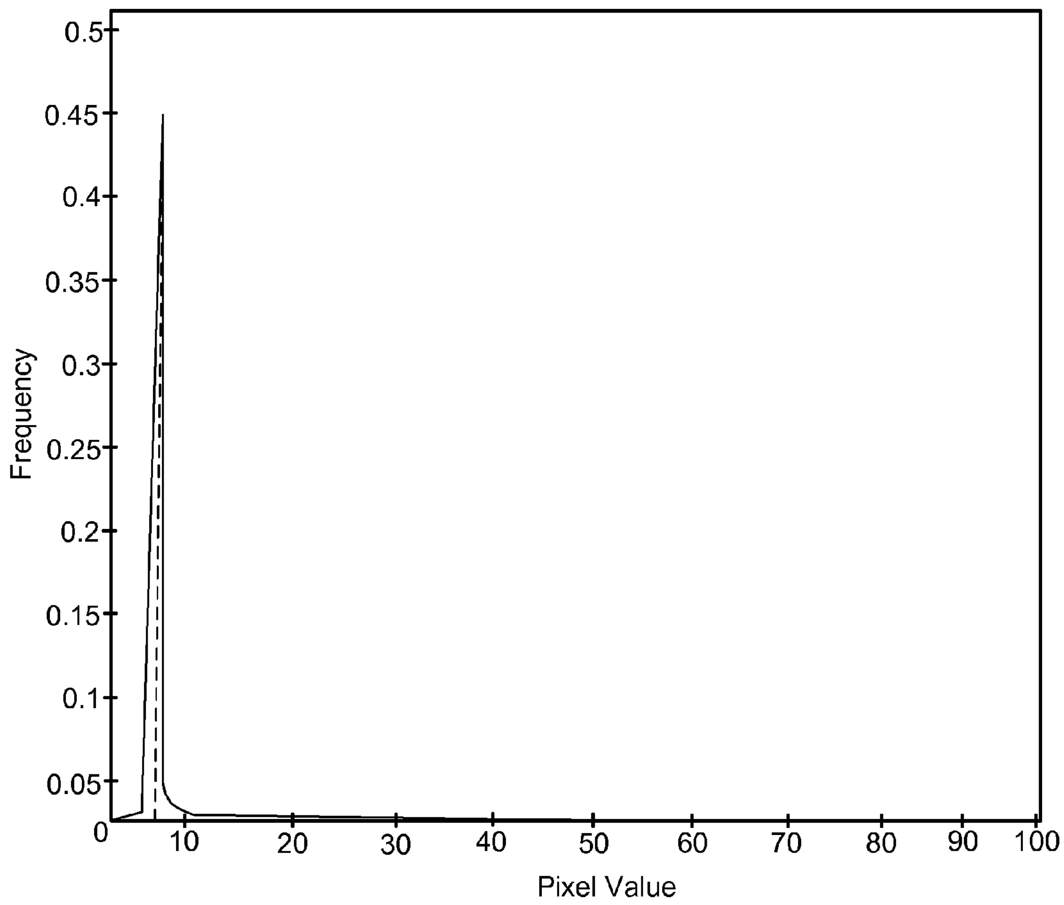
Figure 56:
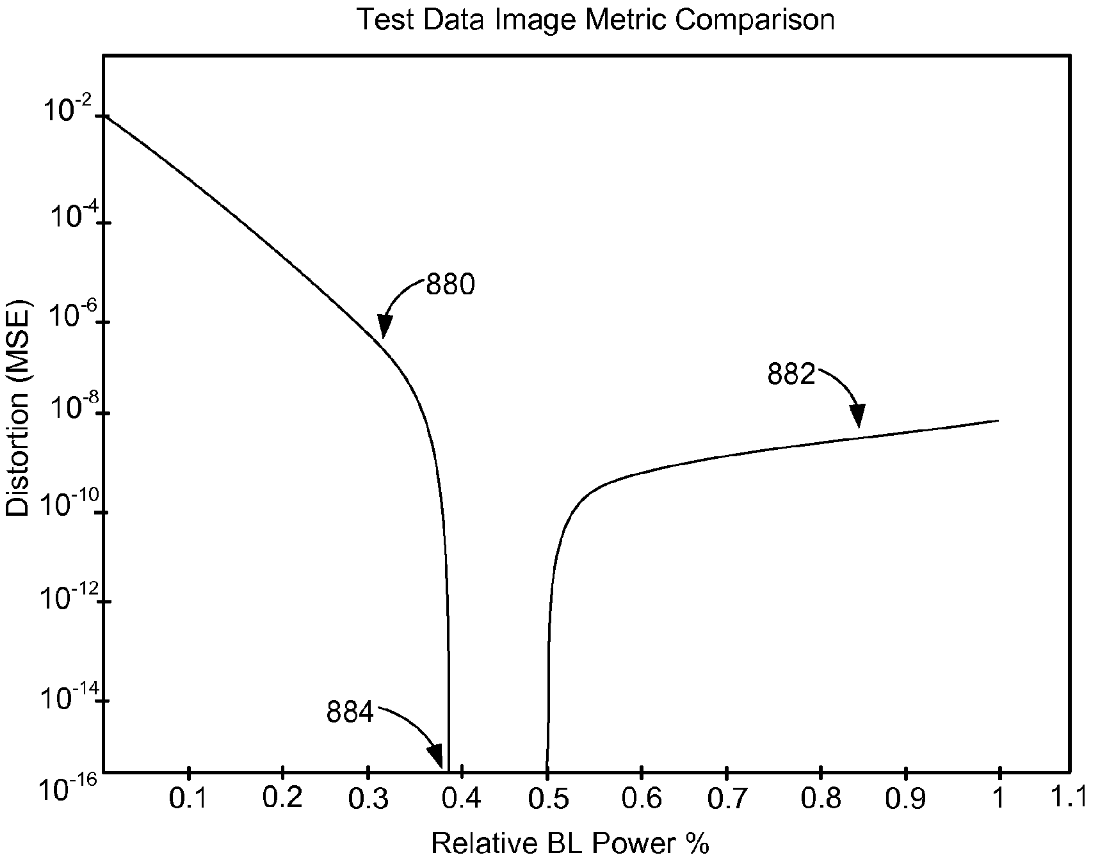
Figure 57:
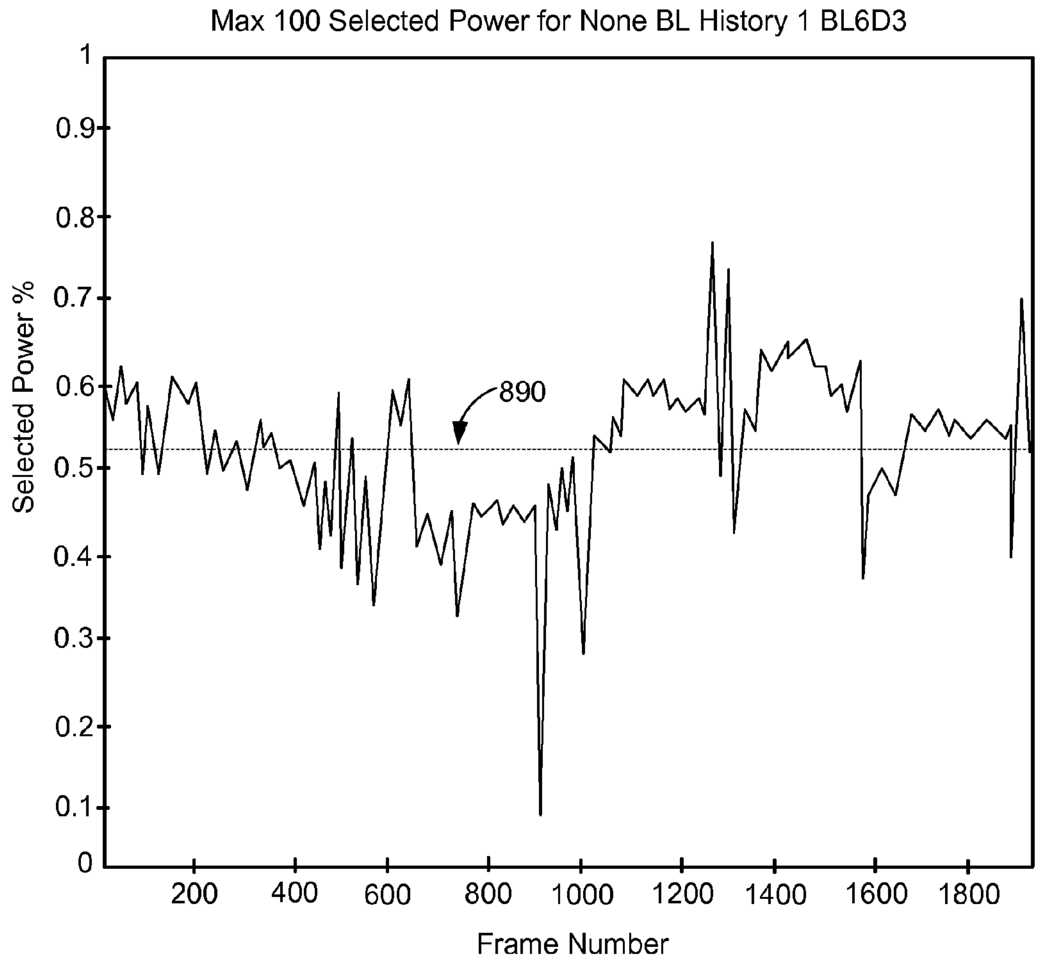
Figure 58:
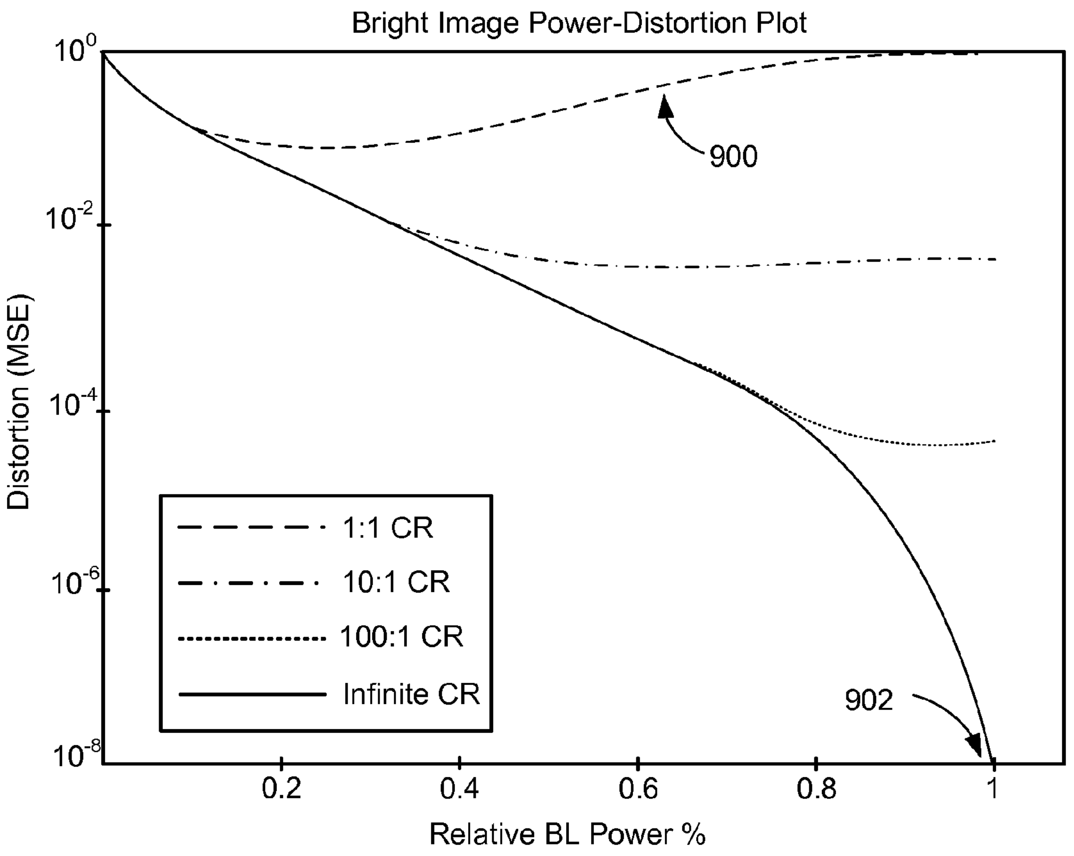
Figure 59:
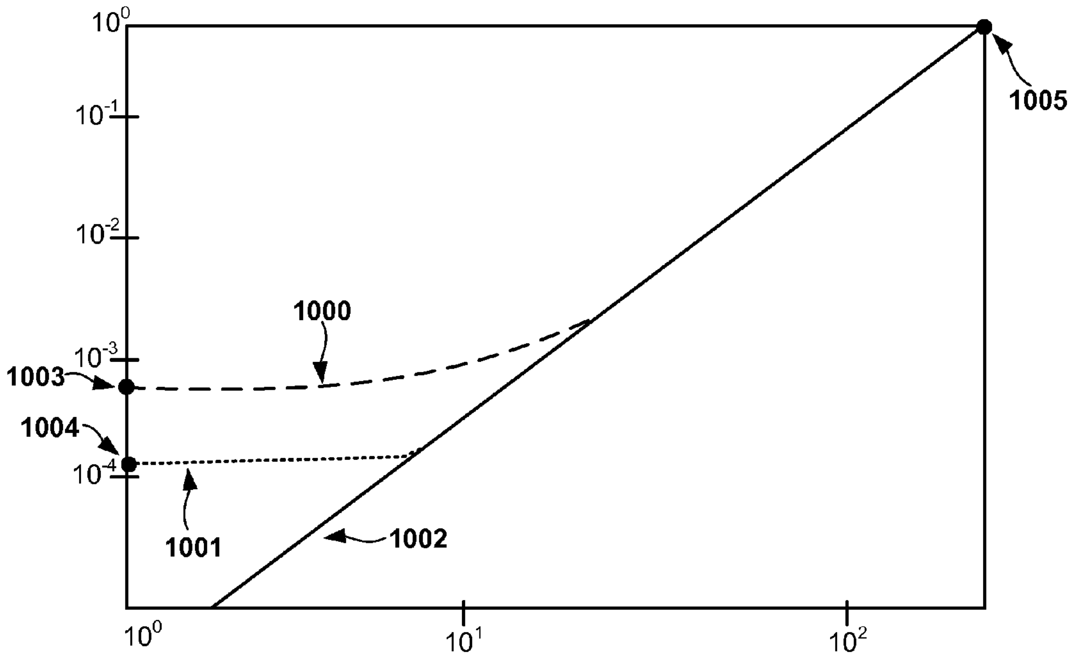
Figure 60:
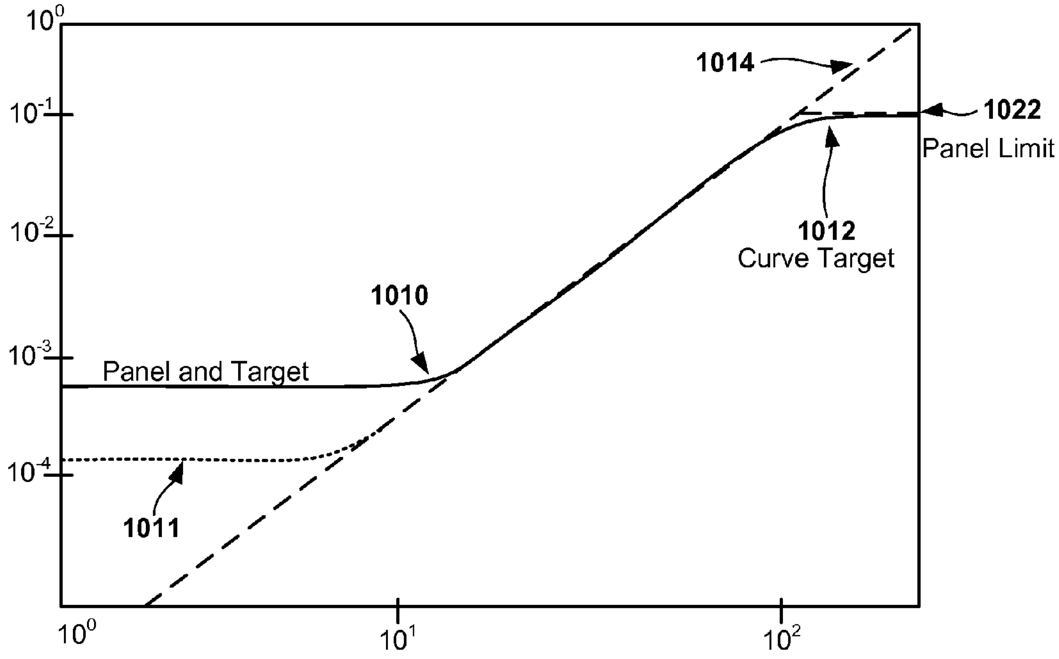
Figure 61:
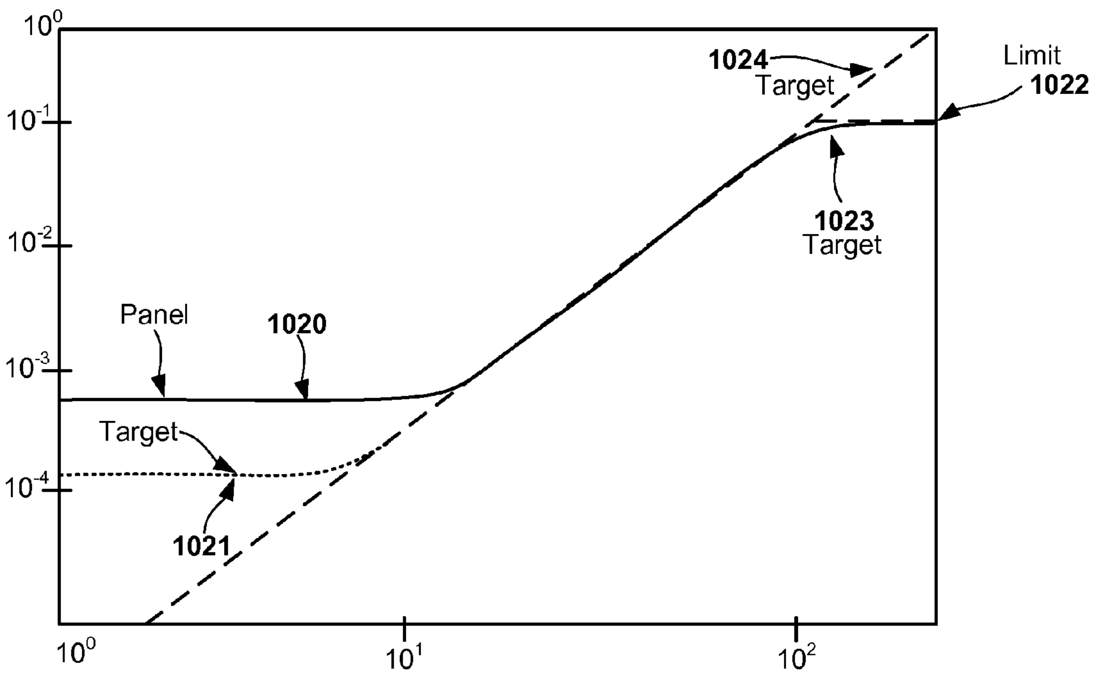
Figure 62:
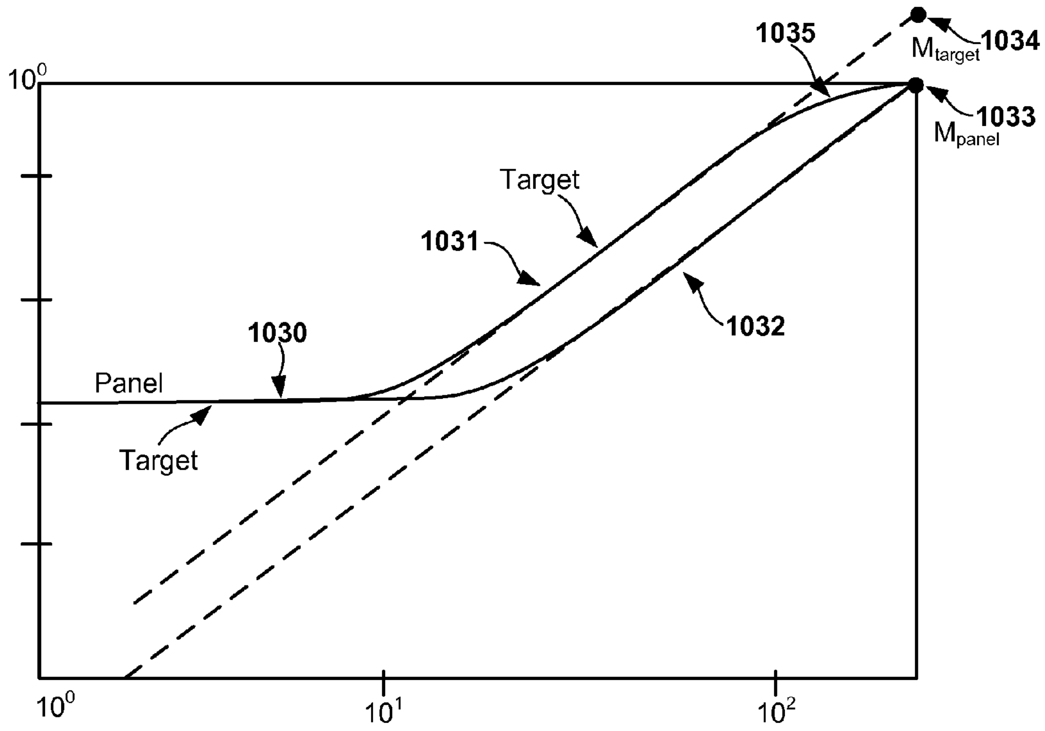
Figure 63:
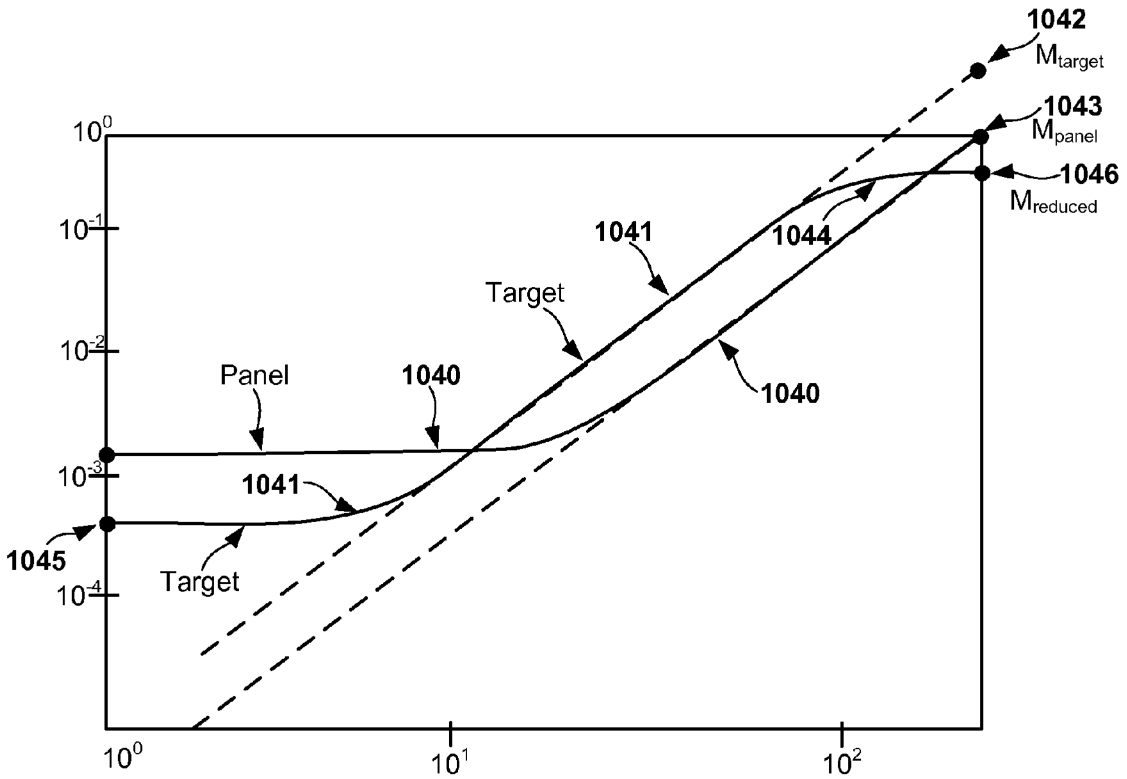
Figure 64:
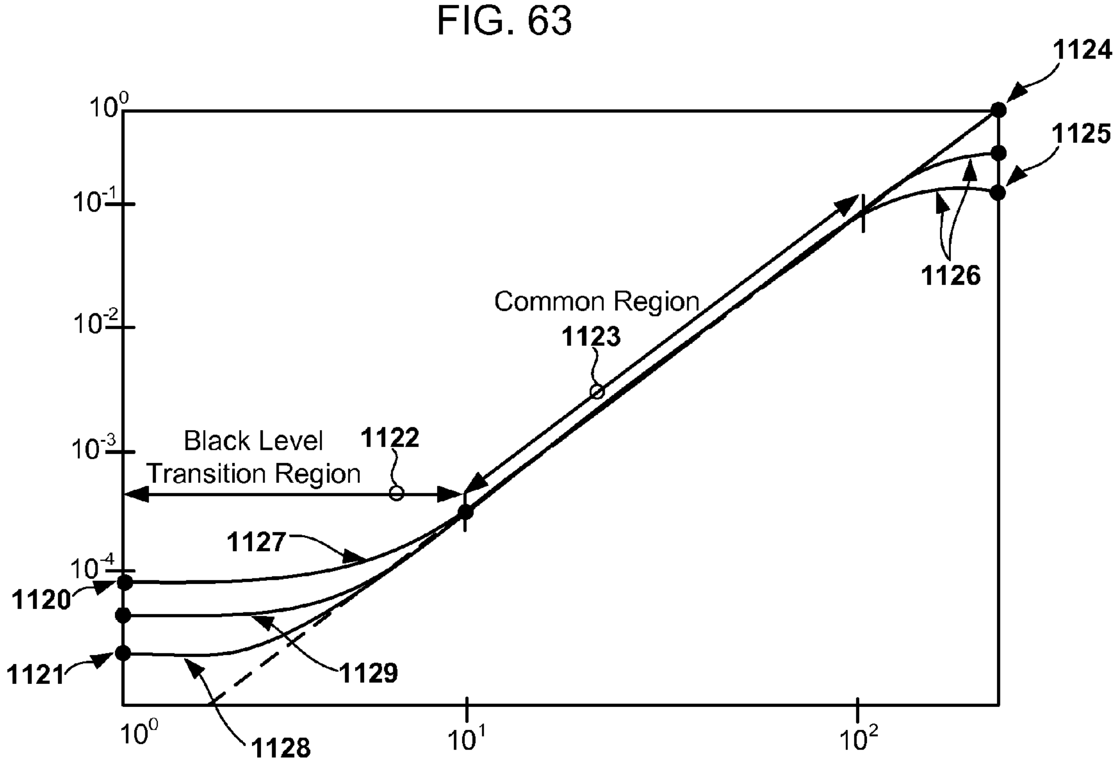
Figure 65:
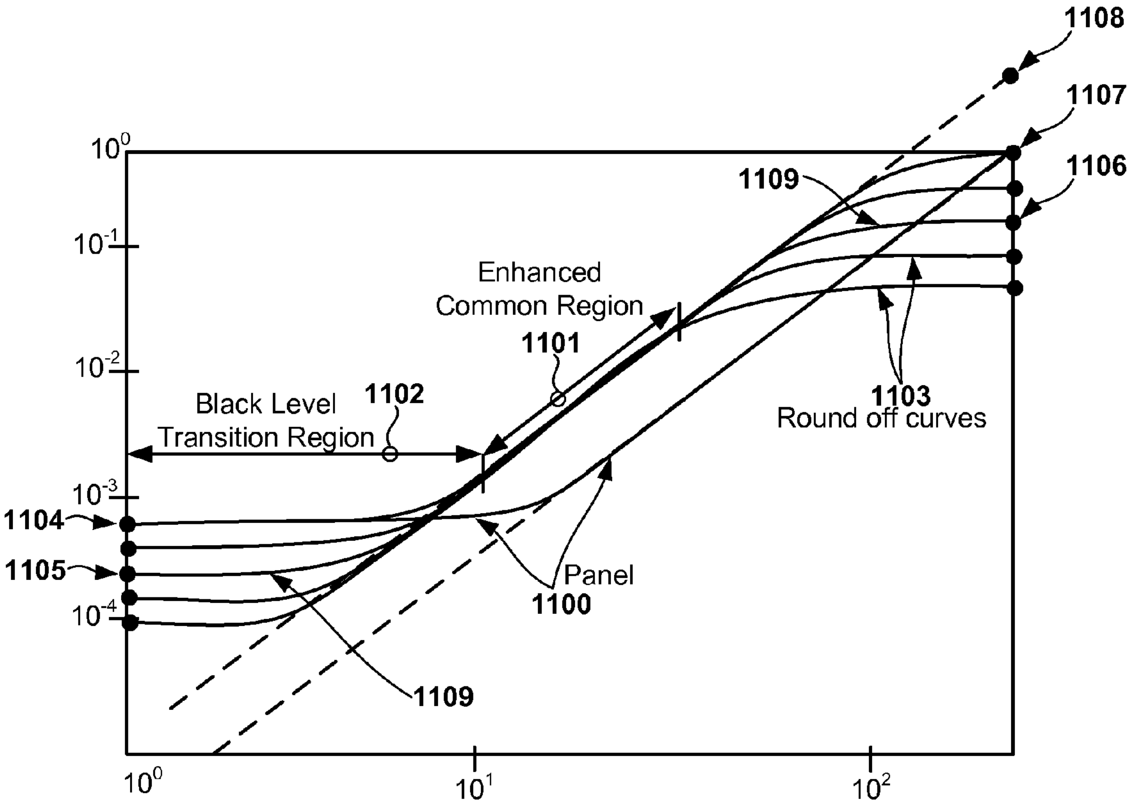
Figure 66:
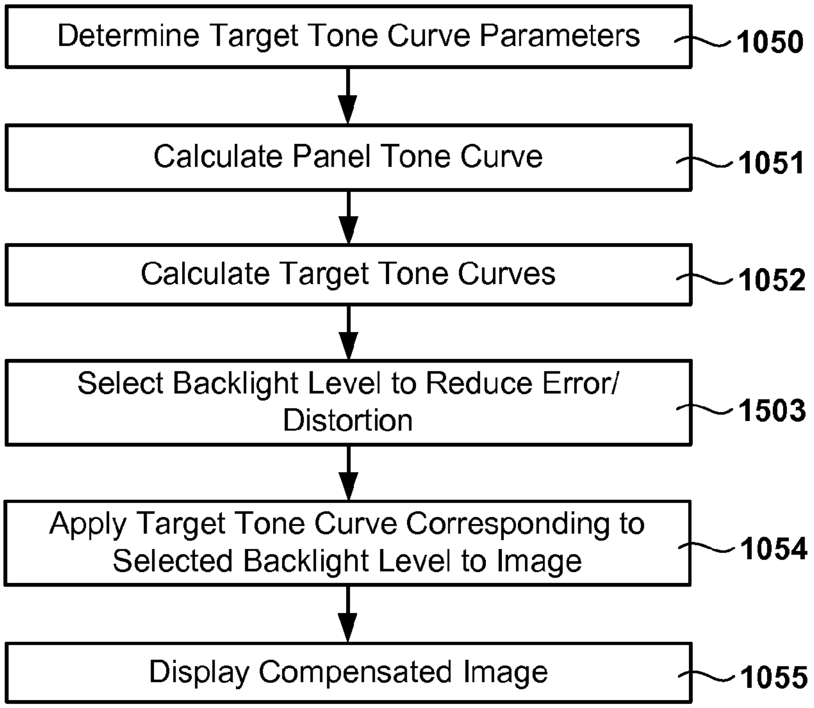
Figure 67:
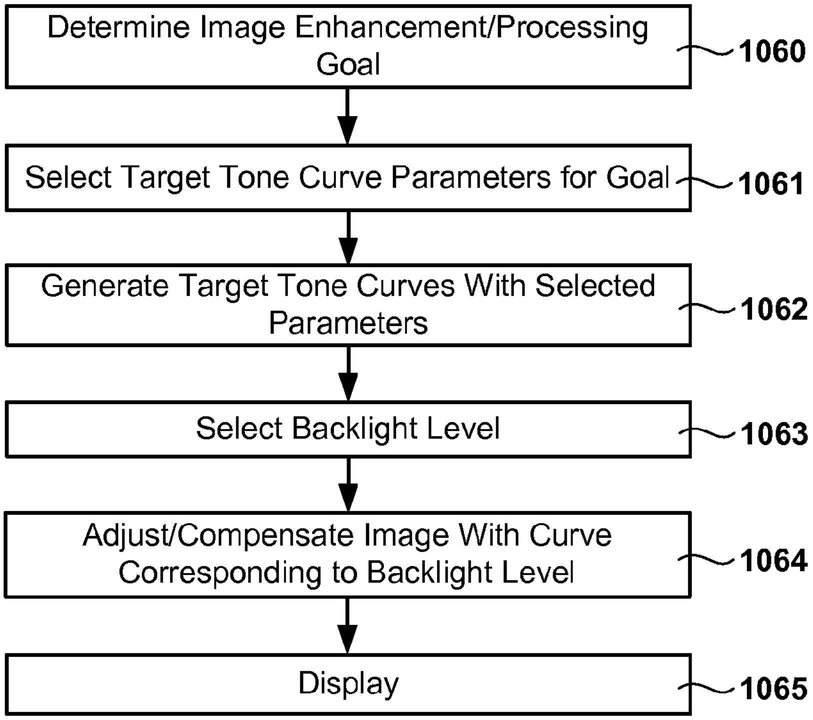
Figure 68:
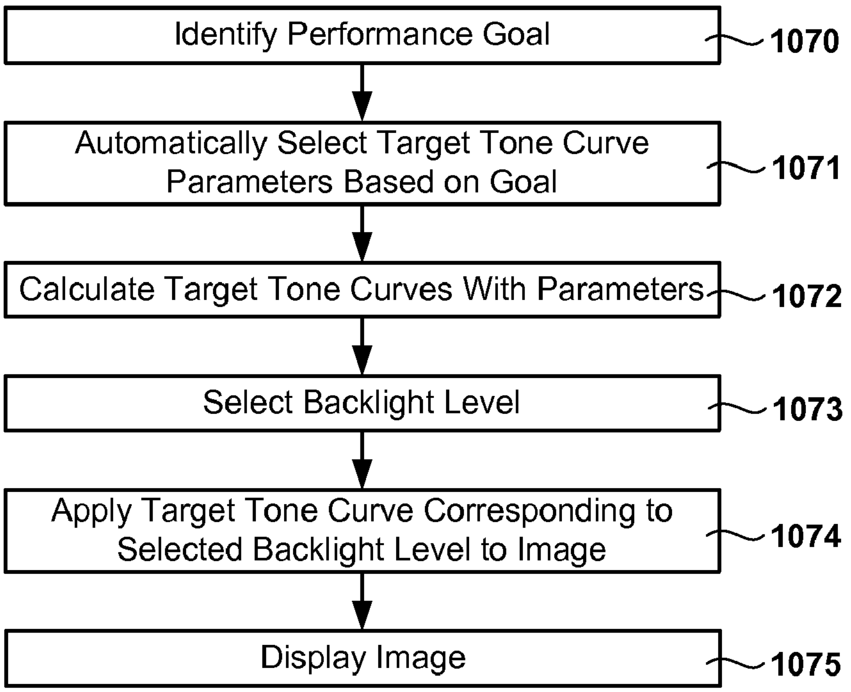
Figure 69:
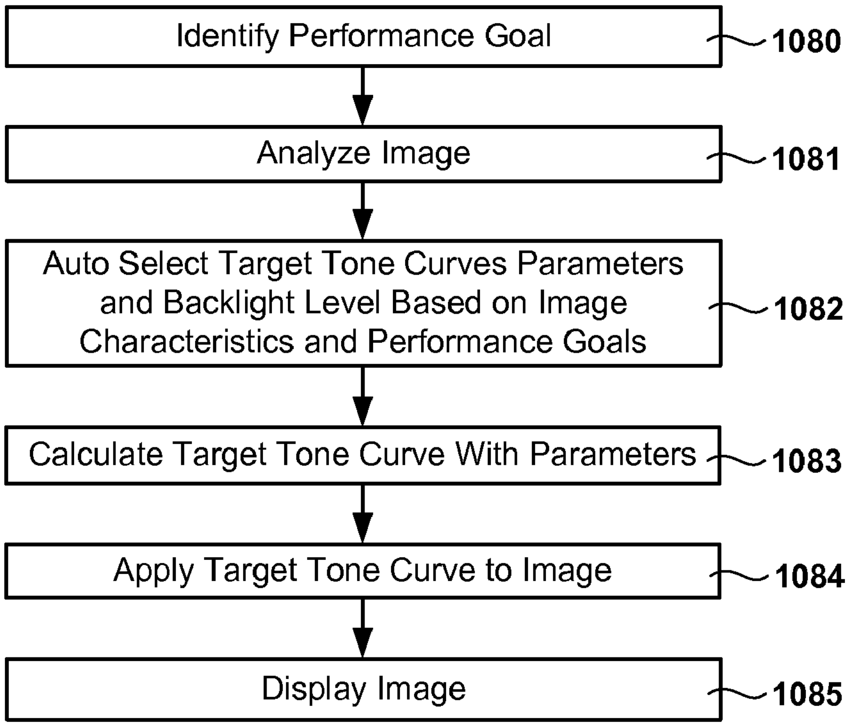
Figure 70:
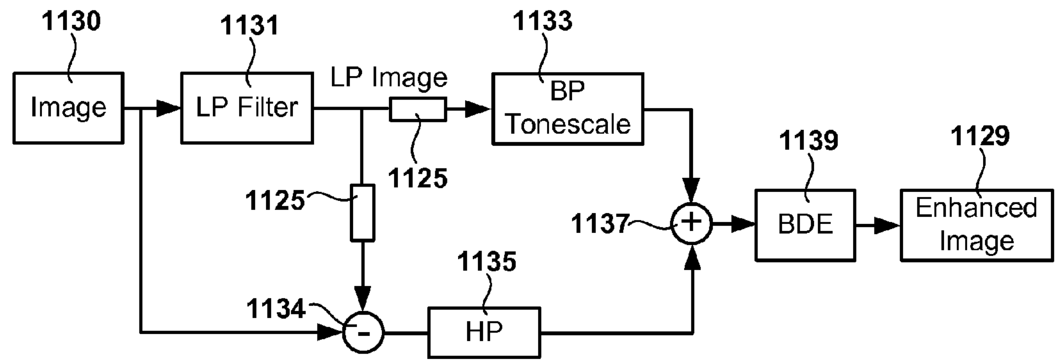
Figure 71:
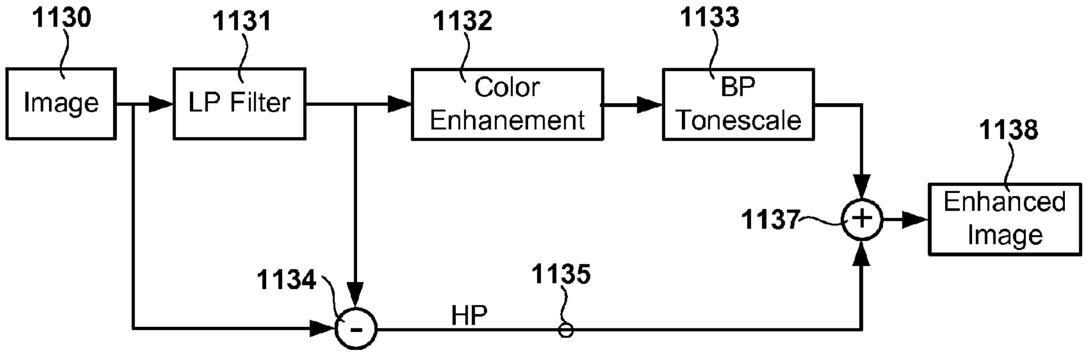
Figure 72:
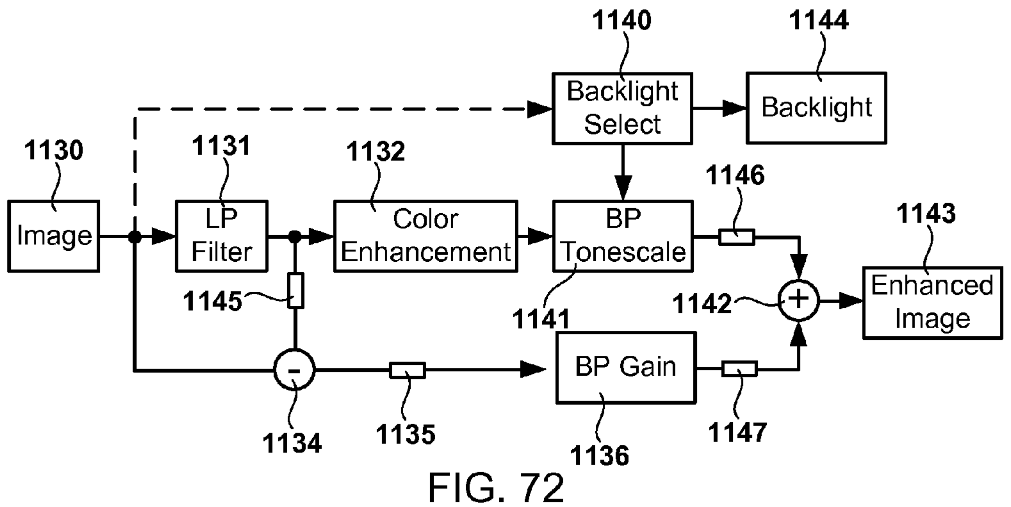
Figure 73:
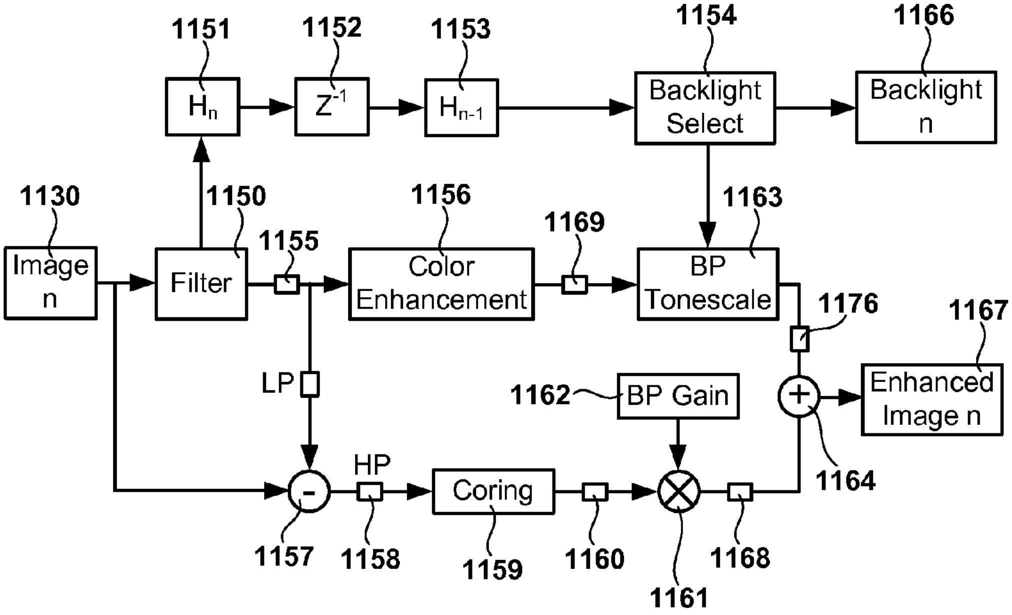
Figure 74:
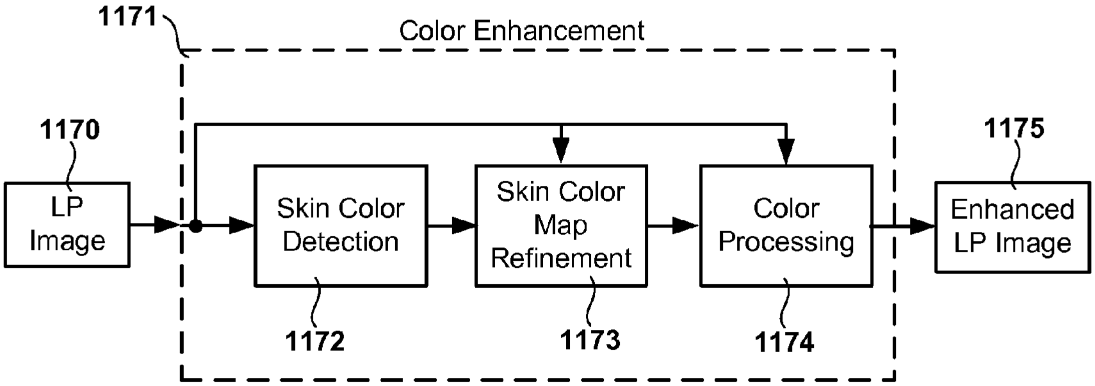
Figure 75:
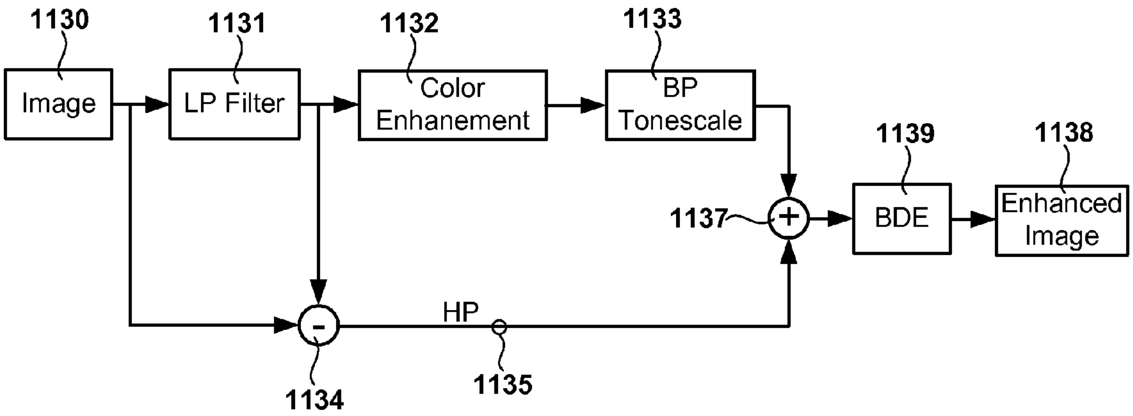
Figure 76:
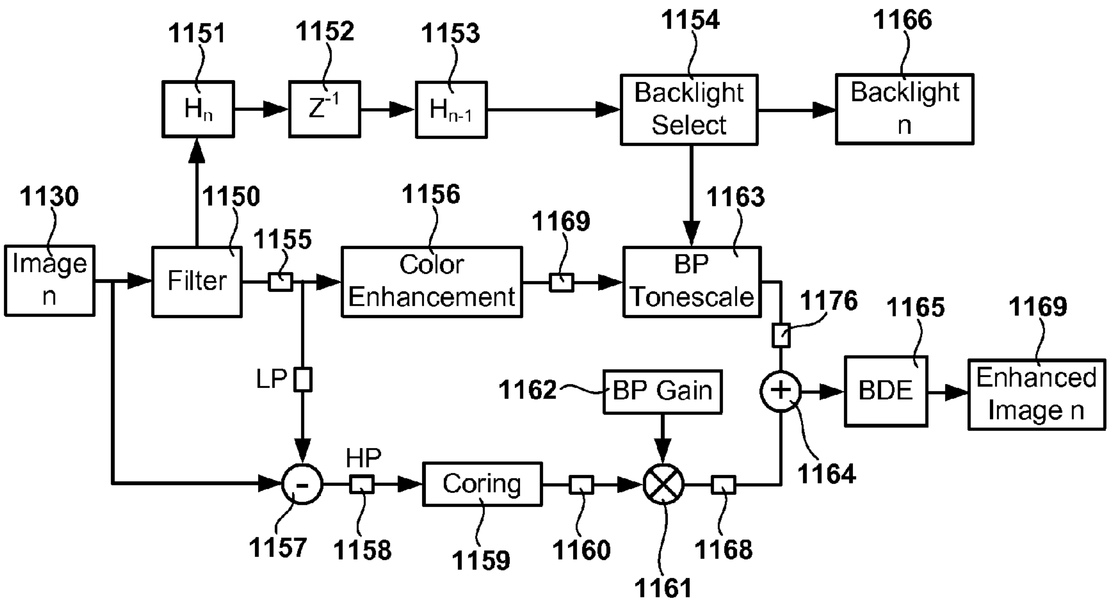
Figure 77:
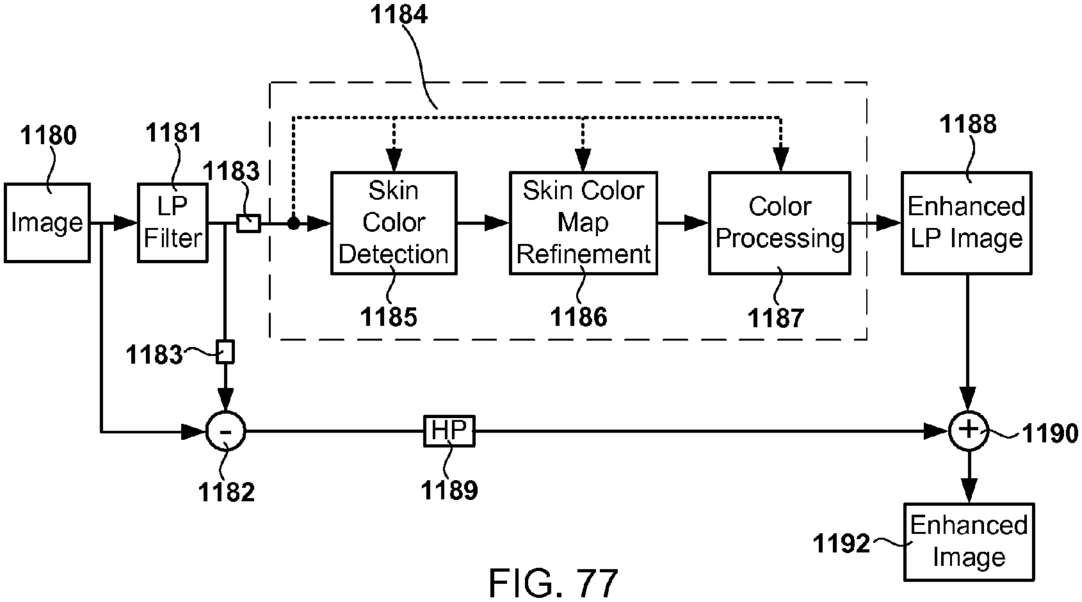
Figure 78:
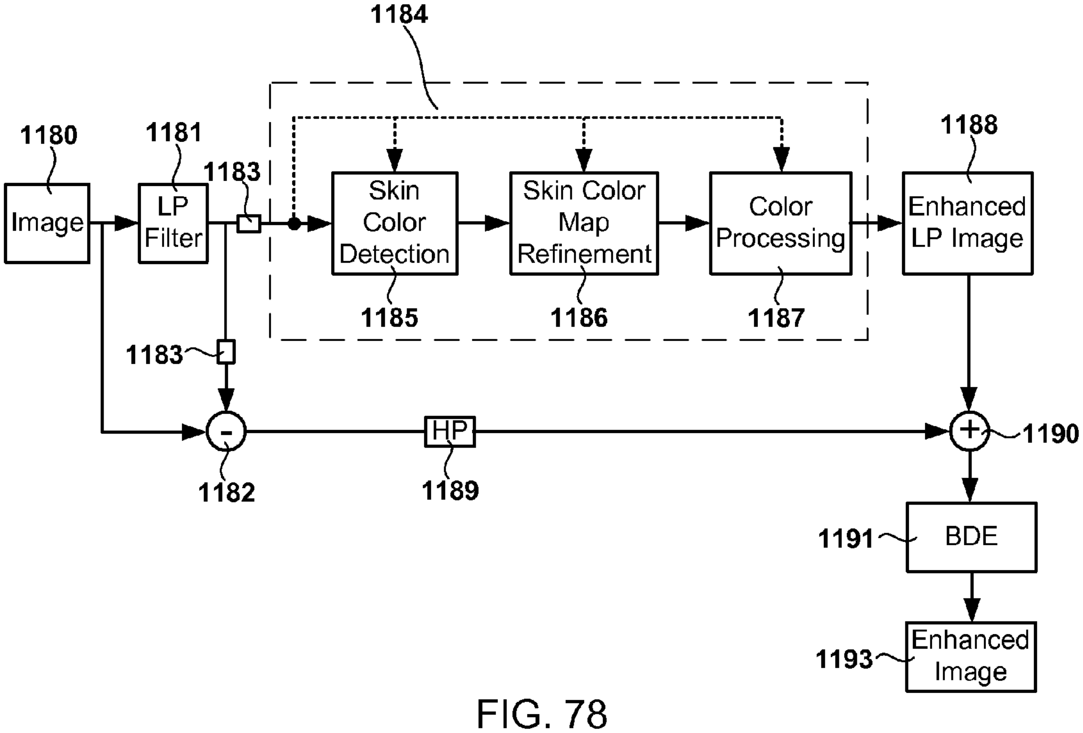

FIGS. 38A & B are a flow chart showing embodiments comprising distortion measurement which accounts for the effects of brightness preservation methods;

FIG. 39 is a power/distortion curve for exemplary images;

FIG. 40 is a power plot showing fixed distortion;

FIG. 41 is a distortion plot showing fixed distortion;

FIG. 42 is an exemplary tone scale adjustment curve;

FIG. 43 is a zoomed-in view of the dark region of the tone scale adjustment curve shown in FIG. 42;

FIG. 44 is another exemplary tone scale adjustment curve;

FIG. 45 is a zoomed-in view of the dark region of the tone scale adjustment curve shown in FIG. 44;

FIG. 46 is a chart showing image code value adjustment based on a maximum color channel value;

FIG. 47 is a chart showing image code value adjustment of multiple color channels based on maximum color channel code value;

FIG. 48 is a chart showing image code value adjustment of multiple color channels based on a code value characteristic of one of the color channels;

FIG. 49 is a diagram showing embodiments of the present invention comprising a tone scale generator that receives a maximum color channel code value as input;

FIG. 50 is a diagram showing embodiments of the present invention comprising frequency decomposition and color channel code distinctions with tone scale adjustment;

FIG. 51 is a diagram showing embodiments of the present invention comprising frequency decomposition, color channel distinction and color-preserving clipping;

FIG. 52 is a diagram showing embodiments of the present invention comprising color-preserving clipping based on color channel code value characteristics;

FIG. 53 is a diagram showing embodiments of the present invention comprising a low-pass/high-pass frequency split and selection of a maximum color channel code value;

FIG. 54 is a diagram showing various relationships between processed images and display models;

FIG. 55 is a graph of the histogram of image code values for an exemplary image;

FIG. 56 is a graph of an exemplary distortion curve corresponding to the histogram of FIG. 55;

FIG. 57 is a graph showing results of applying an exemplary optimization criterion to a brief DVD clip, this graph plots the selected backlight power against video frame number;

FIG. 58 illustrates a minimum MSE distortion backlight determination for different contrast ratios of an actual display;

FIG. 59 is a graph showing an exemplary panel tone curve and target tone curve;

FIG. 60 is a graph showing an exemplary panel tone curve and target tone curve for a power saving configuration;

FIG. 61 is a graph showing an exemplary panel tone curve and target tone curve for a lower black level configuration;

FIG. 62 is a graph showing an exemplary panel tone curve and target tone curve for a brightness enhancement configuration;

FIG. 63 is a graph showing an exemplary panel tone curve and target tone curve for an enhance image configuration wherein black level is lowered and brightness is enhanced;

FIG. 64 is a graph showing a series of exemplary target tone curves for black level improvement;

FIG. 65 is a graph showing a series of exemplary target tone curves for black level improvement and image brightness enhancement;

FIG. 66 is a chart showing an exemplary embodiment comprising target tone curve determination and distortion-related backlight selection;

FIG. 67 is a chart showing an exemplary embodiment comprising performance-goal-related parameter selection, target tone curve determination and backlight selection;

FIG. 68 is a chart showing an exemplary embodiment comprising performance-goal-related target tone curve determination and backlight selection;

FIG. 69 is a chart showing an exemplary embodiment comprising performance-goal-related and image-related target tone curve determination and backlight selection;

FIG. 70 is a chart showing an exemplary embodiment comprising frequency decomposition and tonescale processing with bit-depth extension;

FIG. 71 is a chart showing an exemplary embodiment comprising frequency decomposition and color enhancement;

FIG. 72 is a chart showing an exemplary embodiment comprising color enhancement, backlight selection and high-pass gain processes;

FIG. 73 is a chart showing an exemplary embodiment comprising color enhancement, histogram generation, tonescale processing and backlight selection;

FIG. 74 is a chart showing an exemplary embodiment comprising skin-color detection and skin-color map refinement;

FIG. 75 is a chart showing an exemplary embodiment comprising color enhancement and bit-depth extension;

FIG. 76 is a chart showing an exemplary embodiment comprising color enhancement, tonescale processing and bit-depth extension;

FIG. 77 is a chart showing an exemplary embodiment comprising color enhancement; and FIG. 78 is a chart showing an exemplary embodiment comprising color enhancement and bit-depth extension.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Display devices using light valve modulators, such as LC modulators and other modulators may be reflective, wherein light is radiated onto the front surface (facing a viewer) and reflected back toward the viewer after passing through the modulation panel layer. Display devices may also be transmissive, wherein light is radiated onto the back of the modulation panel layer and allowed to pass through the modulation layer toward the viewer. Some display devices may also be transflexive, a combination of reflective and transmissive, wherein light may pass through the modulation layer from back to front while light from another source is reflected after entering from the front of the modulation layer. In any of these cases, the elements in the modulation layer, such as the individual LC elements, may control the perceived brightness of a pixel.

In backlit, front-lit and side-lit displays, the light source may be a series of fluorescent tubes, an LED array or some other source. Once the display is larger than a typical size of about 18", the majority of the power consumption for the device is due to the light source. For certain applications, and in certain markets, a reduction in power consumption is important. However, a reduction in power means a reduction in the light flux of the light source, and thus a reduction in the maximum brightness of the display.

A basic equation relating the current gamma-corrected light valve modulator's gray-level code values, CV, light source level, $L_{source}$, and output light level, $L_{out}$, is:

$$L_{out}=L_{source}*g(CV+\mathrm{dark})^{\gamma}+\mathrm{ambient} \quad \text{Equation 1}$$

Where g is a calibration gain, dark is the light valve's dark level, and ambient is the light hitting the display from the room conditions. From this equation, it can be seen that reducing the backlight light source by x % also reduces the light output by x %.

The reduction in the light source level can be compensated by changing the light valve's modulation values; in particular, boosting them. In fact, any light level less than (1−x %) can be reproduced exactly while any light level above (1−x %) cannot be reproduced without an additional light source or an increase in source intensity.

Setting the light output from the original and reduced sources gives a basic code value correction that may be used to correct code values for an x % reduction (assuming dark and ambient are 0) is:

$$L_{out}=L_{source}*g(CV)^{\gamma}=L_{reduced}*g(CV_{boost})^{\gamma} \quad \text{Equation 2}$$

$$CV_{boost}=CV*(L_{source}/L_{reducced})^{1/\gamma}=CV*(1/x\ \%)^{1/\gamma} \quad \text{Equation 3}$$

Figure 1:
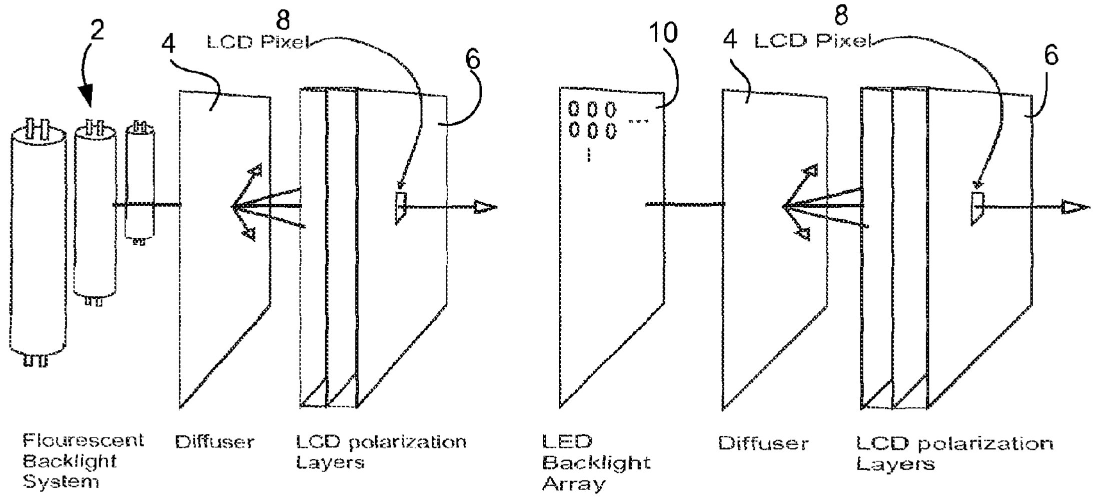
FIG. 1 is a diagram showing prior art backlit LCD systems.
Figure 2A:
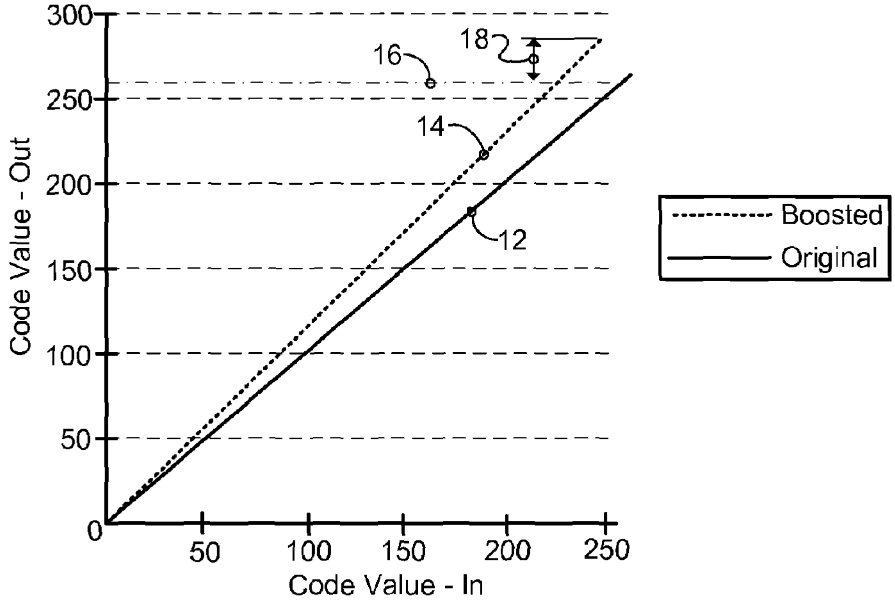
FIG. 2A is a chart showing the relationship between original image code values and boosted image code values.
Figure 2B:
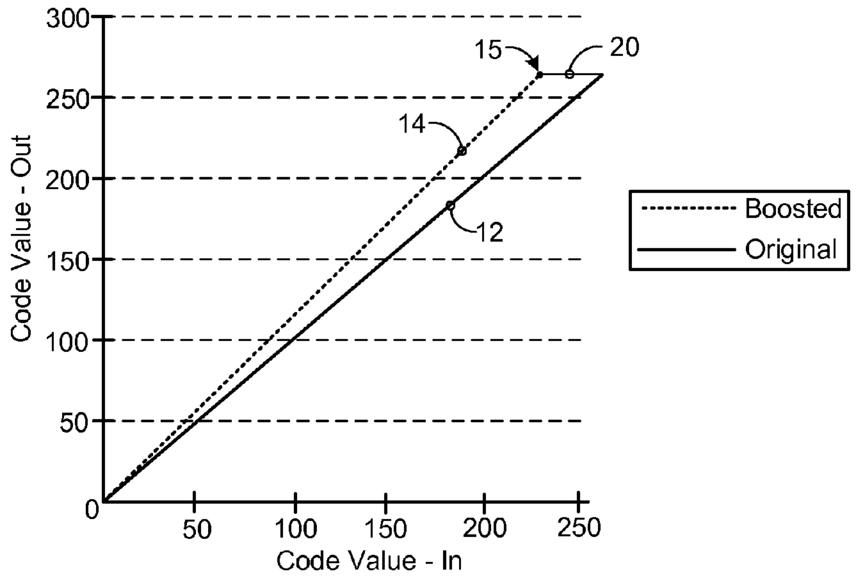
FIG. 2B is a chart showing the relationship between original image code values and boosted image code values with clipping.

FIG. 2A illustrates this adjustment. In FIGS. 2A and 2B, the original display values correspond to points along line 12. When the backlight or light source is placed in power-save mode and the light source illumination is reduced, the display code values need to be boosted to allow the light valves to counteract the reduction in light source illumination. These boosted values coincide with points along line 14. However, this adjustment results in code values 18 higher than the display is capable of producing (e.g., 255 for an 8 bit display). Consequently, these values end up being clipped 20 as illustrated in FIG. 2B. Images adjusted in this way may suffer from washed out highlights, an artificial look, and generally low quality.

Using this simple adjustment model, code values below the clipping point 15 (input code value 230 in this exemplary embodiment) will be displayed at a luminance level equal to the level produced with a full power light source while in a reduced source light illumination mode. The same luminance is produced with a lower power resulting in power savings. If the set of code values of an image are confined to the range below the clipping point 15 the power savings mode can be operated transparently to the user. Unfortunately, when values exceed the clipping point 15, luminance is reduced and detail is lost. Embodiments of the present invention provide an algorithm that can alter the LCD or light valve code values to provide increased brightness (or a lack of brightness reduction in power save mode) while reducing clipping artifacts that may occur at the high end of the luminance range.

Some embodiments of the present invention may eliminate the reduction in brightness associated with reducing display light source power by matching the image luminance displayed with low power to that displayed with full power for a significant range of values. In these embodiments, the reduction in source light or backlight power which divides the output luminance by a specific factor is compensated for by a boost in the image data by a reciprocal factor.

Ignoring dynamic range constraints, the images displayed under full power and reduced power may be identical because the division (for reduced light source illumination) and multiplication (for boosted code values) essentially cancel across a significant range. Dynamic range limits may cause clipping artifacts whenever the multiplication (for code value boost) of the image data exceeds the maximum of the display. Clipping artifacts caused by dynamic range constraints may be eliminated or reduced by rolling off the boost at the upper end of code values. This roll-off may start at a maximum fidelity point (MFP) above which the luminance is no longer matched to the original luminance.

In some embodiments of the present invention, the following steps may be executed to compensate for a light source illumination reduction or a virtual reduction for image enhancement:

1) A source light (backlight) reduction level is determined in terms of a percentage of luminance reduction;
2) A Maximum Fidelity Point (MFP) is determined at which a roll-off from matching reduced-power output to full-power output occurs;
3) Determine a compensating tone scale operator;
   a. Below the MFP, boost the tone scale to compensate for a reduction in display luminance;
   b. Above the MFP, roll off the tone scale gradually (in some embodiments, keeping continuous derivatives);
4) Apply tone scale mapping operator to image; and
5) Send to the display.

The primary advantage of these embodiments is that power savings can be achieved with only small changes to a narrow category of images. (Differences only occur above the MFP and consist of a reduction in peak brightness and some loss of bright detail). Image values below the MFP can be displayed in the power savings mode with the same luminance as the full power mode making these areas of an image indistinguishable from the full power mode.

Some embodiments of the present invention may use a tone scale map that is dependent upon the power reduction and display gamma and which is independent of image data. These embodiments may provide two advantages. Firstly, flicker artifacts which may arise due to processing frames differently do not arise, and, secondly, the algorithm has a very low implementation complexity. In some embodiments, an off-line tone scale design and on-line tone scale mapping may be used. Clipping in highlights may be controlled by the specification of the MFP.

Figure 3:
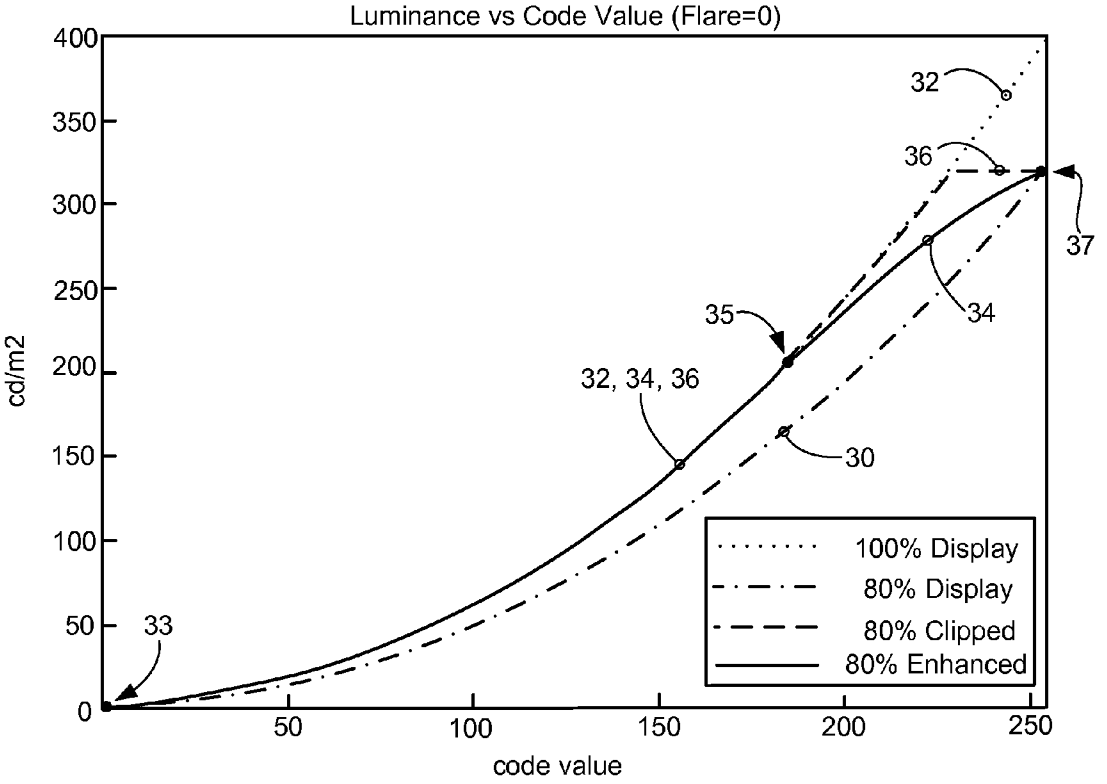
FIG. 3 is a chart showing the luminance level associated with code values for various code value modification schemes.

Some aspects of embodiments of the present invention may be described in relation to FIG. 3. FIG. 3 is a graph showing image code values plotted against luminance for several situations. A first curve 32, shown as dotted, represents the original code values for a light source operating at 100% power. A second curve 30, shown as a dash-dot curve, represents the luminance of the original code values when the light source operates at 80% of full power. A third curve 36, shown as a dashed curve, represents the luminance when code values are boosted to match the luminance provided at 100% light source illumination while the light source operates at 80% of full power. A fourth curve 34, shown as a solid line, represents the boosted data, but with a roll-off curve to reduce the effects of clipping at the high end of the data.

In this exemplary embodiment, shown in FIG. 3, an MFP 35 at code value 180 was used. Note that below code value 180, the boosted curve 34 matches the luminance output 32 by the original 100% power display. Above 180, the boosted curve smoothly transitions to the maximum output allowed on the 80% display. This smoothness reduces clipping and quantization artifacts. In some embodiments, the tone scale function may be defined piecewise to match smoothly at the transition point given by the MFP 35. Below the MFP 35, the boosted tone scale function may be used. Above the MFP 35, a curve is fit smoothly to the end point of boosted tone scale curve at the MFP and fit to the end point 37 at the maximum code value [255]. In some embodiments, the slope of the curve may be matched to the slope of the boosted tone scale curve/line at the MFP 35. This may be achieved by matching the slope of the line below the MFP to the slope of the curve above the MFP by equating the derivatives of the line and curve functions at the MFP and by matching the values of the line and curve functions at that point. Another constraint on the curve function may be that it be forced to pass through the maximum value point [255,255] 37. In some embodiments the slope of the curve may be set to 0 at the maximum value point 37. In some embodiments, an MFP value of 180 may correspond to a light source power reduction of 20%.

In some embodiments of the present invention, the tone scale curve may be defined by a linear relation with gain, g, below the Maximum Fidelity Point (MFP). The tone scale may be further defined above the MFP so that the curve and its first derivative are continuous at the MFP. This continuity implies the following form on the tone scale function:

Equation 4

$$y = \begin{cases} g \cdot x & x < MFP \\ C + B \cdot (x - MFP) + A \cdot (x - MFP)^2 & x \geq MFP \end{cases}$$

$$C = g \cdot MFP$$

$$B = g$$

$$A = \frac{\mathrm{Max} - (C + B \cdot (\mathrm{Max} - MFP)}{(\mathrm{Max} - MFP)^2}$$

$$A = \frac{\mathrm{Max} - g \cdot \mathrm{Max}}{(\mathrm{Max} - MFP)^2}$$

$$A = \frac{\mathrm{Max} \cdot (1 - g)}{(\mathrm{Max} - MFP)^2}$$

$$y = \begin{cases} g \cdot x & x < MFP \\ g \cdot x + \mathrm{Max} \cdot (1 - g) \cdot \left(\frac{x - MFP}{\mathrm{Max} - MFP}\right)^2 & x \geq MFP \end{cases}$$

The gain may be determined by display gamma and brightness reduction ratio as follows:

Equation 5

$$g = \left(\frac{FullPower}{ReducedPower}\right)^{\frac{1}{\gamma}}$$

In some embodiments, the MFP value may be tuned by hand balancing highlight detail preservation with absolute brightness preservation.

The MFP can be determined by imposing the constraint that the slope be zero at the maximum point. This implies:

Equation 6

$$\mathrm{slope} = \begin{cases} g & x < MFP \\ g + 2 \cdot \mathrm{Max} \cdot (1 - g) \cdot \frac{x - MFP}{(\mathrm{Max} - MFP)^2} & x \geq MFP \end{cases}$$

$$\mathrm{slope}(\mathrm{Max}) = g + 2 \cdot \mathrm{Max} \cdot (1 - g) \cdot \frac{\mathrm{Max} - MFP}{(\mathrm{Max} - MFP)^2}$$

$$\mathrm{slope}(\mathrm{Max}) = g + \frac{2 \cdot \mathrm{Max} \cdot (1 - g)}{\mathrm{Max} - MFP}$$

$$\mathrm{slope}(\mathrm{Max}) = \frac{g \cdot (\mathrm{Max} - MFP) + 2 \cdot \mathrm{Max} \cdot (1 - g)}{\mathrm{Max} - MFP}$$

$$\mathrm{slope}(\mathrm{Max}) = \frac{2 \cdot \mathrm{Max} - g \cdot (\mathrm{Max} + MFP)}{\mathrm{Max} - MFP}$$

In some exemplary embodiments, the following equations may be used to calculate the code values for simple boosted data, boosted data with clipping and corrected data, respectively, according to an exemplary embodiment.

Equation 7

$$ToneScale_{boost}(cv) = (1/x)^{1/\gamma} \cdot cv$$

$$ToneScale_{clipped}(cv) = \begin{cases} (1/x)^{1/\gamma} \cdot cv & cv \leq 255 \cdot (x)^{1/\gamma} \\ 255 & \text{otherwise} \end{cases}$$

$$ToneScale_{corrected}(cv) = \begin{cases} (1/x)^{1/\gamma} \cdot cv & cv \leq MFP \\ A \cdot cv^2 + B \cdot cv + C & \text{otherwise} \end{cases}$$

The constants A, B, and C may be chosen to give a smooth fit at the MFP and so that the curve passes through the point [255,255]. Plots of these functions are shown in FIG. 4.

Figure 4:
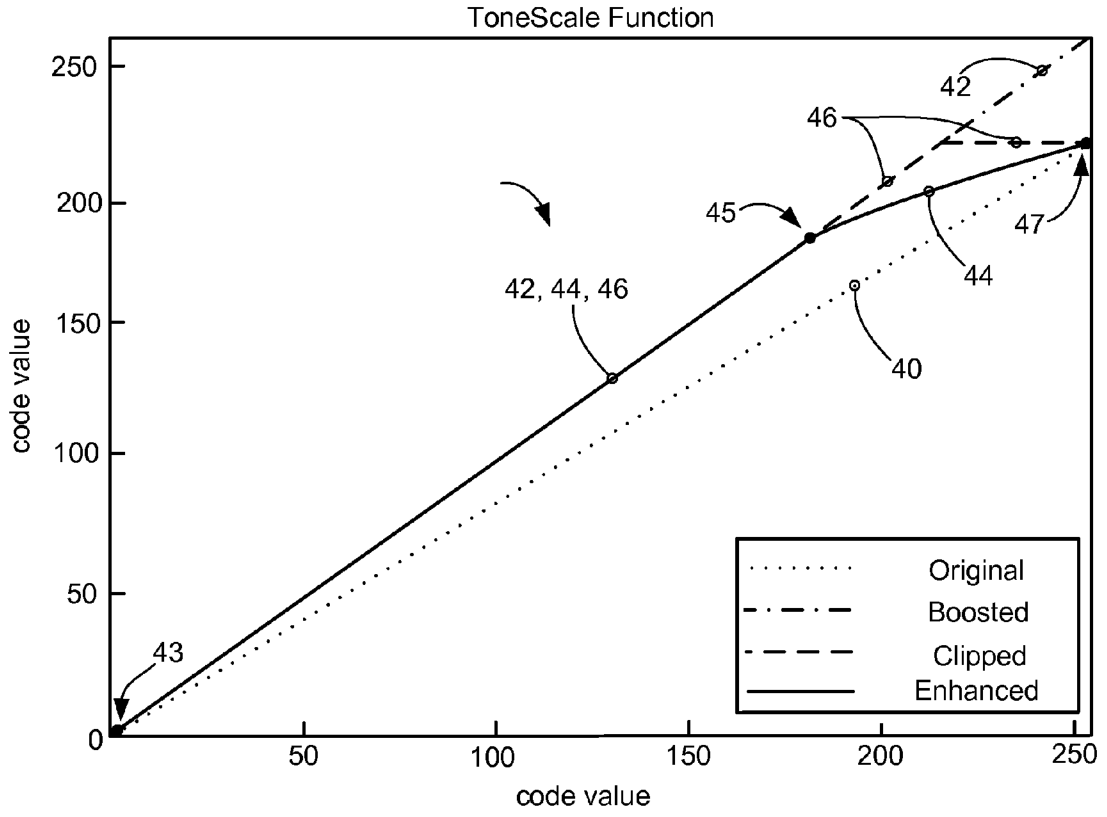
FIG. 4 is a chart showing the relationship between original image code values and modified image code values according to various modification schemes.

FIG. 4 is a plot of original code values vs. adjusted code values. Original code values are shown as points along original data line 40, which shows a 1:1 relationship between adjusted and original values as these values are original without adjustment. According to embodiments of the present invention, these values may be boosted or adjusted to represent higher luminance levels. A simple boost procedure according to the "tonescale boost" equation above, may result in values along boost line 42. Since display of these values will result in clipping, as shown graphically at line 46 and mathematically in the "tonescale clipped" equation above, the adjustment may taper off from a maximum fidelity point 45 along curve 44 to the maximum value point 47. In some embodiments, this relationship may be described mathematically in the "tonescale corrected" equation above.

Using these concepts, luminance values represented by the display with a light source operating at 100% power may be represented by the display with a light source operating at a lower power level. This is achieved through a boost of the tone scale, which essentially opens the light valves further to compensate for the loss of light source illumination. However, a simple application of this boosting across the entire code value range results in clipping artifacts at the high end of the range. To prevent or reduce these artifacts, the tone scale function may be rolled-off smoothly. This roll-off may be controlled by the MFP parameter. Large values of MFP give luminance matches over a wide interval but increase the visible quantization/clipping artifacts at the high end of code values.

Embodiments of the present invention may operate by adjusting code values. In a simple gamma display model, the scaling of code values gives a scaling of luminance values, with a different scale factor. To determine whether this relation holds under more realistic display models, we may consider the Gamma Offset Gain—Flair (GOG-F) model. Scaling the backlight power corresponds to linear reduced equations where a percentage, p, is applied to the output of the display, not the ambient. It has been observed that reducing the gain by a factor p is equivalent to leaving the gain unmodified and scaling the data, code values and offset, by a factor determined by the display gamma. Mathematically, the multiplicative factor can be pulled into the power function if suitably modified. This modified factor may scale both the code values and the offset.

$$L = G\cdot(CV+\text{dark})^{\gamma}+\text{ambient} \qquad \text{Equation 8 GOG-F model}$$

$$L_{Linear\ reduced} = p\cdot G\cdot(CV+\text{dark})^{\gamma}+\text{ambient} \qquad \text{Equation 9 Linear Luminance Reduction}$$

$$L_{Linear\ reduced} = G\cdot(p^{1/\gamma}\cdot(CV+\text{dark}))^{\gamma}+\text{ambient}$$

$$L_{Linear\ reduced} = G\cdot(p^{1/\gamma}\cdot CV+p^{1/\gamma}\cdot\text{dark})^{\gamma}+\text{ambient}$$

$$L_{CV\ reduced} = G\cdot(p^{1/\gamma}\cdot CV+\text{dark})^{\gamma}+\text{ambient} \qquad \text{Equation 10 Code Value Reduction}$$

Figure 5:
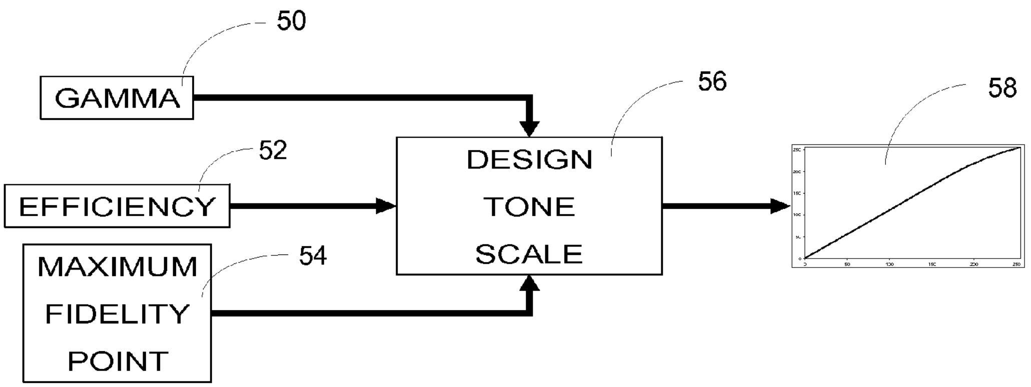
FIG. 5 is a diagram showing the generation of an exemplary tone scale adjustment model.

Some embodiments of the present invention may be described with reference to FIG. 5. In these embodiments, a tone scale adjustment may be designed or calculated off-line, prior to image processing, or the adjustment may be designed or calculated on-line as the image is being processed. Regardless of the timing of the operation, the tone scale adjustment 56 may be designed or calculated based on at least one of a display gamma 50, an efficiency factor 52 and a maximum fidelity point (MFP) 54. These factors may be processed in the tone scale design process 56 to produce a tone scale adjustment model 58. The tone scale adjustment model may take the form of an algorithm, a look-up table (LUT) or some other model that may be applied to image data.

Figure 6:
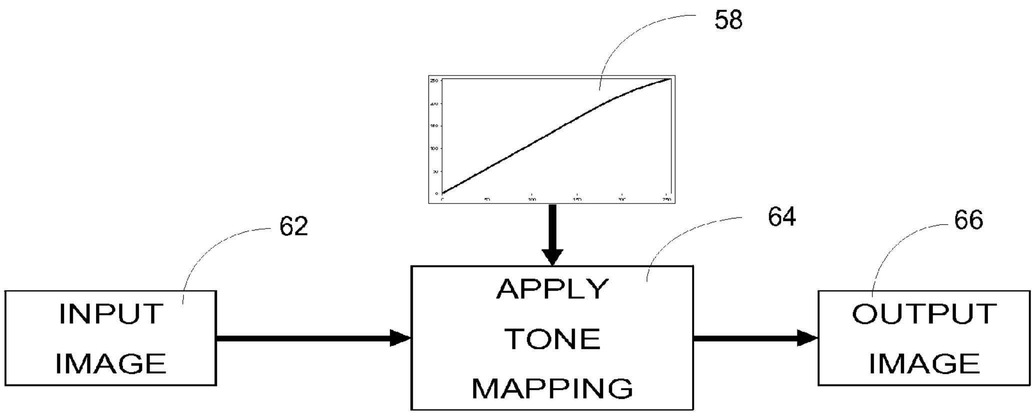
FIG. 6 is a diagram showing an exemplary application of a tone scale adjustment model.

Once the adjustment model 58 has been created, it may be applied to the image data. The application of the adjustment model may be described with reference to FIG. 6. In these embodiments, an image is input 62 and the tone scale adjustment model 58 is applied 64 to the image to adjust the image code values. This process results in an output image 66 that may be sent to a display. Application 64 of the tone scale adjustment is typically an on-line process, but may be performed in advance of image display when conditions allow.

Some embodiments of the present invention comprise systems and methods for enhancing images displayed on displays using light-emitting pixel modulators, such as LED displays, plasma displays and other types of displays. These same systems and methods may be used to enhance images displayed on displays using light-valve pixel modulators with light sources operating in full power mode or otherwise.

These embodiments work similarly to the previously-described embodiments, however, rather than compensating for a reduced light source illumination, these embodiments simply increase the luminance of a range of pixels as if the light source had been reduced. In this manner, the overall brightness of the image is improved.

In these embodiments, the original code values are boosted across a significant range of values. This code value adjustment may be carried out as explained above for other embodiments, except that no actual light source illumination reduction occurs. Therefore, the image brightness is increased significantly over a wide range of code values.

Some of these embodiments may be explained with reference to FIG. 3 as well. In these embodiments, code values for an original image are shown as points along curve 30. These values may be boosted or adjusted to values with a higher luminance level. These boosted values may be represented as points along curve 34, which extends from the zero point 33 to the maximum fidelity point 35 and then tapers off to the maximum value point 37.

Some embodiments of the present invention comprise an unsharp masking process. In some of these embodiments the unsharp masking may use a spatially varying gain. This gain may be determined by the image value and the slope of the modified tone scale curve. In some embodiments, the use of a gain array enables matching the image contrast even when the image brightness cannot be duplicated due to limitations on the display power.

Some embodiments of the present invention may take the following process steps:

1. Compute a tone scale adjustment model;
2. Compute a High Pass image;
3. Compute a Gain array;
4. Weight High Pass Image by Gain;
5. Sum Low Pass Image and Weighted High Pass Image; and
6. Send to the display Other embodiments of the present invention may take the following process steps:

1. Compute a tone scale adjustment model;
2. Compute Low Pass image;
3. Compute High Pass image as difference between Image and Low Pass image;
4. Compute Gain array using image value and slope of modified Tone Scale Curve;
5. Weight High Pass Image by Gain;
6. Sum Low Pass Image and Weighted High Pass Image; and
7. Send to the reduced power display.

Using some embodiments of the present invention, power savings can be achieved with only small changes on a narrow category of images. (Differences only occur above the MFP and consist of a reduction in peak brightness and some loss of bright detail). Image values below the MFP can be displayed in the power savings mode with the same luminance as the full power mode making these areas of an image indistinguishable from the full power mode. Other embodiments of the present invention improve this performance by reducing the loss of bright detail.

These embodiments may comprise spatially varying unsharp masking to preserve bright detail. As with other embodiments, both an on-line and an off-line component may be used. In some embodiments, an off-line component may be extended by computing a gain map in addition to the Tone Scale function. The gain map may specify an unsharp filter gain to apply based on an image value. A gain map value may be determined using the slope of the Tone Scale function. In some embodiments, the gain map value at a particular point "P" may be calculated as the ratio of the slope of the Tone Scale function below the MFP to the slope of the Tone Scale function at point "P." In some embodiments, the Tone Scale function is linear below the MFP, therefore, the gain is unity below the MFP.

Figure 7:
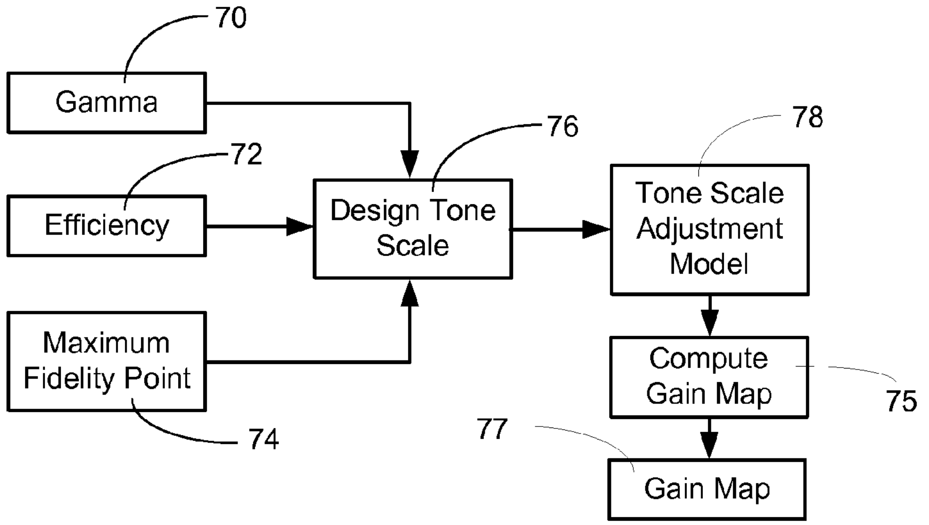
FIG. 7 is a diagram showing the generation of an exemplary tone scale adjustment model and gain map.

Some embodiments of the present invention may be described with reference to FIG. 7. In these embodiments, a tone scale adjustment may be designed or calculated off-line, prior to image processing, or the adjustment may be designed or calculated on-line as the image is being processed. Regardless of the timing of the operation, the tone scale adjustment 76 may be designed or calculated based on at least one of a display gamma 70, an efficiency factor 72 and a maximum fidelity point (MFP) 74. These factors may be processed in the tone scale design process 76 to produce a tone scale adjustment model 78. The tone scale adjustment model may take the form of an algorithm, a look-up table (LUT) or some other model that may be applied to image data as described in relation to other embodiments above. In these embodiments, a separate gain map 77 is also computed 75. This gain map 77 may be applied to specific image subdivisions, such as frequency ranges. In some embodiments, the gain map may be applied to frequency-divided portions of an image. In some embodiments, the gain map may be applied to a high-pass image subdivision. It may also be applied to specific image frequency ranges or other image subdivisions.

Figure 8:
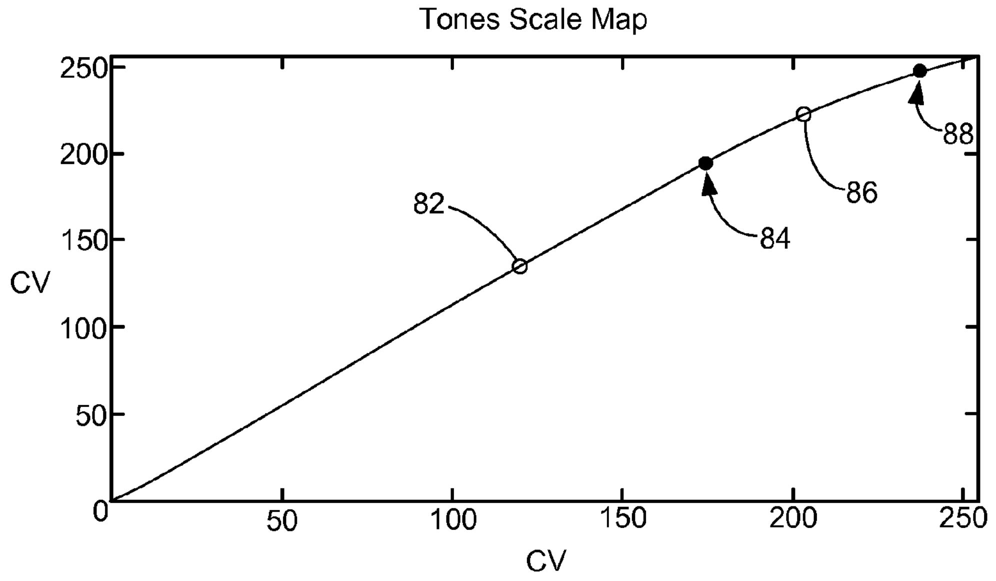
FIG. 8 is a chart showing an exemplary tone scale adjustment model.

An exemplary tone scale adjustment model may be described in relation to FIG. 8. In these exemplary embodiments, a Function Transition Point (FTP) 84 (similar to the MFP used in light source reduction compensation embodiments) is selected and a gain function is selected to provide a first gain relationship 82 for values below the FTP 84. In some embodiments, the first gain relationship may be a linear relationship, but other relationships and functions may be used to convert code values to enhanced code values. Above the FTP 84, a second gain relationship 86 may be used. This second gain relationship 86 may be a function that joins the FTP 84 with a maximum value point 88. In some embodiments, the second gain relationship 86 may match the value and slope of the first gain relationship 82 at the FTP 84 and pass through the maximum value point 88. Other relationships, as described above in relation to other embodiments, and still other relationships may also serve as a second gain relationship 86.

In some embodiments, a gain map 77 may be calculated in relation to the tone scale adjustment model, as shown in FIG. 8. An exemplary gain map 77, may be described in relation to FIG. 9. In these embodiments, a gain map function relates to the tone scale adjustment model 78 as a function of the slope of the tone scale adjustment model. In some embodiments, the value of the gain map function at a specific code value is determined by the ratio of the slope of the tone scale adjustment model at any code value below the FTP to the slope of the tone scale adjustment model at that specific code value. In some embodiments, this relationship may be expressed mathematically in equation 11:

$$\mathrm{Gain}(cv) = \frac{ToneScaleSlope(1)}{ToneScaleSlope(cv)} \qquad \text{Equation 11}$$

In these embodiments, the gain map function is equal to one below the FTP where the tone scale adjustment model results in a linear boost. For code values above the FTP, the gain map function increases quickly as the slope of the tone scale adjustment model tapers off. This sharp increase in the gain map function enhances the contrast of the image portions to which it is applied.

Figure 9:
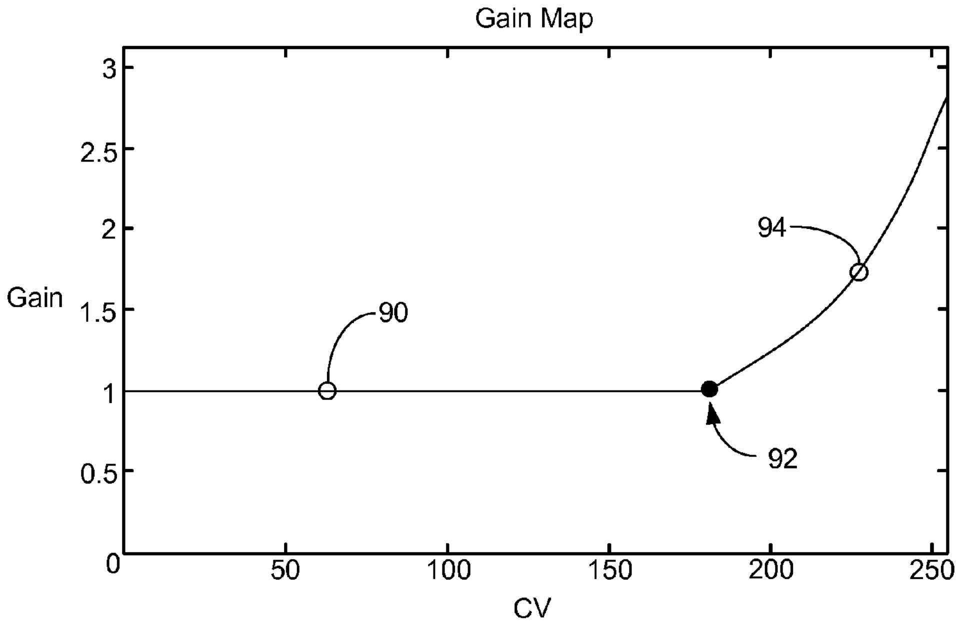
FIG. 9 is a chart showing an exemplary gain map.

The exemplary tone scale adjustment factor illustrated in FIG. 8 and the exemplary gain map function illustrated in FIG. 9 were calculated using a display percentage (source light reduction) of 80%, a display gamma of 2.2 and a Maximum Fidelity Point of 180.

In some embodiments of the present invention, an unsharp masking operation may be applied following the application of the tone scale adjustment model. In these embodiments, artifacts are reduced with the unsharp masking technique.

Figure 10:
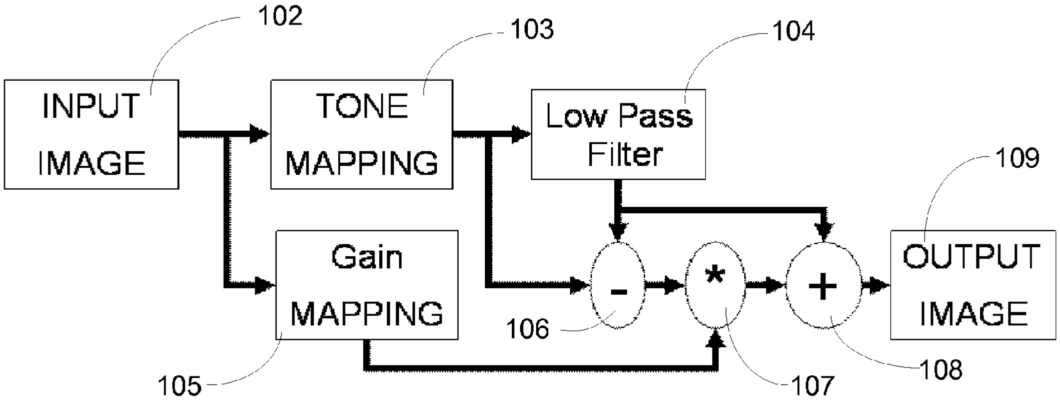
FIG. 10 is a flow chart showing an exemplary process wherein a tone scale adjustment model and gain map are applied to an image.

Some embodiments of the present invention may be described in relation to FIG. 10. In these embodiments, an original image 102 is input and a tone scale adjustment model 103 is applied to the image. The original image 102 is also used as input to a gain mapping process 105 which results in a gain map. The tone scale adjusted image is then processed through a low pass filter 104 resulting in a low-pass adjusted image. The low pass adjusted image is then subtracted 106 from the tone scale adjusted image to yield a high-pass adjusted image. This high-pass adjusted image is then multiplied 107 by the appropriate value in the gain map to provide a gain-adjusted high-pass image which is then added 108 to the low-pass adjusted image, which has already been adjusted with the tone scale adjustment model. This addition results in an output image 109 with increased brightness and improved high-frequency contrast.

In some of these embodiments, for each component of each pixel of the image, a gain value is determined from the Gain map and the image value at that pixel. The original image 102, prior to application of the tone scale adjustment model, may be used to determine the Gain. Each component of each pixel of the high-pass image may also be scaled by the corresponding gain value before being added back to the low pass image. At points where the gain map function is one, the unsharp masking operation does not modify the image values. At points where the gain map function exceeds one, the contrast is increased.

Some embodiments of the present invention address the loss of contrast in high-end code values, when increasing code value brightness, by decomposing an image into multiple frequency bands. In some embodiments, a Tone Scale Function may be applied to a low-pass band increasing the brightness of the image data to compensate for source-light luminance reduction on a low power setting or simply to increase the brightness of a displayed image. In parallel, a constant gain may be applied to a high-pass band preserving the image contrast even in areas where the mean absolute brightness is reduced due to the lower display power. The operation of an exemplary algorithm is given by:

1. Perform frequency decomposition of original image
2. Apply brightness preservation, Tone Scale Map, to a Low Pass Image
3. Apply constant multiplier to High Pass Image
4. Sum Low Pass and High Pass Images
5. Send result to the display The Tone Scale Function and the constant gain may be determined off-line by creating a photometric match between the full power display of the original image and the low power display of the process image for source-light illumination reduction applications. The Tone Scale Function may also be determined off-line for brightness enhancement applications.

For modest MFP values, these constant-high-pass gain embodiments and the unsharp masking embodiments are nearly indistinguishable in their performance. These constant-high-pass gain embodiments have three main advantages compared to the unsharp masking embodiments: reduced noise sensitivity, ability to use larger MFP/FTP and use of processing steps currently in the display system. The unsharp masking embodiments use a gain which is the inverse of the slope of the Tone Scale Curve. When the slope of this curve is small, this gain incurs a large amplifying noise. This noise amplification may also place a practical limit on the size of the MFP/FTP. The second advantage is the ability to extend to arbitrary MFP/FTP values. The third advantage comes from examining the placement of the algorithm within a system. Both the constant-high-pass gain embodiments and the unsharp masking embodiments use frequency decomposition. The constant-high-pass gain embodiments perform this operation first while some unsharp masking embodiments first apply a Tone Scale Function before the frequency decomposition. Some system processing such as de-contouring will perform frequency decomposition prior to the brightness preservation algorithm. In these cases, that frequency decomposition can be used by some constant-high-pass embodiments thereby eliminating a conversion step while some unsharp masking embodiments must invert the frequency decomposition, apply the Tone Scale Function and perform additional frequency decomposition.

Some embodiments of the present invention prevent the loss of contrast in high-end code values by splitting the image based on spatial frequency prior to application of the tone scale function. In these embodiments, the tone scale function with roll-off may be applied to the low pass (LP) component of the image. In light-source illumination reduction compensation applications, this will provide an overall luminance match of the low pass image components. In these embodiments, the high pass (HP) component is uniformly boosted (constant gain). The frequency-decomposed signals may be recombined and clipped as needed. Detail is preserved since the high pass component is not passed through the roll-off of the tone scale function. The smooth roll-off of the low pass tone scale function preserves head room for adding the boosted high pass contrast. Clipping that may occur in this final combination has not been found to reduce detail significantly.

Figure 11:
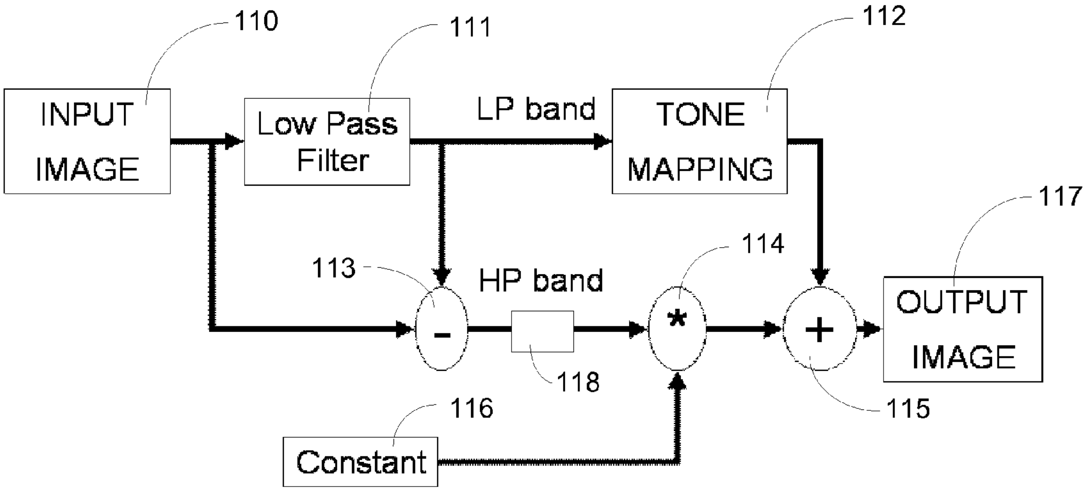
FIG. 11 is a flow chart showing an exemplary process wherein a tone scale adjustment model is applied to one frequency band of an image and a gain map is applied to another frequency band of the image.

Some embodiments of the present invention may be described with reference to FIG. 11. These embodiments comprise frequency splitting or decomposition 111, low-pass tone scale mapping 112, constant high-pass gain or boost 116 and summation or re-combination 115 of the enhanced image components.

In these embodiments, an input image 110 is decomposed into spatial frequency bands 111. In an exemplary embodiment, in which two bands are used, this may be performed using a low-pass (LP) filter 111. The frequency division is performed by computing the LP signal via a filter 111 and subtracting 113 the LP signal from the original to form a high-pass (HP) signal 118. In an exemplary embodiment, spatial 5×5 rect filter may be used for this decomposition though another filter may be used.

The LP signal may then be processed by application of tone scale mapping as discussed for previously described embodiments. In an exemplary embodiment, this may be achieved with a Photometric matching LUT. In these embodiments, a higher value of MFP/FTP can be used compared to some previously described unsharp masking embodiment since most detail has already been extracted in filtering 111. Clipping should not generally be used since some head room should typically be preserved in which to add contrast.

Figure 12:
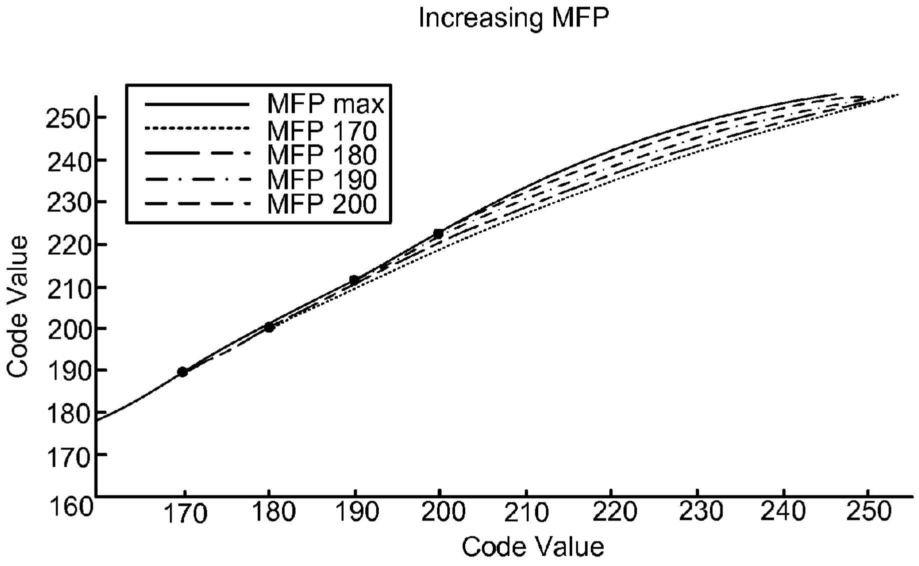
FIG. 12 is a chart showing tone scale adjustment model variations as the MFP changes.

In some embodiments, the MFP/FTP may be determined automatically and may be set so that the slope of the Tone Scale Curve is zero at the upper limit. A series of tone scale functions determined in this manner are illustrated in FIG. 12. In these embodiments, the maximum value of MFP/FTP may be determined such that the tone scale function has slope zero at 255. This is the largest MFP/FTP value that does not cause clipping.

In some embodiments of the present invention, described with reference to FIG. 11, processing the HP signal 118 is independent of the choice of MFP/FTP used in processing the low pass signal. The HP signal 118 is processed with a constant gain 116 which will preserve the contrast when the power/light-source illumination is reduced or when the image code values are otherwise boosted to improve brightness. The formula for the HP signal gain 116 in terms of the full and reduced backlight powers (BL) and display gamma is given immediately below as a high pass gain equation. The HP contrast boost is robust against noise since the gain is typically small (e.g. gain is 1.1 for 80% power reduction and gamma 2.2).

$$HighPassGain = \left(\frac{BL_{Full}}{BL_{Reduced}}\right)^{1/\gamma} \qquad \text{Equation 12}$$

In some embodiments, once the tone scale mapping 112 has been applied to the LP signal, through LUT processing or otherwise, and the constant gain 116 has been applied to the HP signal, these frequency components may be summed 115 and, in some cases, clipped. Clipping may be necessary when the boosted HP value added to the LP value exceeds 255. This will typically only be relevant for bright signals with high contrast. In some embodiments, the LP signal is guaranteed not to exceed the upper limit by the tone scale LUT construction. The HP signal may cause clipping in the sum, but the negative values of the HP signal will never clip maintaining some contrast even when clipping does occur.

Image-Dependent Source Light Embodiments

In some embodiments of the present invention a display light source illumination level may be adjusted according to characteristics of the displayed image, previously-displayed images, images to be displayed subsequently to the displayed image or combinations thereof. In these embodiments, a display light source illumination level may be varied according to image characteristics. In some embodiments, these image characteristics may comprise image luminance levels, image chrominance levels, image histogram characteristics and other image characteristics.

Once image characteristics have been ascertained, the light source (backlight) illumination level may be varied to enhance one or more image attributes. In some embodiments, the light source level may be decreased or increased to enhance contrast in darker or lighter image regions. A light source illumination level may also be increased or decreased to increase the dynamic range of the image. In some embodiments, the light source level may be adjusted to optimize power consumption for each image frame.

When a light source level has been modified, for whatever reason, the code values of the image pixels can be adjusted using a tone-scale adjustment to further improve the image. If the light source level has been reduced to conserve power, the pixel values may be increased to regain lost brightness. If the light source level has been changed to enhance contrast in a specific luminance range, the pixel values may be adjusted to compensate for decreased contrast in another range or to further enhance the specific range.

Figure 13:
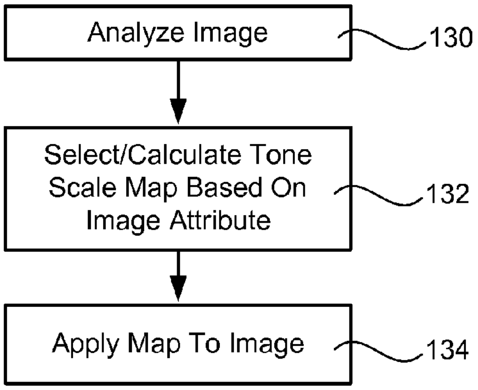
FIG. 13 is a flow chart showing an exemplary image dependent tone scale mapping method.

In some embodiments of the present invention, as illustrated in FIG. 13, image tone scale adjustments may be dependent upon image content. In these embodiments, an image may be analyzed 130 to determine image characteristics. Image characteristics may comprise luminance channel characteristics, such as an Average Picture Level (APL), which is the average luminance of an image; a maximum luminance value; a minimum luminance value; luminance histogram data, such as a mean histogram value, a most frequent histogram value and others; and other luminance characteristics. Image characteristics may also comprise color characteristics, such as characteristic of individual color channels (e.g., R, G & B in an RGB signal). Each color channel can be analyzed independently to determine color channel specific image characteristics. In some embodiments, a separate histogram may be used for each color channel. In other embodiments, blob histogram data which incorporates information about the spatial distribution of image data, may be used as an image characteristic. Image characteristics may also comprise temporal changes between video frames.

Once an image has been analyzed 130 and characteristics have been determined, a tone scale map may be calculated or selected 132 from a set of pre-calculated maps based on the value of the image characteristic. This map may then be applied 134 to the image to compensate for backlight adjustment or otherwise enhance the image.

Figure 14:
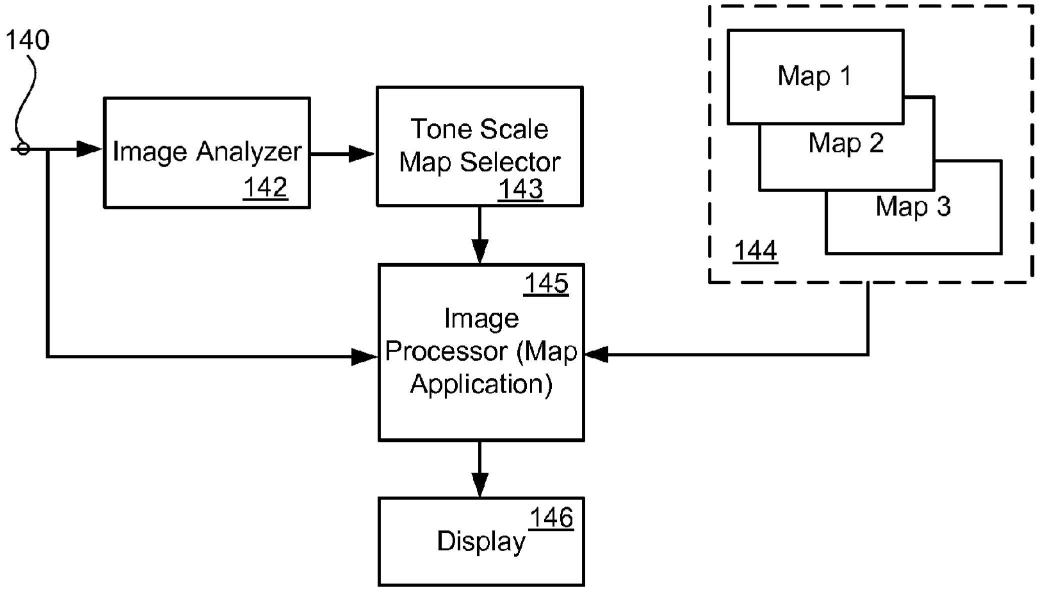
FIG. 14 is a diagram showing exemplary image dependent tone scale selection embodiments.

Some embodiments of the present invention may be described in relation to FIG. 14. In these embodiments, an image analyzer 142 receives an image 140 and determines image characteristics that may be used to select a tone scale map. These characteristics are then sent to a tone scale map selector 143, which determines an appropriate map based on the image characteristics. This map selection may then be sent to an image processor 145 for application of the map to the image 140. The image processor 145 will receive the map selection and the original image data and process the original image with the selected tone scale map 144 thereby generating an adjusted image that is sent to a display 146 for display to a user. In these embodiments, one or more tone scale maps 144 are stored for selection based on image characteristics. These tone scale maps 144 may be pre-calculated and stored as tables or some other data format. These tone scale maps 144 may comprise simple gamma conversion tables, enhancement maps created using the methods described above in relation to FIGS. 5, 7, 10 & 11 or other maps.

Figure 15:
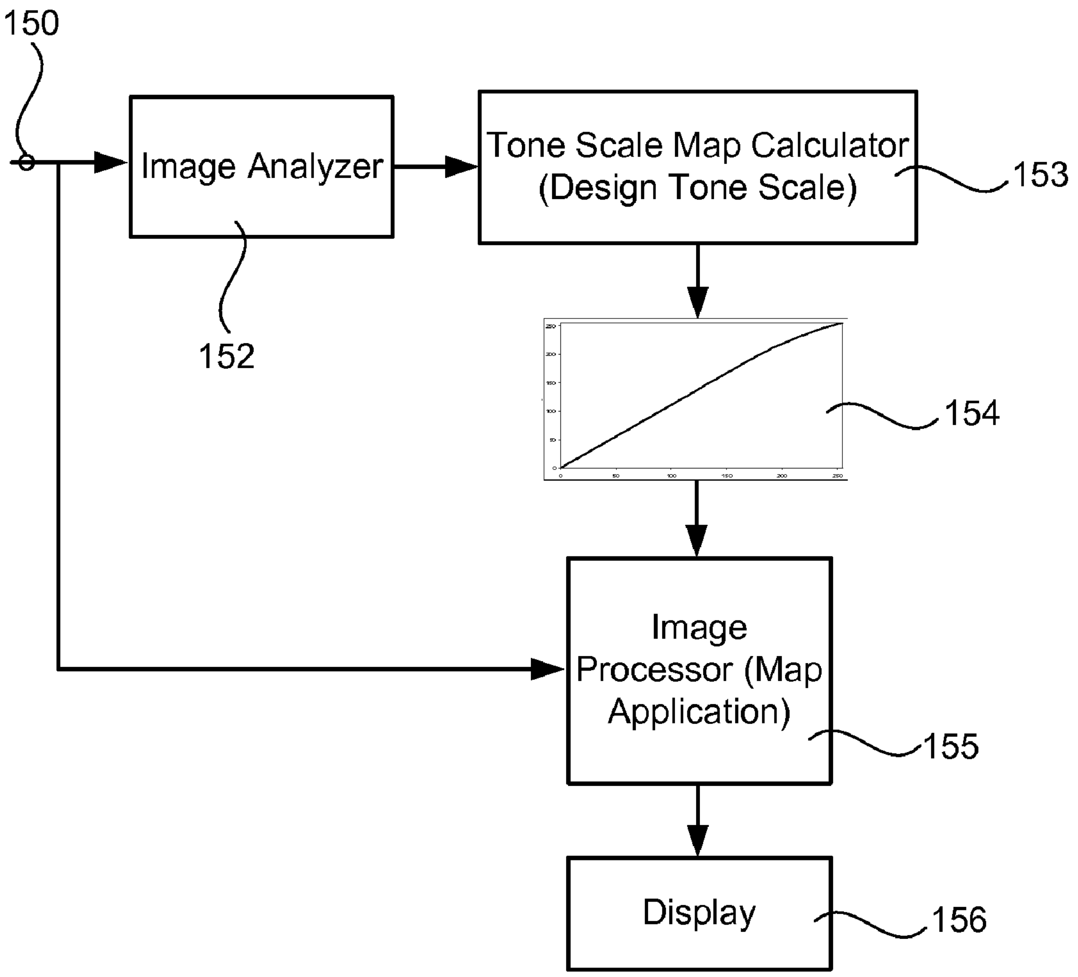
FIG. 15 is a diagram showing exemplary image dependent tone scale map calculation embodiments.

Some embodiments of the present invention may be described in relation to FIG. 15. In these embodiments, an image analyzer 152 receives an image 150 and determines image characteristics that may be used to calculate a tone scale map. These characteristics are then sent to a tone scale map calculator 153, which may calculate an appropriate map based on the image characteristics. The calculated map may then be sent to an image processor 155 for application of the map to the image 150. The image processor 155 will receive the calculated map 154 and the original image data and process the original image with the tone scale map 154 thereby generating an adjusted image that is sent to a display 156 for display to a user. In these embodiments, a tone scale map 154 is calculated, essentially in real-time based on image characteristics. A calculated tone scale map 154 may comprise a simple gamma conversion table, an enhancement map created using the methods described above in relation to FIGS. 5, 7, 10 & 11 or another map.

Figure 16:
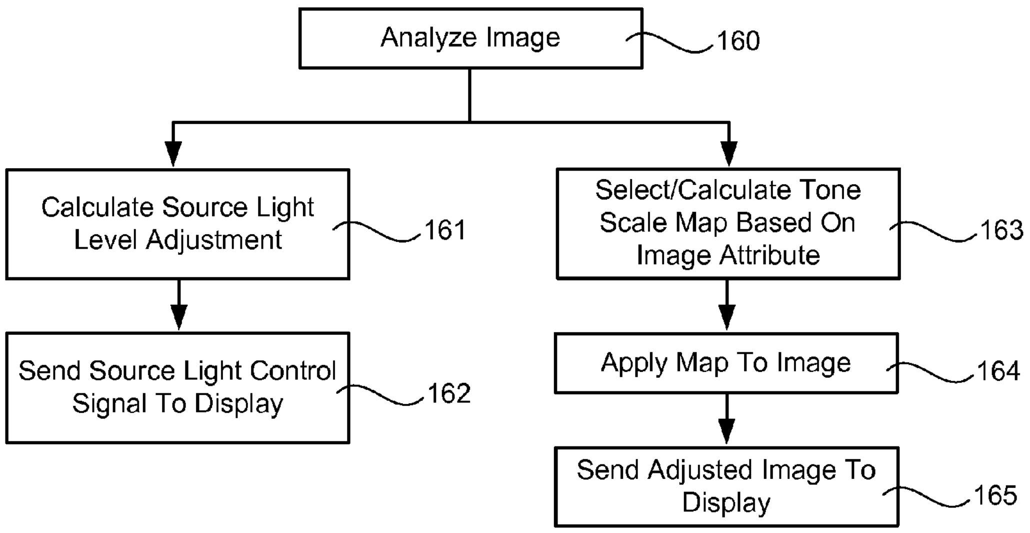
FIG. 16 is a flow chart showing embodiments comprising source light level adjustment and image dependent tone scale mapping.

Further embodiments of the present invention may be described in relation to FIG. 16. In these embodiments a source light illumination level may be dependent on image content while the tone scale map is also dependent on image content. However, there may not necessarily be any communication between the source light calculation channel and the tone scale map channel.

In these embodiments, an image is analyzed 160 to determine image characteristics required for source light or tone scale map calculations. This information is then used to calculate a source light illumination level 161 appropriate for the image. This source light data is then sent 162 to the display for variation of the source light (e.g. backlight) when the image is displayed. Image characteristic data is also sent to a tone scale map channel where a tone scale map is selected or calculated 163 based on the image characteristic information. The map is then applied 164 to the image to produce an enhanced image that is sent to the display 165. The source light signal calculated for the image is synchronized with the enhanced image data so that the source light signal coincides with the display of the enhanced image data.

Figure 17:
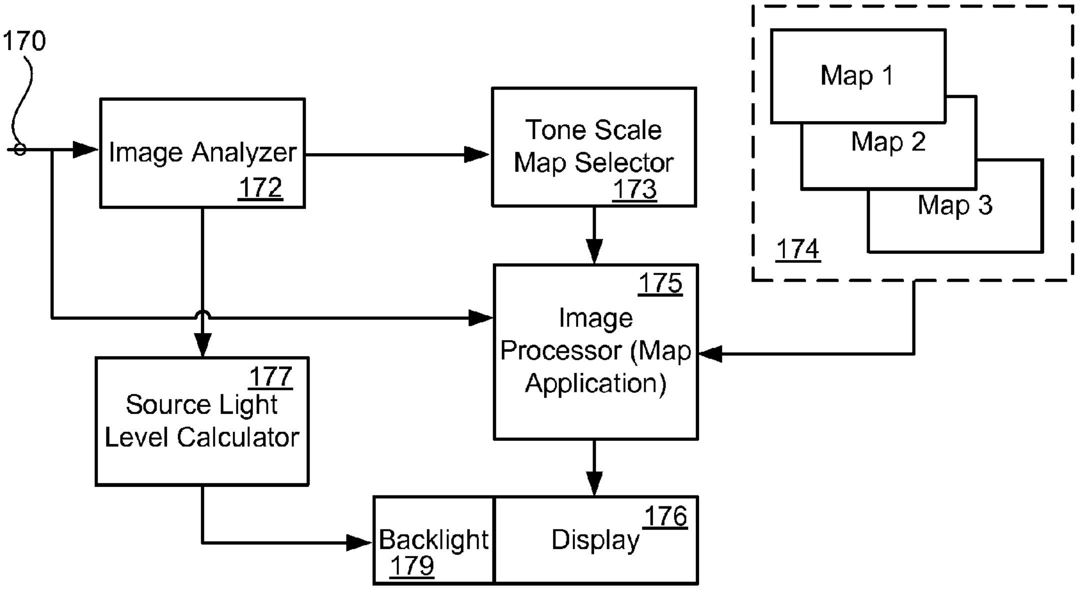
FIG. 17 is a diagram showing exemplary embodiments comprising a source light level calculator and a tone scale map selector.

Some of these embodiments, illustrated in FIG. 17 employ stored tone scale maps which may comprise a simple gamma conversion table, an enhancement map created using the methods described above in relation to FIGS. 5, 7, 10 & 11 or another map. In these embodiments, an image 170 is sent to an image analyzer 172 to determine image characteristics relevant to tone scale map and source light calculations. These characteristics are then sent to a source light calculator 177 for determination of an appropriate source light illumination level. Some characteristics may also be sent to a tone scale map selector 173 for use in determining an appropriate tone scale map 174. The original image 170 and the map selection data are then sent to an image processor 175 which retrieves the selected map 174 and applies the map 174 to the image 170 to create an enhanced image. This enhanced image is then sent to a display 176, which also receives the source light level signal from the source light calculator 177 and uses this signal to modulate the source light 179 while the enhanced image is being displayed.

Figure 18:
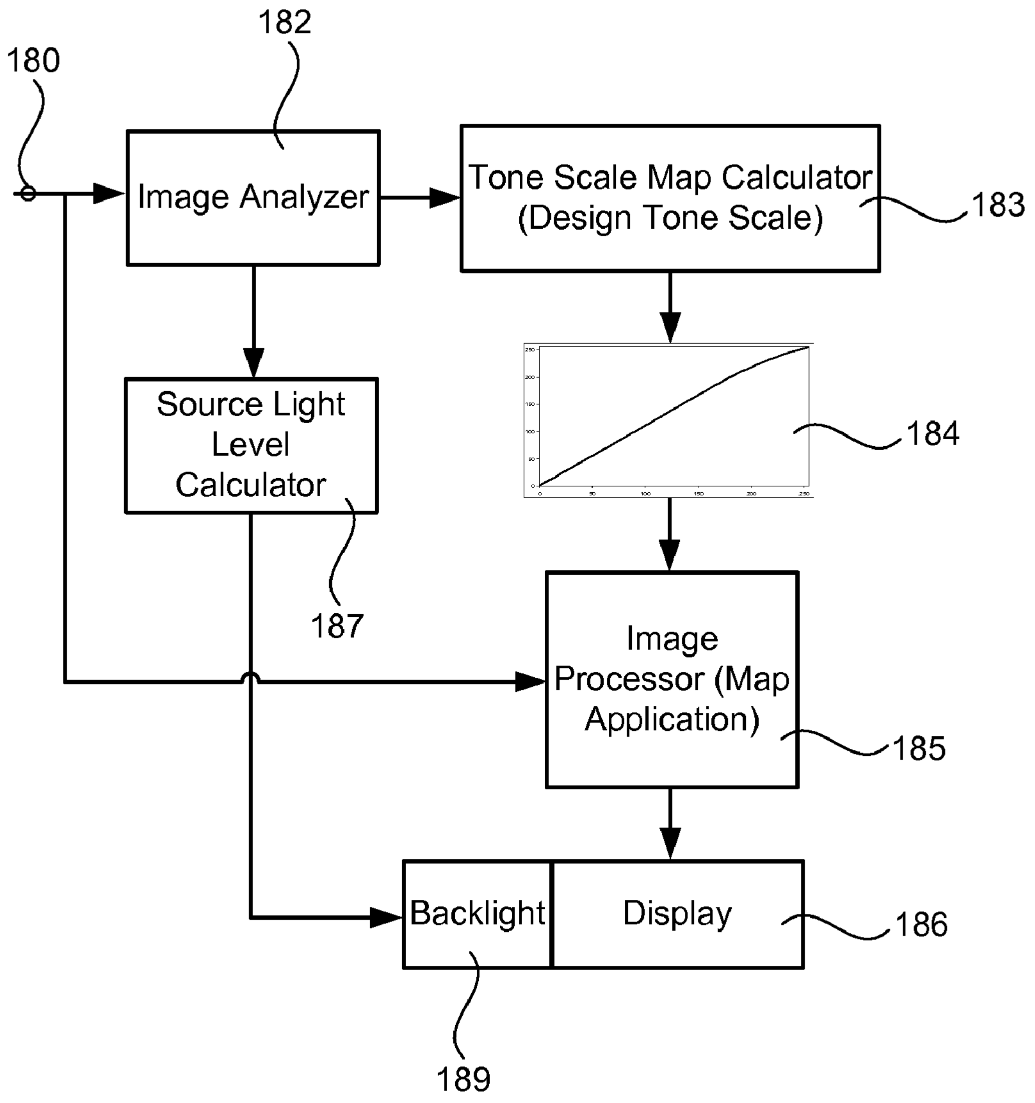
FIG. 18 is a diagram showing exemplary embodiments comprising a source light level calculator and a tone scale map calculator.

Some of these embodiments, illustrated in FIG. 18 may calculate a tone scale map on-the-fly. These maps may comprise a simple gamma conversion table, an enhancement map created using the methods described above in relation to FIGS. 5, 7, 10 & 11 or another map. In these embodiments, an image 180 is sent to an image analyzer 182 to determine image characteristics relevant to tone scale map and source light calculations. These characteristics are then sent to a source light calculator 187 for determination of an appropriate source light illumination level. Some characteristics may also be sent to a tone scale map calculator 183 for use in calculating an appropriate tone scale map 184. The original image 180 and the calculated map 184 are then sent to an image processor 185 which applies the map 184 to the image 180 to create an enhanced image. This enhanced image is then sent to a display 186, which also receives the source light level signal from the source light calculator 187 and uses this signal to modulate the source light 189 while the enhanced image is being displayed.

Figure 19:
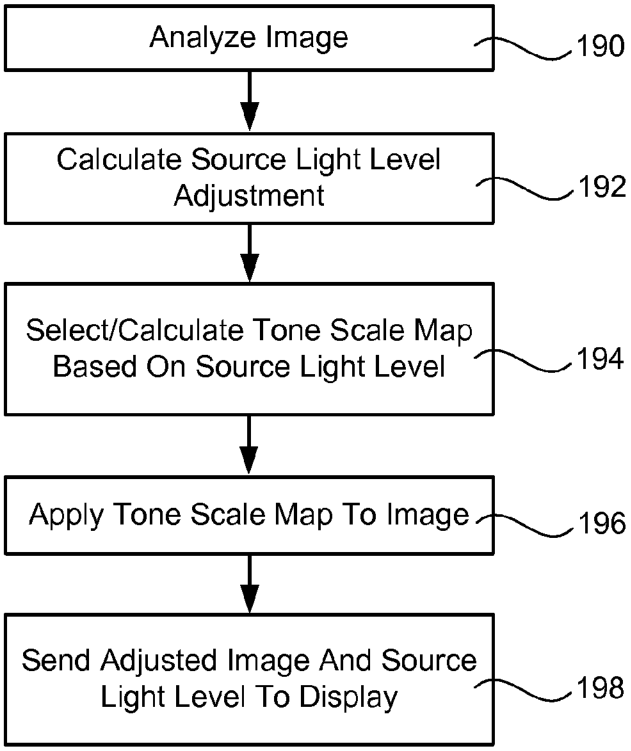
FIG. 19 is a flow chart showing embodiments comprising source light level adjustment and source-light level-dependent tone scale mapping.

Some embodiments of the present invention may be described with reference to FIG. 19. In these embodiments, an image is analyzed 190 to determine image characteristics relative to source light and tone scale map calculation and selection. These characteristics are then used to calculate 192 a source light illumination level. The source light illumination level is then used to calculate or select a tone scale adjustment map 194. This map is then applied 196 to the image to create an enhanced image. The enhanced image and the source light level data are then sent 198 to a display.

Figure 20:
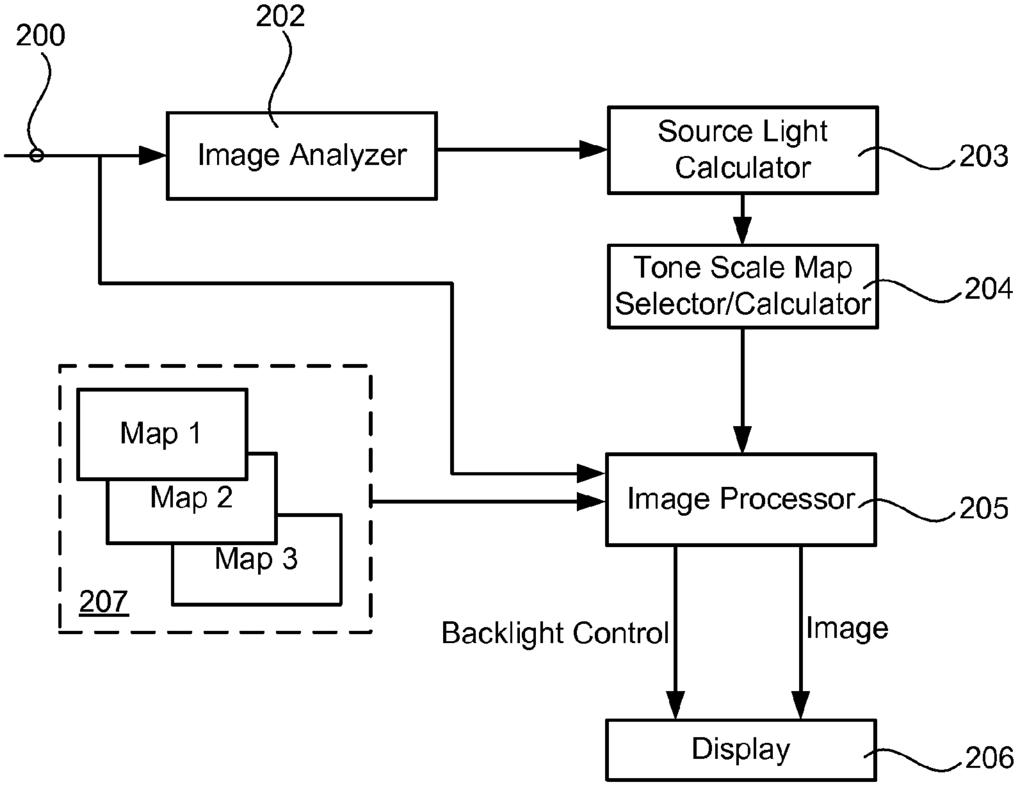
FIG. 20 is a diagram showing embodiments comprising a source light level calculator and source-light level-dependent tone scale calculation or selection.

An apparatus used for the methods described in relation to FIG. 19 may be described with reference to FIG. 20. In these embodiments, an image 200 is received at an image analyzer 202, where image characteristics are determined. The image analyzer 202 may then send image characteristic data to a source light calculator 203 for determination of a source light level. Source light level data may then be sent to a tone scale map selector or calculator 204, which may calculate or select a tone scale map based on the light source level. The selected map 207 or a calculated map may then be sent to an image processor 205 along with the original image for application of the map to the original image. This process will yield an enhanced image that is sent to a display 206 with a source light level signal that is used to modulate the display source light while the image is displayed.

In some embodiments of the present invention, a source light control unit is responsible for selecting a source light reduction which will maintain image quality. Knowledge of the ability to preserve image quality in the adaptation stage is used to guide the selection of source light level. In some embodiments, it is important to realize that a high source light level is needed when either the image is bright or the image contains highly saturated colors i.e. blue with code value 255. Use of only luminance to determine the backlight level may cause artifacts with images having low luminance but large code values i.e. saturated blue or red. In some embodiments each color plane may be examined and a decision may be made based on the maximum of all color planes. In some embodiments, the backlight setting may be based upon a single specified percentage of pixels which are clipped. In other embodiments, illustrated in FIG. 22, a backlight modulation algorithm may use two percentages: the percentage of pixels clipped 236 and the percentage of pixels distorted 235. Selecting a backlight setting with these differing values allows room for the tone scale calculator to smoothly roll-off the tone scale function rather than imposing a hard clip. Given an input image, the histogram of code values for each color plane is determined. Given the two percentages $P_{clipped}$ 236 and $P_{Distored}$ 235, the histogram of each color plane 221-223 is examined to determine the code values corresponding to these percentages 224-226. This gives $C_{Clipped}$(color) 228 and $C_{Distorted}$(color) 227. The maximum clipped code value 234 and the maximum distorted code value 233 among the different color planes may be used to determine the backlight setting 229. This setting ensures that for each color plane at most the specified percentage of code values will be clipped or distorted.

$$Cv_{Clipped}=\max(C_{Clipped}^{color}) \qquad \text{Equation 13}$$

$$Cv_{Distorted}=\max(C_{Distorted}^{color})$$

The backlight (BL) percentage is determined by examining a tone scale (TS) function which will be used for compensation and choosing the BL percentage so that the tone scale function will clip at 255 at code value $Cv_{Clipped}$ 234. The tone scale function will be linear below the value $Cv_{Distorted}$ (the value of this slope will compensate for the BL reduction), constant at 255 for code values above $Cv_{Clipped}$, and have a continuous derivative. Examining the derivative illustrates how to select the lower slope and hence the backlight power which gives no image distortion for code values below $Cv_{Distorted}$.

Figure 21:
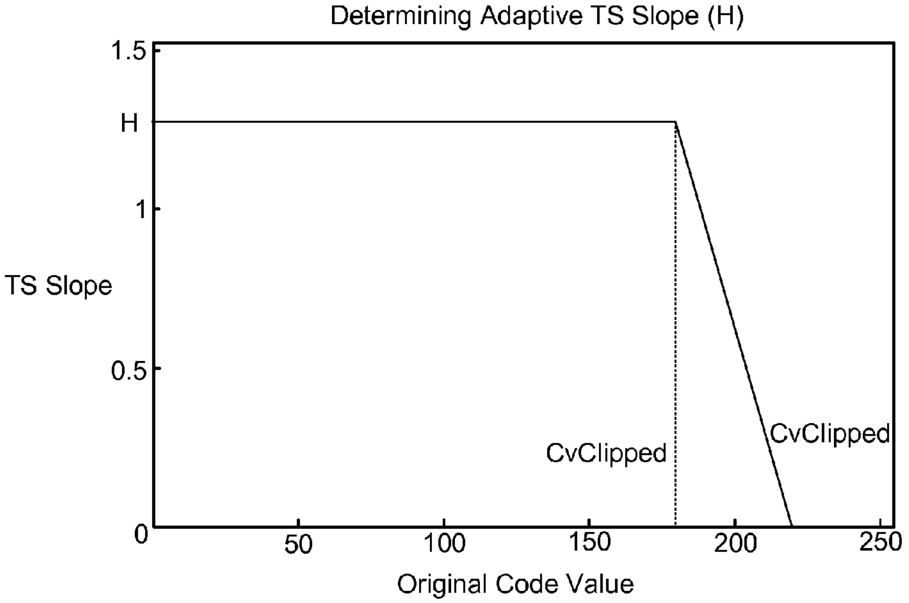
FIG. 21 is a diagram showing a plot of original image code values vs. tone scale slope.

In the plot of the TS derivative, shown in FIG. 21, the value H is unknown. For the TS to map $Cv_{Clipped}$ to 255, the area under the TS derivative must be 255. This constraint allows us to determine the value of H as below.

$$\text{Area} = H \cdot Cv_{Clipped} + \frac{1}{2} \cdot H \cdot (Cv_{Distorted} - Cv_{Clipped}) \qquad \text{Equation 14}$$

$$\text{Area} = \frac{1}{2} \cdot H \cdot (Cv_{Distorted} + Cv_{Clipped})$$

$$H = \frac{2 \cdot \text{Area}}{(Cv_{Distorted} + Cv_{Clipped})}$$

$$H = \frac{2 \cdot 255}{(Cv_{Distorted} + Cv_{Clipped})}$$

The BL percentage is determined from the code value boost and display gamma and the criteria of exact compensation for code values below the Distortion point. The BL ratio which will clip at $Cv_{Clipped}$ and allow a smooth transition from no distortion below $Cv_{Distorted}$ is given by:

$$BacklightRatio = \left(\frac{(CvDistorted + CvClipped)}{2 \cdot 255}\right)^{\gamma} \qquad \text{Equation 15}$$

Additionally to address the issue of BL variation, an upper limit is placed on the BL ratio.

$$BacklightRatio = \mathrm{Min}\left(\left(\frac{(CvDistorted + CvClipped)}{2 \cdot 255}\right)^{\gamma}, MaxBacklightRatio\right) \qquad \text{Equation 16}$$

Figure 22:
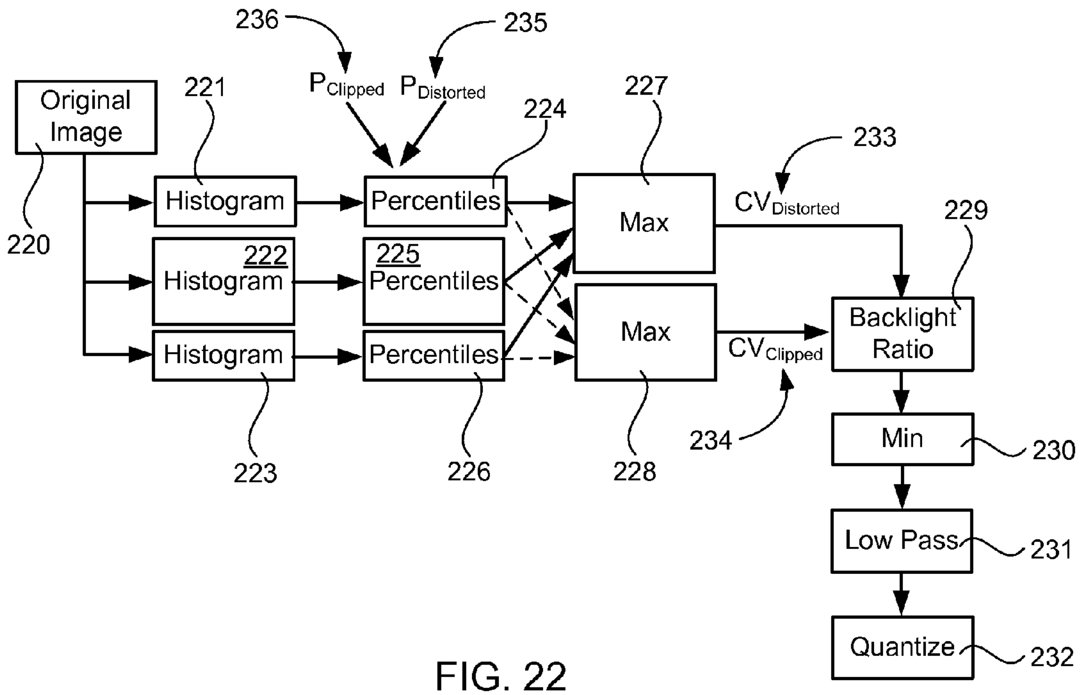
FIG. 22 is a diagram showing embodiments comprising separate chrominance channel analysis.

Temporal low pass filtering 231 may be applied to the image dependant BL signal derived above to compensate for the lack of synchronization between LCD and BL. A diagram of an exemplary backlight modulation algorithm is shown in FIG. 22, differing percentages and values may be used in other embodiments.

Tone scale mapping may compensate for the selected backlight setting while minimizing image distortion. As described above, the backlight selection algorithm is designed based on the ability of the corresponding tone scale mapping operations. The selected BL level allows for a tone scale function which compensates for the backlight level without distortion for code values below a first specified percentile and clips code values above a second specified percentile. The two specified percentiles allow a tone scale function which translates smoothly between the distortion free and clipping ranges.

Ambient-Light-Sensing Embodiments

Some embodiments of the present invention comprise an ambient illumination sensor, which may provide input to an image processing module and/or a source light control module. In these embodiments, the image processing, including tone scale adjustment, gain mapping and other modifications, may be related to ambient illumination characteristics. These embodiments may also comprise source light or backlight adjustment that is related to the ambient illumination characteristics. In some embodiments, the source light and image processing may be combined in a single processing unit. In other embodiments, these functions may be performed by separate units.

Figure 23:
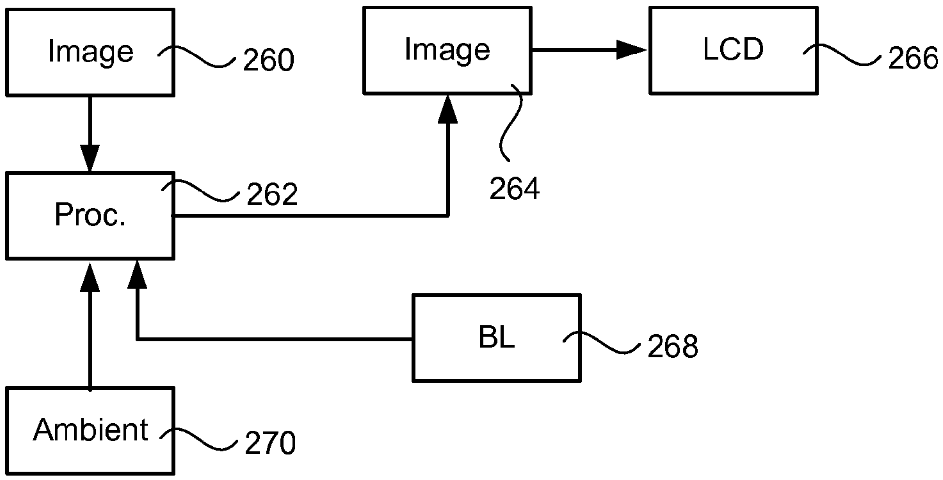
FIG. 23 is a diagram showing embodiments comprising ambient illumination input to the image processing module.

Some embodiments of the present invention may be described with reference to FIG. 23. In these embodiments, an ambient illumination sensor 270 may be used as input for image processing methods. In some exemplary embodiments, an input image 260 may be processed based on input from an ambient illumination sensor 270 and a source light 268 level. A source light 268, such as a back light for illuminating an LCD display panel 266 may be modulated or adjusted to save power or for other reasons. In these embodiments, an image processor 262 may receive input from an ambient illumination sensor 270 and a source light 268. Based on these inputs, the image processor 262 may modify the input image to account for ambient conditions and source light 268 illumination levels. An input image 260 may be modified according to any of the methods described above for other embodiments or by other methods. In an exemplary embodiment, a tone scale map may be applied to the image to increase image pixel values in relation to decreased source light illumination and ambient illumination variations. The modified image 264 may then be registered on a display panel

266, such as an LCD panel. In some embodiments, the source light illumination level may be decreased when ambient light is low and may be further decreased when a tone scale adjustment or other pixel value manipulation technique is used to compensate for the source light illumination decrease. In some embodiments, a source light illumination level may be decreased when ambient illumination decreases. In some embodiments, a source light illumination level may be increased when ambient illumination reaches an upper threshold value and/or a lower threshold value.

Figure 24:
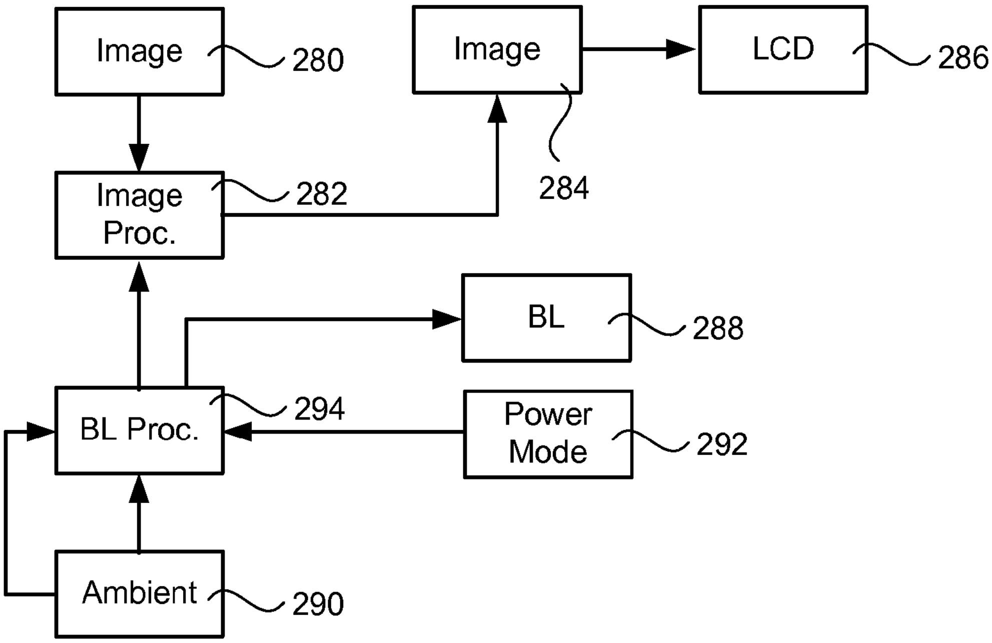
FIG. 24 is a diagram showing embodiments comprising ambient illumination input to the source light processing module.

Further embodiments of the present invention may be described with reference to FIG. 24. In these embodiments, an input image 280 is received at an image processing unit 282. Processing of input image 280 may be dependent on input from an ambient illumination sensor 290. This processing may also be dependent on output from a source light processing unit 294. In some embodiments, a source light processing unit 294 may receive input from an ambient illumination sensor 290. Some embodiments may also receive input from a device mode indicator 292, such as a power mode indicator that may indicate a device power consumption mode, a device battery condition or some other device condition. A source light processing unit 294 may use an ambient light condition and/or a device condition to determine a source light illumination level, which is used to control a source light 288 that will illuminate a display, such as an LCD display 286. The source light processing unit may also pass the source light illumination level and/or other information to the image processing unit 282.

The image processing unit 282 may use source light information from the source light processing unit 294 to determine processing parameters for processing the input image 280. The image processing unit 282 may apply a tone-scale adjustment, gain map or other procedure to adjust image pixel values. In some exemplary embodiments, this procedure will improve image brightness and contrast and partially or wholly compensate for a light source illumination reduction. The result of processing by image processing unit 282 is an adjusted image 284, which may be sent to the display 286 where it may be illuminated by source light 288.

Figure 25:
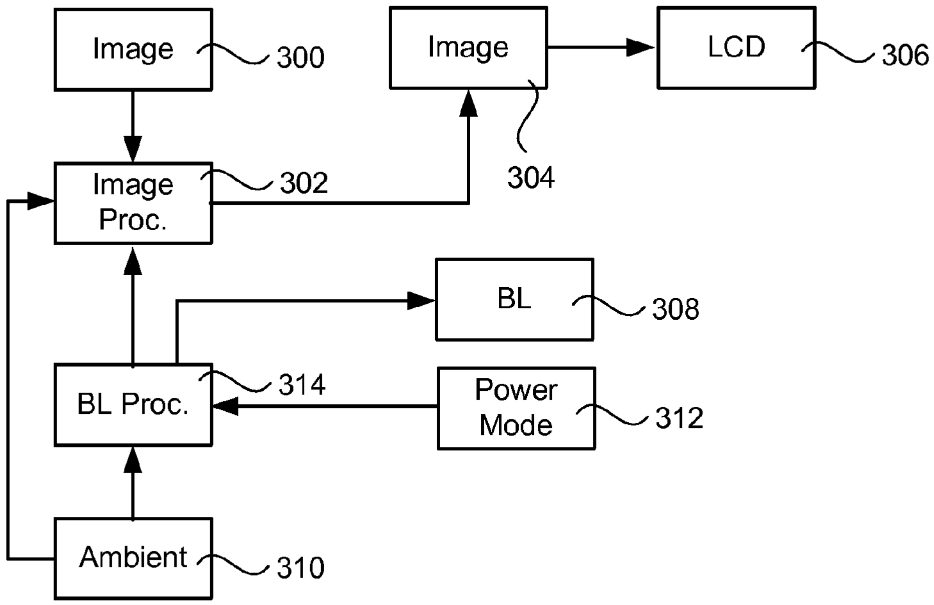
FIG. 25 is a diagram showing embodiments comprising ambient illumination input to the image processing module and device characteristic input.

Other embodiments of the present invention may be described with reference to FIG. 25. In these embodiments, an input image 300 is received at an image processing unit 302. Processing of input image 300 may be dependent on input from an ambient illumination sensor 310. This processing may also be dependent on output from a source light processing unit 314. In some embodiments, a source light processing unit 314 may receive input from an ambient illumination sensor 310. Some embodiments may also receive input from a device mode indicator 312, such as a power mode indicator that may indicate a device power consumption mode, a device battery condition or some other device condition. A source light processing unit 314 may use an ambient light condition and/or a device condition to determine a source light illumination level, which is used to control a source light 308 that will illuminate a display, such as an LCD display 306. The source light processing unit may also pass the source light illumination level and/or other information to the image processing unit 302.

The image processing unit 302 may use source light information from the source light processing unit 314 to determine processing parameters for processing the input image 300. The image processing unit 302 may also use ambient illumination information from the ambient illumination sensor 310 to determine processing parameters for processing the input image 300. The image processing unit 302 may apply a tone-scale adjustment, gain map or other procedure to adjust image pixel values. In some exemplary embodiments, this procedure will improve image brightness and contrast and partially or wholly compensate for a light source illumination reduction. The result of processing by image processing unit 302 is an adjusted image 304, which may be sent to the display 306 where it may be illuminated by source light 308.

Figure 26:
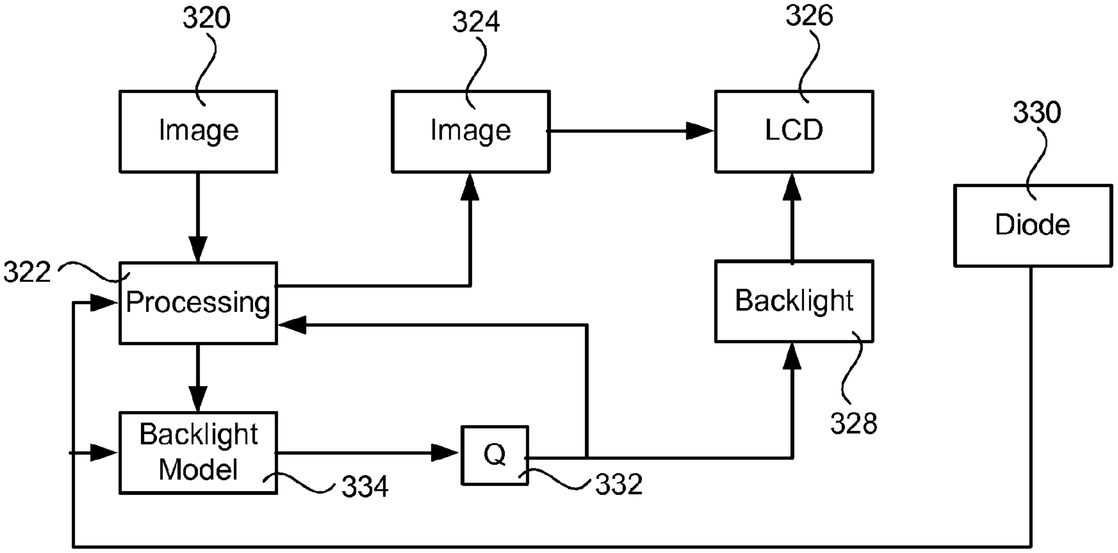
FIG. 26 is a diagram showing embodiments comprising alternative ambient illumination inputs to the image processing module and/or source light processing module and a source light signal post-processor.

Further embodiments of the present invention may be described with reference to FIG. 26. In these embodiments, an input image 320 is received at an image processing unit 322. Processing of input image 320 may be dependent on input from an ambient illumination sensor 330. This processing may also be dependent on output from a source light processing unit 334. In some embodiments, a source light processing unit 334 may receive input from an ambient illumination sensor 330. In other embodiments, ambient information may be received from an image processing unit 322. A source light processing unit 334 may use an ambient light condition and/or a device condition to determine an intermediate source light illumination level. This intermediate source light illumination level may be sent to a source light post-processor 332, which may take the form of a quantizer, a timing processor or some other module that may tailor the intermediate light source illumination level to the needs of a specific device. In some embodiments, the source light post-processor 332 may tailor the light source control signal for timing constraints imposed by the light source 328 type and/or by an imaging application, such as a video application. The post-processed signal may then be used to control a source light 328 that will illuminate a display, such as an LCD display 326. The source light processing unit may also pass the post-processed source light illumination level and/or other information to the image processing unit 322.

The image processing unit 322 may use source light information from the source light post-processor 332 to determine processing parameters for processing the input image 320. The image processing unit 322 may also use ambient illumination information from the ambient illumination sensor 330 to determine processing parameters for processing the input image 320. The image processing unit 322 may apply a tone-scale adjustment, gain map or other procedure to adjust image pixel values. In some exemplary embodiments, this procedure will improve image brightness and contrast and partially or wholly compensate for a light source illumination reduction. The result of processing by image processing unit 322 is an adjusted image 344, which may be sent to the display 326 where it may be illuminated by source light 328.

Some embodiments of the present invention may comprise separate image analysis 342, 362 and image processing 343, 363 modules. While these units may be integrated in a single component or on a single chip, they are illustrated and described as separate modules to better describe their interaction.

Figure 27:
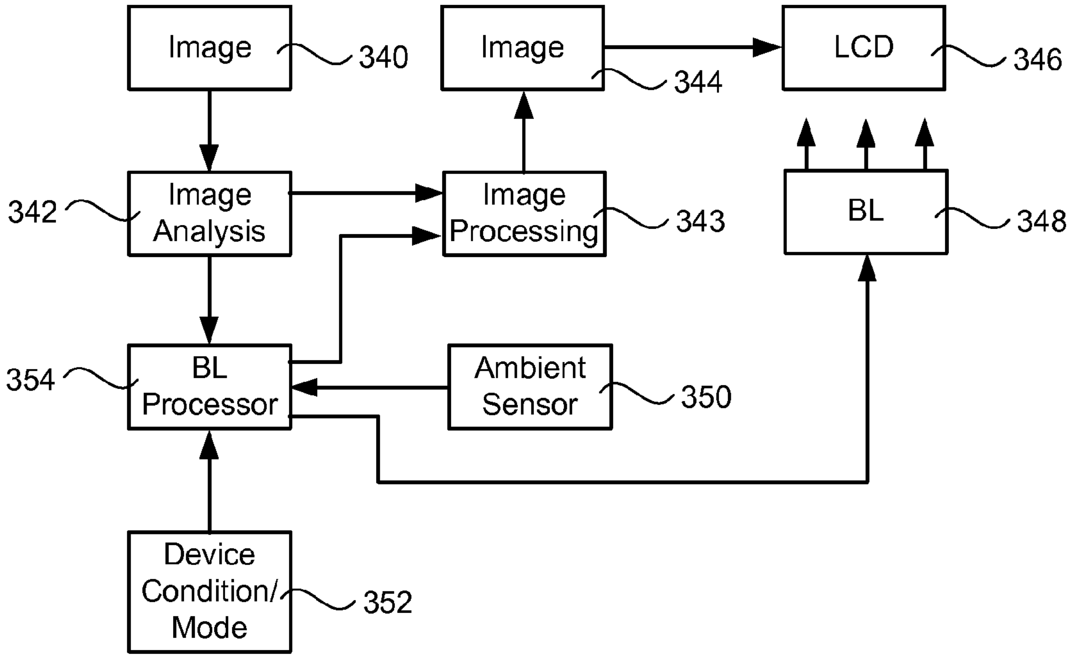
FIG. 27 is a diagram showing embodiments comprising ambient illumination input to a source light processing module, which passes this input to an image processing module.

Some of these embodiments of the present invention may be described with reference to FIG. 27. In these embodiments, an input image 340 is received at an image analysis module 342. The image analysis module may analyze an image to determine image characteristics, which may be passed to an image processing module 343 and/or a source light processing module 354. Processing of input image 340 may be dependent on input from an ambient illumination sensor 330. In some embodiments, a source light processing module 354 may receive input from an ambient illumination sensor 350. A source light processing unit 354 may also receive input from a device condition or mode sensor 352. A source light processing unit 354 may use an ambient light condition, an image characteristic and/or a device condition to determine a source light illumination level. This source light illumination level may be sent to a source light 348 that will illuminate a display, such as an LCD display 346. The source light processing module 354 may also pass the post-processed source light illumination level and/or other information to the image processing module 343.

The image processing module 322 may use source light information from the source light processing module 354 to determine processing parameters for processing the input image 340. The image processing module 343 may also use ambient illumination information that is passed from the ambient illumination sensor 350 through the source light processing module 354. This ambient illumination information may be used to determine processing parameters for processing the input image 340. The image processing module 343 may apply a tone-scale adjustment, gain map or other procedure to adjust image pixel values. In some exemplary embodiments, this procedure will improve image brightness and contrast and partially or wholly compensate for a light source illumination reduction. The result of processing by image processing module 343 is an adjusted image 344, which may be sent to the display 346 where it may be illuminated by source light 348.

Figure 28:
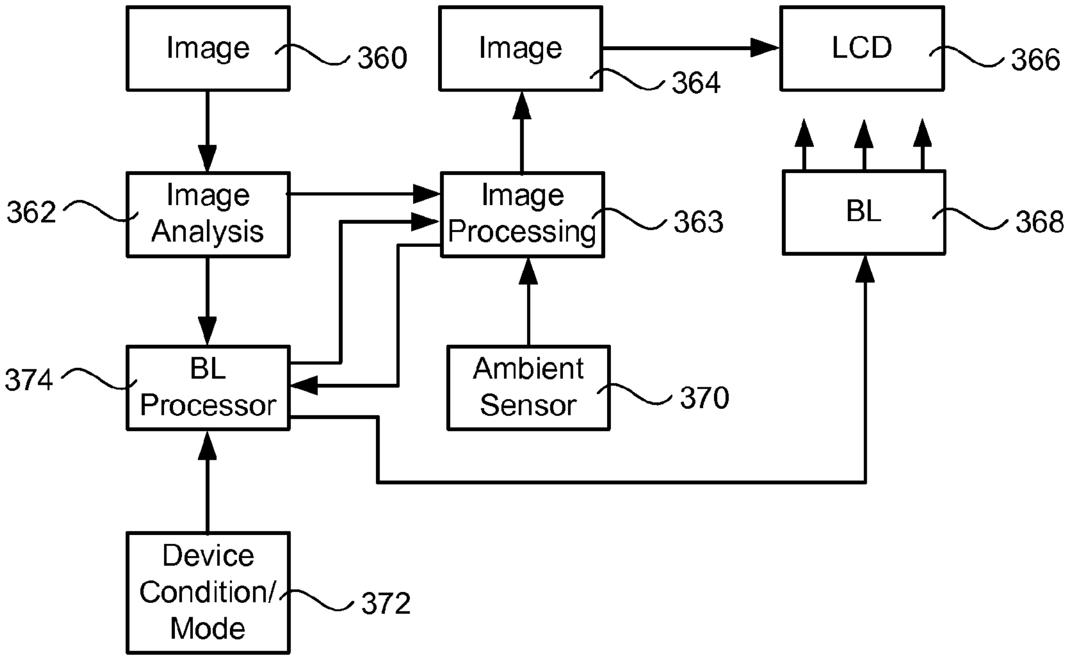
FIG. 28 is a diagram showing embodiments comprising ambient illumination input to an image processing module, which may pass this input to a source light processing module.

Some embodiments of the present invention may be described with reference to FIG. 28. In these embodiments, an input image 360 is received at an image analysis module 362. The image analysis module may analyze an image to determine image characteristics, which may be passed to an image processing module 363 and/or a source light processing module 374. Processing of input image 360 may be dependent on input from an ambient illumination sensor 370. This processing may also be dependent on output from a source light processing module 374. In some embodiments, ambient information may be received from an image processing module 363, which may receive the ambient information from an ambient sensor 370. This ambient information may be passed through and/or processed by the image processing module 363 on the way to the source light processing module 374. A device condition or mode may also be passed to the source light processing module 374 from a device module 372.

A source light processing module 374 may use an ambient light condition and/or a device condition to determine a source light illumination level. This source light illumination level may be used to control a source light 368 that will illuminate a display, such as an LCD display 366. The source light processing unit 374 may also pass the source light illumination level and/or other information to the image processing unit 363.

The image processing module 363 may use source light information from the source light processing module 374 to determine processing parameters for processing the input image 360. The image processing module 363 may also use ambient illumination information from the ambient illumination sensor 370 to determine processing parameters for processing the input image 360. The image processing module 363 may apply a tone-scale adjustment, gain map or other procedure to adjust image pixel values. In some exemplary embodiments, this procedure will improve image brightness and contrast and partially or wholly compensate for a light source illumination reduction. The result of processing by image processing module 363 is an adjusted image 364, which may be sent to the display 366 where it may be illuminated by source light 368.

Distortion-Adaptive Power Management Embodiments

Some embodiments of the present invention comprise methods and systems for addressing the power needs, display characteristics, ambient environment and battery limitations of display devices including mobile devices and applications. In some embodiments, three families of algorithms may be used: Display Power Management Algorithms, Backlight Modulation Algorithms, and Brightness Preservation (BP) Algorithms. While power management has a higher priority in mobile, battery-powered devices, these systems and methods may be applied to other devices that may benefit from power management for energy conservation, heat management and other purposes. In these embodiments, these algorithms may interact, but their individual functionality may comprise:

- Power Management—these algorithms manage backlight power across a series of frames exploiting variations in the video content to optimize power consumption.
- Backlight Modulation—these algorithms select backlight power levels to use for an individual frame and exploit statistics within an image to optimize power consumption.
- Brightness Preservation—these algorithms process each image to compensate for reduced backlight power and preserve image brightness while avoiding artifacts.

Figure 29:
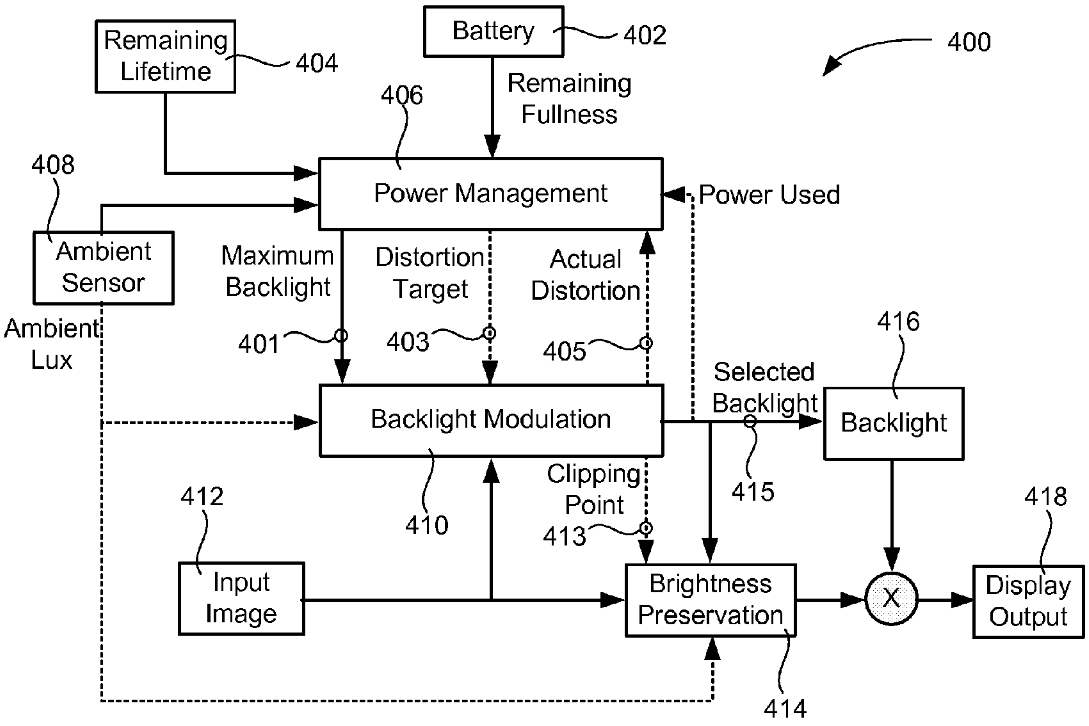
FIG. 29 is a diagram showing embodiments comprising distortion-adaptive power management.

Some embodiments of the present invention may be described with reference to FIG. 29, which comprises a simplified block diagram indicating the interaction of components of these embodiments. In some embodiments, the power management algorithm 406 may manage the fixed battery resource 402 over a video, image sequence or other display task and may guarantee a specified average power consumption while preserving quality and/or other characteristics. The backlight modulation algorithm 410 may receive instructions from the power management algorithm 406 and select a power level subject to the limits defined by the power management algorithm 406 to efficiently represent each image. The brightness preservation algorithm 414 may use the selected backlight level 415, and possible clipping value 413, to process the image compensating for the reduced backlight.

Display Power Management

In some embodiments, the display power management algorithm 406 may manage the distribution of power use over a video, image sequence or other display task. In some embodiments, the display power management algorithm 406 may allocate the fixed energy of the battery to provide a guaranteed operational lifetime while preserving image quality. In some embodiments, one goal of a Power Management algorithm is to provide guaranteed lower limits on the battery lifetime to enhance usability of the mobile device.

Constant Power Management

Figure 30:
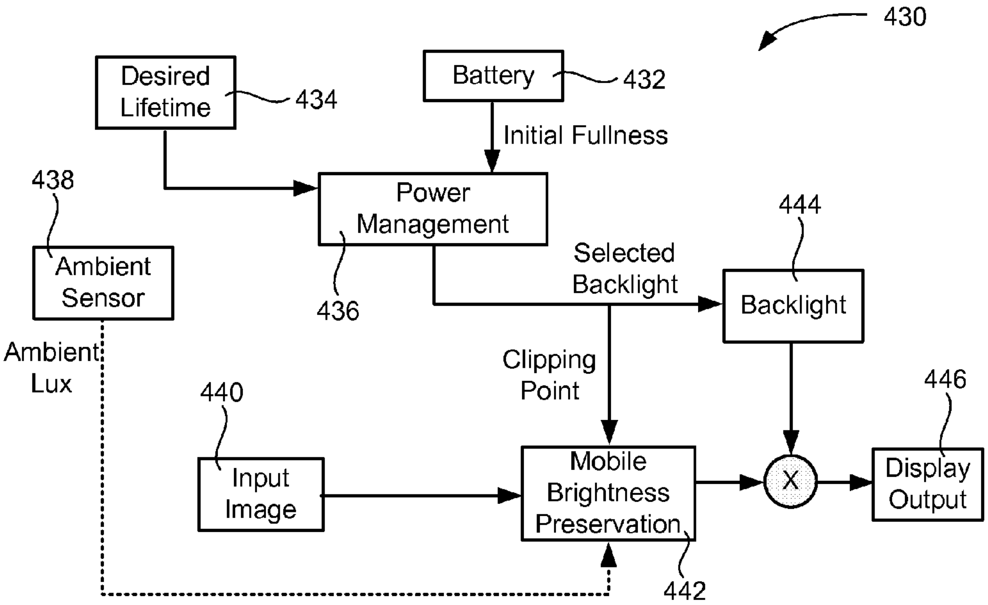
FIG. 30 is a diagram showing embodiments comprising constant power management.

One form of power control which meets an arbitrary target is to select a fixed power which will meet the desired lifetime. A system block diagram showing a system based on constant power management is shown in FIG. 30. The essential point being that the power management algorithm 436 selects a constant backlight power based solely on initial battery fullness 432 and desired lifetime 434. Compensation 442 for this backlight level 444 is performed on each image 446.

Constant Power management Equation 17

$$P_{Selected}(t) = \frac{InitialCharge}{DesiredLifetime}$$

The backlight level 444 and hence power consumption are independent of image data 440. Some embodiments may support multiple constant power modes allowing the selection of power level to be made based on the power mode. In some embodiments, image-dependent backlight modulation may not be used to simplify the system implementation. In other embodiments, a few constant power levels may be set and selected based on operating mode or user preference. Some embodiments may use this concept with a single reduced power level, i.e. 75% of maximum power.

Simple Adaptive Power Management

Figure 31:
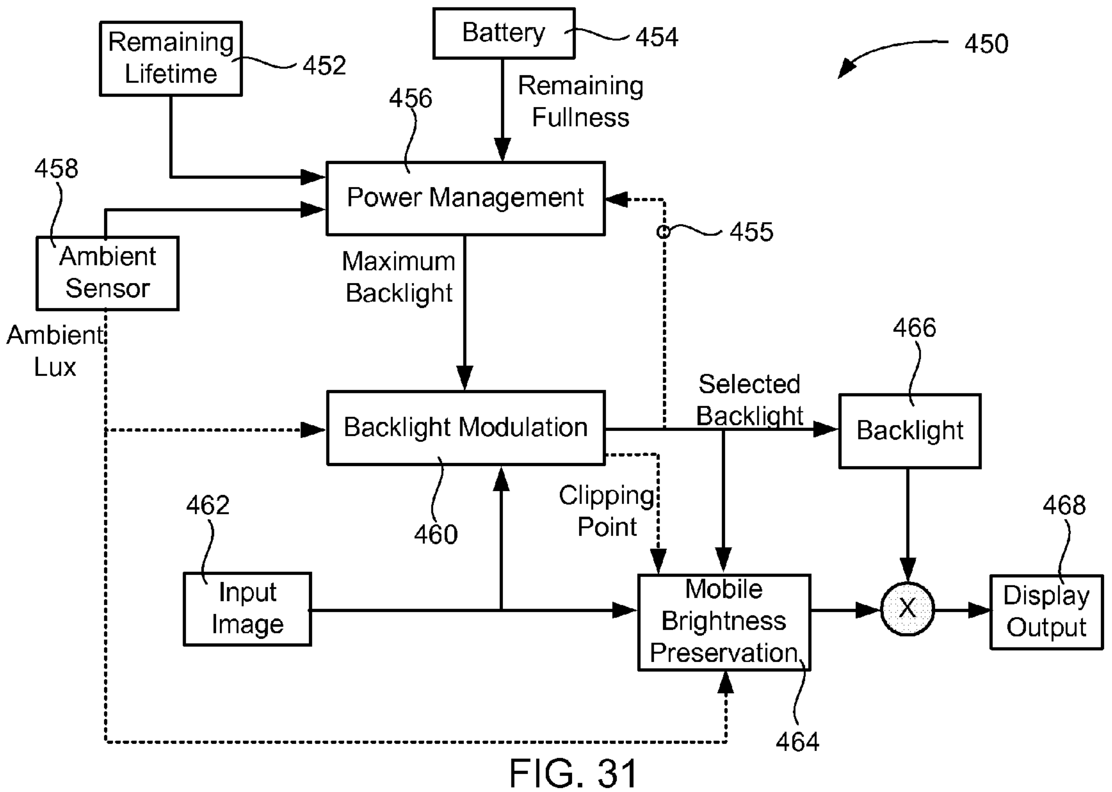
FIG. 31 is a diagram showing embodiments comprising adaptive power management.

Some embodiments of the present invention may be described with reference to FIG. 31. These embodiments comprise an adaptive Power Management algorithm 456. The power reduction 455 due to backlight modulation 460 is fed back to the Power Management algorithm 456 allowing improved image quality while still providing the desired system lifetime.

In some embodiments, the power savings with image-dependant backlight modulation may be included in the power management algorithm by updating the static maximum power calculation over time as in Equation 18. Adaptive power management may comprise computing the ratio of remaining battery fullness (mA-Hrs) to remaining desired lifetime (Hrs) to give an upper power limit (mA) to the backlight modulation algorithm 460. In general, backlight modulation 460 may select an actual power below this maximum giving further power savings. In some embodiments, power savings due to backlight modulation may be reflected in the form of feedback through the changing values of remaining battery charge or running average selected power and hence influence subsequent power management decisions.

Adaptive Power Management — Equation 18

$$P_{Maximum}(t) = \frac{RemainingCharge(t)}{RemainingLifetime(t)}$$

In some embodiments, if battery status information is unavailable or inaccurate, the remaining battery charge can be estimated by computing the energy used by the display, average selected power times operating time, and subtracting this from the initial battery charge.

$$\text{DisplayEnergyUsed}(t) = \text{AverageSelectedPower} \cdot t$$ Equation 19 Estimating Remaining Battery Charge $$\text{RemainingCharge}(t) = \text{InitialCharge} - \text{DisplayEnergyUsed}(t)$$

This latter technique has the advantage of being done without interaction with the battery.

Power-Distortion Management

The inventor has observed, in a study of distortion versus power, that many images exhibit vastly different distortion at the same power. Dim images, those with poor contrast such a underexposed photographs, can actually be displayed better at a low power due to the elevation of the black level that results from high power use. A power control algorithm may trade off image distortion for battery capacity rather than direct power settings. In some embodiments of the present invention, illustrated in FIG. 29, power management techniques may comprise a distortion parameter 403, such as a maximum distortion value, in addition to a maximum power 401 given to the Backlight Control algorithm 410. In these embodiments, the power management algorithm 406 may use feedback from the backlight modulation algorithm 410 in the form of power/distortion characteristics 405 of the current image. In some embodiments, the maximum image distortion may be modified based upon the target power and the power-distortion property of the current frame. In these embodiments, in addition to feedback on the actual selected power, the power management algorithm may select and provide distortion targets 403 and may receive feedback on the corresponding image distortion 405 in addition to feedback on the battery fullness 402. In some embodiments, additional inputs could be used in the power control algorithm such as: ambient level 408, user preference, and operating mode (i.e., Video/Graphics).

Some embodiments of the present invention may attempt to optimally allocate power across a video sequence while preserving display quality. In some embodiments, for a given video sequence, two criteria may be used for selecting a trade-off between total power used and image distortion. Maximum image distortion and average image distortion may be used. In some embodiments, these terms may be minimized. In some embodiments, minimizing maximum distortion over an image sequence may be achieved by using the same distortion for each image in the sequence. In these embodiments, the power management algorithm 406 may select this distortion 403 allowing the backlight modulation algorithm 410 to select the backlight level which meets this distortion target 403. In some embodiments, minimizing the average distortion may be achieved when power selected for each image is such that the slopes of the power distortion curves are equal. In this case, the power management algorithm 406 may select the slope of the power distortion curve relying on the backlight modulation algorithm 410 to select the appropriate backlight level.

Figure 32A:
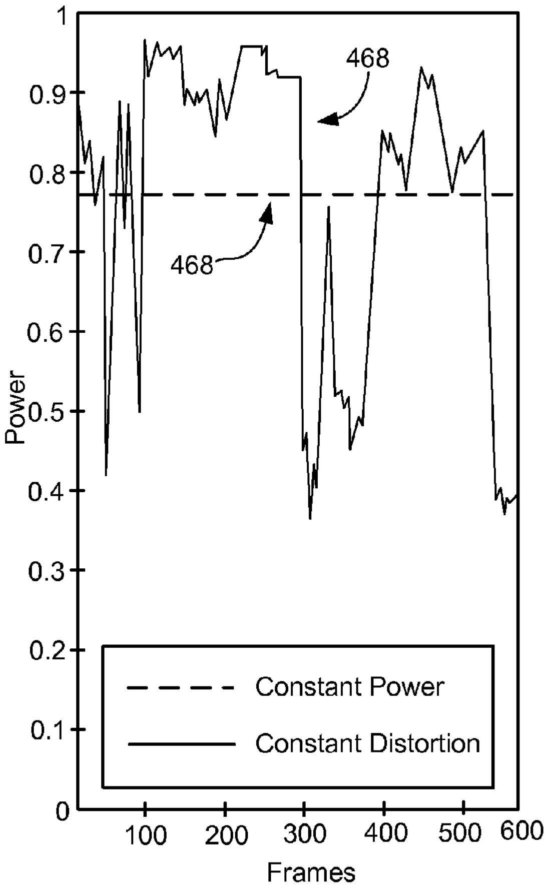
FIG. 32A is a graph showing a comparison of power consumption of constant power and constant distortion models.
Figure 32B:
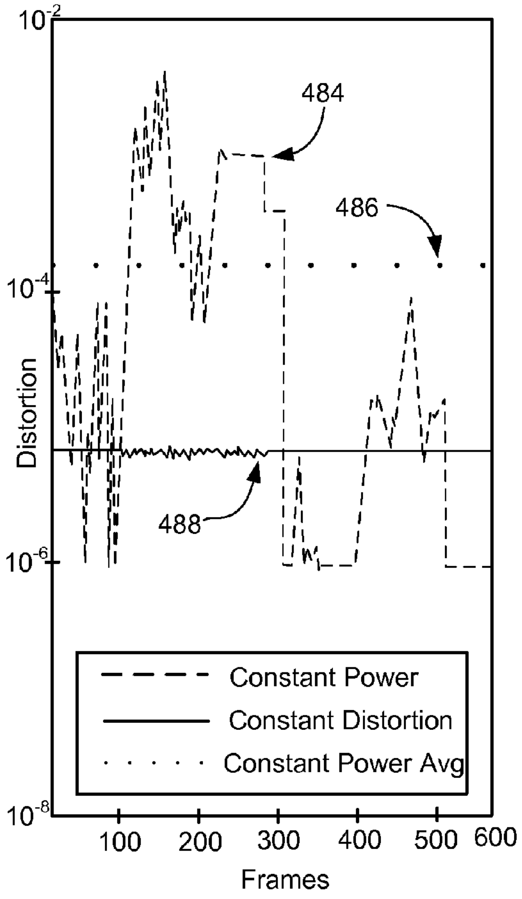
FIG. 32B is a graph showing a comparison of distortion of constant power and constant distortion models.

FIGS. 32A and 32B may be used to illustrate power savings when considering distortion in the power management process. FIG. 32A is a plot of source light power level for sequential frames of an image sequence. FIG. 32A shows the source light power levels needed to maintain constant distortion 480 between frames and the average power 482 of the constant distortion graph. FIG. 32B is a plot of image distortion for the same sequential frames of the image sequence. FIG. 32B shows the constant power distortion 484 resulting from maintaining a constant power setting, the constant distortion level 488 resulting from maintaining constant distortion throughout the sequence and the average constant power distortion 486 when maintaining constant power. The constant power level has been chosen to equal the average power of the constant distortion result. Thus both methods use the same average power. Examining distortion we find that the constant power 484 gives significant variation in image distortion. Note also that the average distortion 486 of the constant power control is more than 10 times the distortion 488 of the constant distortion algorithm despite both using the same average power.

In practice, optimizing to minimize either the maximum or average distortion across a video sequence may prove too complex for some applications as the distortion between the original and reduced power images must be calculated at each point of the power distortion function to evaluate the power-distortion trade-off. Each distortion evaluation may require that the backlight reduction and corresponding compensating image brightening be calculated and compared with the original image. Consequently, some embodiments may comprise simpler methods for calculating or estimating distortion characteristics.

In some embodiments, some approximations may be used. First we observe that a point-wise distortion metric such as a Mean-Square-Error (MSE) can be computed from the histogram of image code values rather than the image itself, as expressed in Equation 20. In this case, the histogram is a one dimensional signal with only 256 values as opposed to an image which at 320×240 resolution has 7680 samples. This could be further reduced by subsampling the histograms if desired.

In some embodiments, an approximation may be made by assuming the image is simply scaled with clipping in the compensation stage rather than applying the actual compensation algorithm. In some embodiments, inclusion of a black level elevation term in the distortion metric may also be valuable. In some embodiments, use of this term may imply that a minimum distortion for an entirely black frame occurs at zero backlight.

Simplifying Distortion Calculation — Equation 20

$$\text{Distortion (Power)} = \sum_{pixels} \|Image_{Original} - \text{Power} \cdot Image_{Brightened}\|^2$$

$$\text{Distortion (Power)} = \sum_{cv \in CodeValues} \text{Histogram}(cv) \cdot \|\text{Display}(cv) - \text{Power} \cdot \text{Display}(\text{Brightened}(cv))\|^2$$

In some embodiments, to compute the distortion at a given power level, for each code value, the distortion caused by a linear boost with clipping may be determined. The distortion may then be weighted by the frequency of the code value and summed to give a mean image distortion at the specified power level. In these embodiments, the simple linear boost for brightness compensation does not give acceptable quality for image display, but serves as a simple source for computing an estimate of the image distortion caused by a change in backlight.

Figure 33:
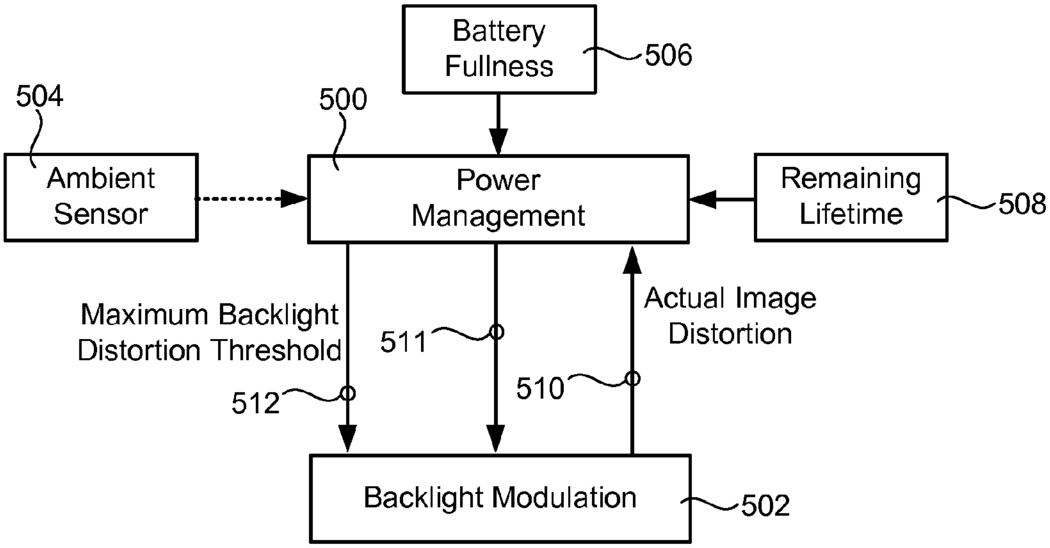
FIG. 33 is a diagram showing embodiments comprising distortion-adaptive power management.

In some embodiments, illustrated in FIG. 33, to control both power consumption and image distortion, the power management algorithm 500 may track not only the battery fullness 506 and remaining lifetime 508, but image distortion 510 as well. In some embodiments, both an upper limit on power consumption 512 and a distortion target 511 may be supplied to the backlight modulation algorithm 502. The backlight Modulation algorithm 502 may then select a backlight level 512 consistent with both the power limit and the distortion target.

Backlight Modulation Algorithms (BMA)

The backlight modulation algorithm 502 is responsible for selecting the backlight level used for each image. This selection may be based upon the image to be displayed and the signals from the power management algorithm 500. By respecting the limit on the maximum power supplied 512 by the power management algorithm 500, the battery 506 may be managed over the desired lifetime. In some embodiments, the backlight modulation algorithm 502 may select a lower power depending upon the statistics of the current image. This may be a source of power savings on a particular image.

Once a suitable backlight level 415 is selected, the backlight 416 is set to the selected level and this level 415 is given to the brightness preservation algorithm 414 to determine the necessary compensation. For some images and sequences, allowing a small amount of image distortion can greatly reduce the required backlight power. Therefore, some embodiments comprise algorithms that allow a controlled amount of image distortion.

Figure 34:
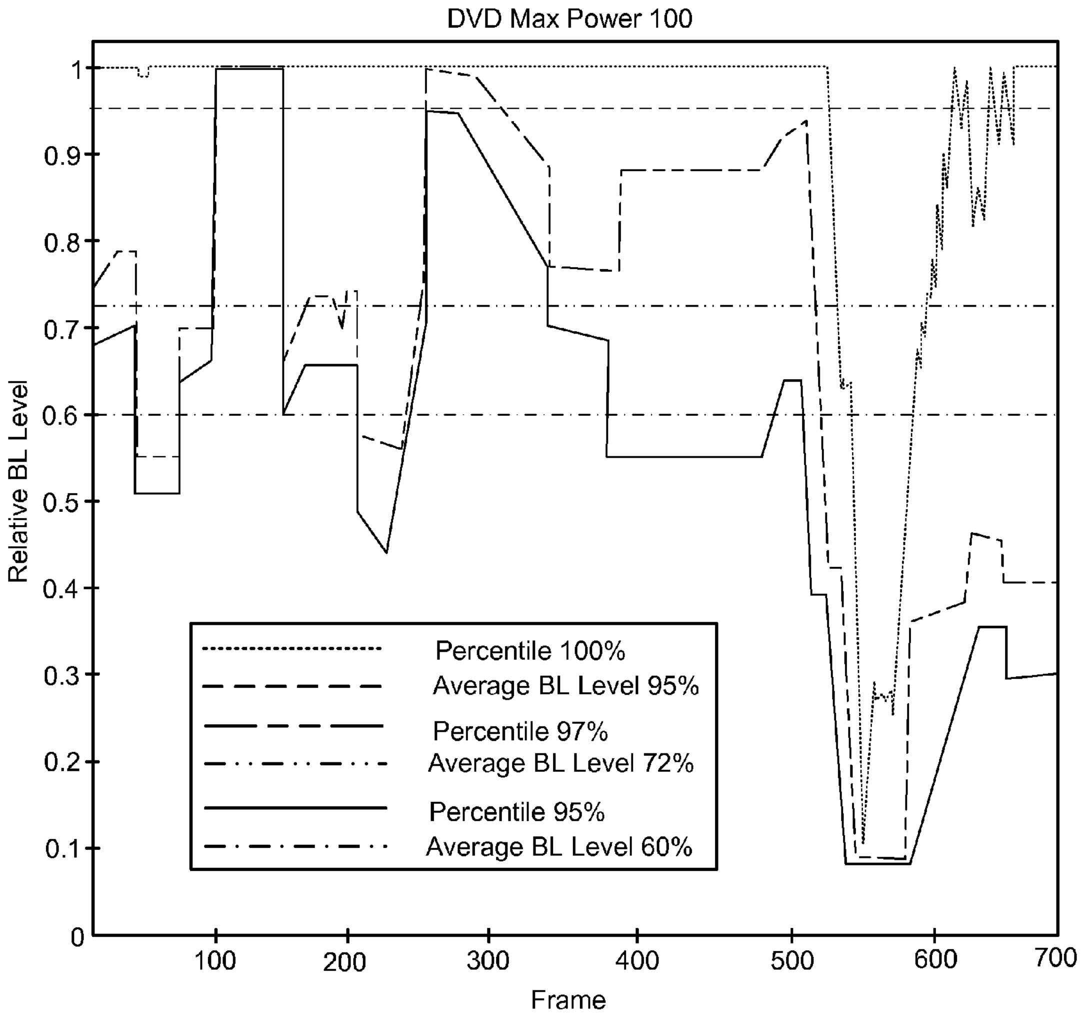
FIG. 34 is a graph showing backlight power levels at various distortion limits for an exemplary video sequence.

FIG. 34 is a graph showing the amount of power savings on a sample DVD clip as a function of frame number for several tolerances of distortion. The percentage of pixels with zero distortion was varied from 100% to 97% to 95% and the average power across the video clip was determined. The average power ranged from 95% to 60% respectively. Thus allowing distortion in 5% of the pixels gave an additional 35% power savings. This demonstrates significant power savings possible by allowing small image distortion. If the brightness preservation algorithm can preserve subjective quality while introducing a small distortion, significant power savings can be achieved.

Some embodiments of the present invention may be described with reference to FIG. 30. These embodiments may also comprise information from an ambient light sensor 438 and may be reduced in complexity for a mobile application. These embodiments comprise a static histogram percentile limit and a dynamic maximum power limit supplied by the power management algorithm 436. Some embodiments may comprise a constant power target while other embodiments may comprise a more sophisticated algorithm. In some embodiments, the image may be analyzed by computing histograms of each of the color components. The code value in the histogram at which the specified percentile occurs may be computed for each color plane. In some embodiments, a target backlight level may be selected so that a linear boost in code values will just cause clipping of the code value selected from the histograms. The actual backlight level may be selected as the minimum of this target level and the backlight level limit provided by the power management algorithm 436. These embodiments may provide guaranteed power control and may allow a limited amount of image distortion in cases where the power control limit can be reached Histogram Percentile Based Power Selection — Equation 21

$$P_{target} = \left(\frac{CodeValue_{Percentile}}{255}\right)^{\gamma}$$

$$P_{Selected} = \min(P_{target}, P_{Maximum})$$

Image-Distortion-Based Embodiments

Some embodiments of the present invention may comprise a distortion limit and a maximum power limit supplied by the power management algorithm. FIGS. 32B and 34 demonstrate that the amount of distortion at a given backlight power level varies greatly depending upon image content. The properties of the power-distortion behavior of each image may be exploited in the backlight selection process. In some embodiments, the current image may be analyzed by computing histograms for each color component. A power distortion curve defining the distortion (e.g., MSE) may be computed by calculating the distortion at a range of power values using the second expression of Equation 20. The backlight modulation algorithm may select the smallest power with distortion at, or below, the specified distortion limit as a target level. The backlight level may then be selected as the minimum of the target level and the backlight level limit supplied by the power management algorithm. Additionally, the image distortion at the selected level may be provided to the power management algorithm to guide the distortion feedback. The sampling frequency of the power distortion curve and the image histogram can be reduced to control complexity.

Brightness Preservation (BP)

In some embodiments, the BP algorithm brightens an image based upon the selected backlight level to compensate for the reduced illumination. The BP algorithm may control the distortion introduced into the display and the ability of the BP algorithm to preserve quality dictates how much power the backlight modulation algorithm can attempt to save.

Some embodiments may compensate for the backlight reduction by scaling the image clipping values which exceed 255. In these embodiments, the backlight modulation algorithm must be conservative in reducing power or annoying clipping artifacts are introduced thus limiting the possible power savings. Some embodiments are designed to preserve quality on the most demanding frames at a fixed power reduction. Some of these embodiments compensate for a single backlight level (i.e., 75%). Other embodiments may be generalized to work with backlight modulation.

Some embodiments of the brightness preservation (BP) algorithm may utilize a description of the luminance output from a display as a function of the backlight and image data. Using this model, BP may determine the modifications to an image to compensate for a reduction in backlight. With a transflective display, the BP model may be modified to include a description of the reflective aspect of the display. The luminance output from a display becomes a function of the backlight, image data, and ambient. In some embodiments, the BP algorithm may determine the modifications to an image to compensate for a reduction in backlight in a given ambient environment.

Ambient Influence

Due to implementation constraints, some embodiments may comprise limited complexity algorithms for determining BP parameters. For example, developing an algorithm running entirely on an LCD module limits the processing and memory available to the algorithm. In this example, generating alternate gamma curves for different backlight/ambient combinations may be used for some BP embodiments. In some embodiments, limits on the number and resolution of the gamma curves may be needed.

Power/Distortion Curves

Figure 35:
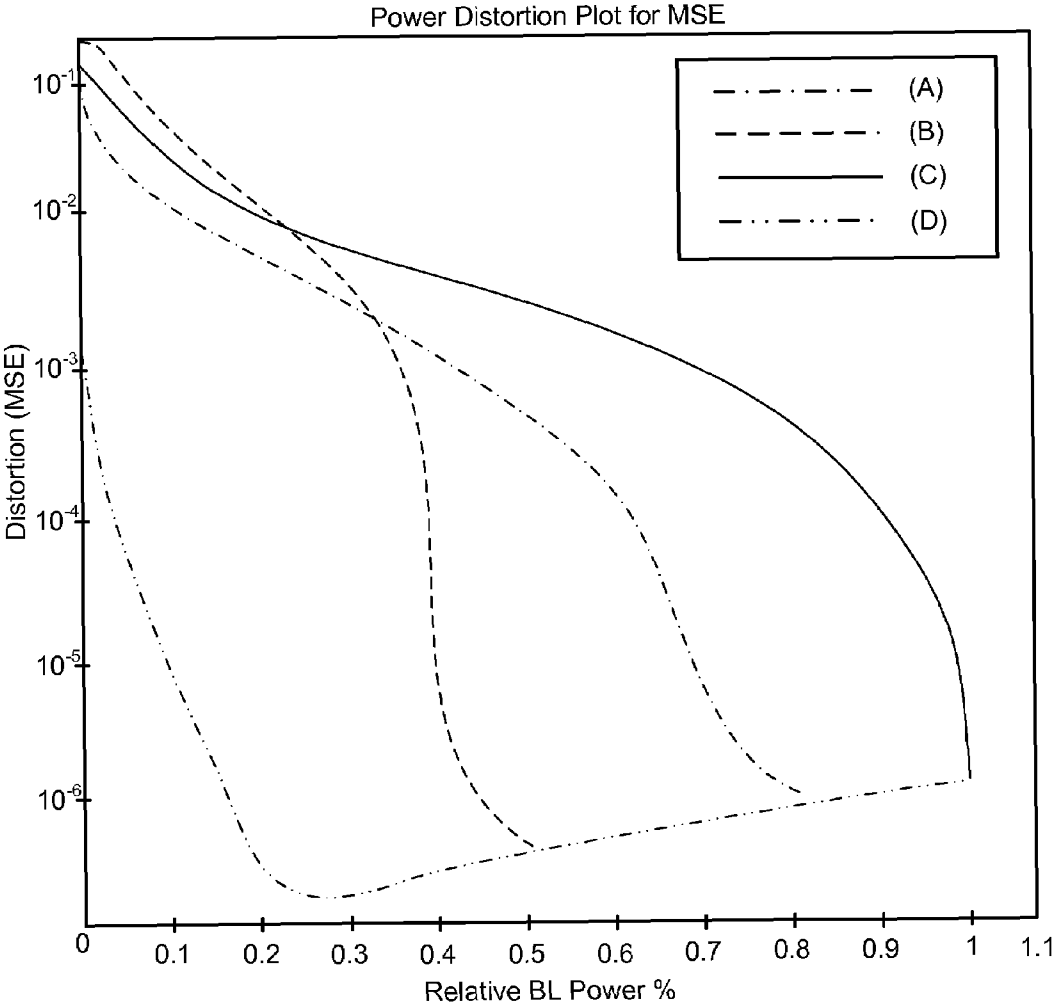
FIG. 35 is a graph showing exemplary power/distortion curves.

Some embodiments of the present invention may obtain, estimate, calculate or otherwise determine power/distortion characteristics for images including, but not limited to, video sequence frames. FIG. 35 is a graph showing power/distortion characteristics for four exemplary images. In FIG. 35, the curve 520 for image C maintains a negative slope for the entire source light power band. The curves 522, 524 & 526 for images A, B and D fall on a negative slope until they reach a minimum, then rise on a positive slope. For images A, B and D, increasing source light power will actually increase distortion at specific ranges of the curves where the curves have a positive slope 528. This may be due to display characteristics such as, but not limited to, LCD leakage or other display irregularities that cause the displayed image, as seen by a viewer, to consistently differ from code values.

Some embodiments of the present invention may use these characteristics to determine appropriate source light power levels for specific images or image types. Display characteristics (e.g., LCD leakage) may be considered in the distortion parameter calculations, which are used to determine the appropriate source light power level for an image.

Exemplary Methods

Figure 36:
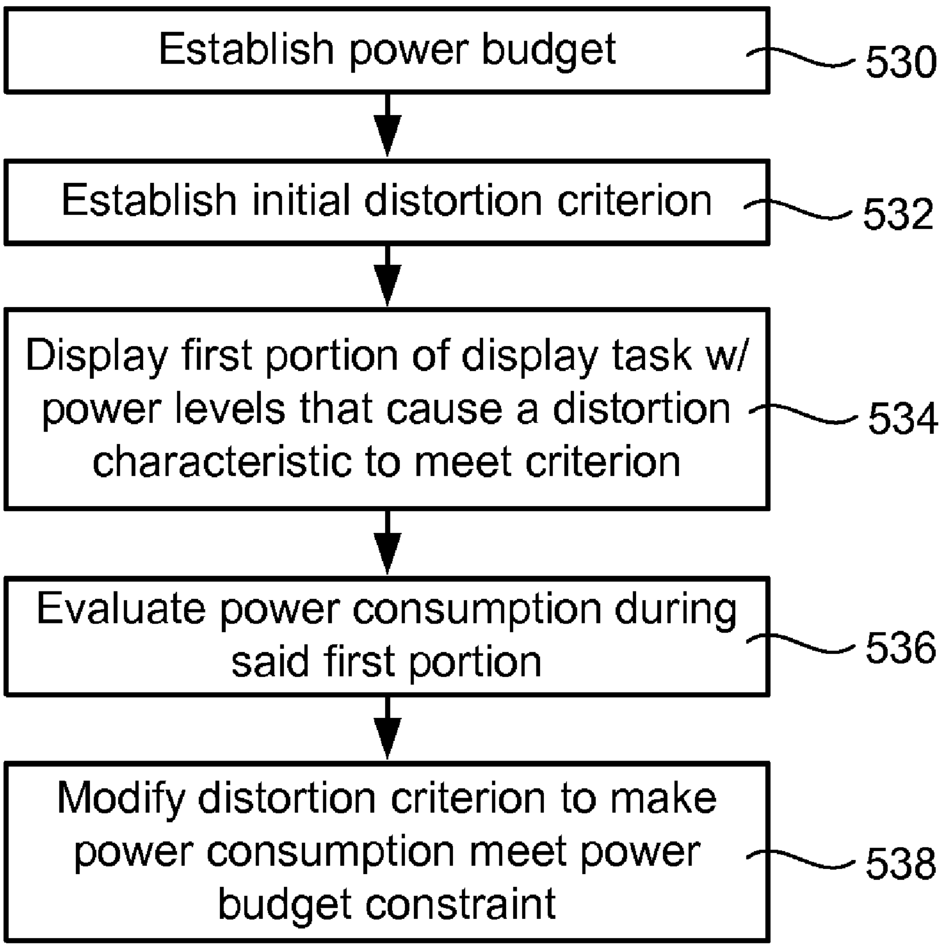
FIG. 36 is a flow chart showing embodiments that manage power consumption in relation to a distortion criterion.

Some embodiments of the present invention may be described in relation to FIG. 36. In these embodiments, a power budget is established 530. This may be performed using simple power management, adaptive power management and other methods described above or by other methods. Typically, establishing the power budget may comprise estimating a backlight or source light power level that will allow completion of a display task, such as display of a video file, while using a fixed power resource, such as a portion of a battery charge. In some embodiments, establishing a power budget may comprise determining an average power level that will allow completion of a display task with a fixed amount of power.

In these embodiments, an initial distortion criterion 532 may also be established. This initial distortion criterion may be determined by estimating a reduced source light power level that will meet a power budget and measuring image distortion at that power level. The distortion may be measured on an uncorrected image, on an image that has been modified using a brightness preservation (BP) technique as described above or on an image that has been modified with a simplified BP process.

Once the initial distortion criterion is established, a first portion of the display task may be displayed 534 using source light power levels that cause a distortion characteristic of the displayed image or images to comply with the distortion criterion. In some embodiments, light source power levels may be selected for each frame of a video sequence such that each frame meets the distortion requirement. In some embodiments, the light source values may be selected to maintain a constant distortion or distortion range, keep distortion below a specified level or otherwise meet a distortion criterion.

Power consumption may then be evaluated 536 to determine whether the power used to display the first portion of the display task met power budget management parameters. Power may be allocated using a fixed amount for each image, video frame or other display task element. Power may also be allocated such that the average power consumed over a series of display task elements meets a requirement while the power consumed for each display task element may vary. Other power allocation schemes may also be used.

When the power consumption evaluation 536 shows that power consumption for the first portion of the display task did not meet power budget requirements, the distortion criterion may be modified 538. In some embodiments, in which a power/distortion curve can be estimated, assumed, calculated or otherwise determined, the distortion criterion may be modified to allow more or less distortion as needed to conform to a power budget requirement. While power/distortion curves are image specific, a power/distortion curve for a first frame of a sequence, for an exemplary image in a sequence or for a synthesized image representative of the display task may be used.

In some embodiments, when more that the budgeted amount of power was used for the first portion of the display task and the slope of the power/distortion curve is positive, the distortion criterion may be modified to allow less distortion. In some embodiments, when more that the budgeted amount of power was used for the first portion of the display task and the slope of the power/distortion curve is negative, the distortion criterion may be modified to allow more distortion. In some embodiments, when less that the budgeted amount of power was used for the first portion of the display task and the slope of the power/distortion curve is negative or positive, the distortion criterion may be modified to allow less distortion.

Figure 37:
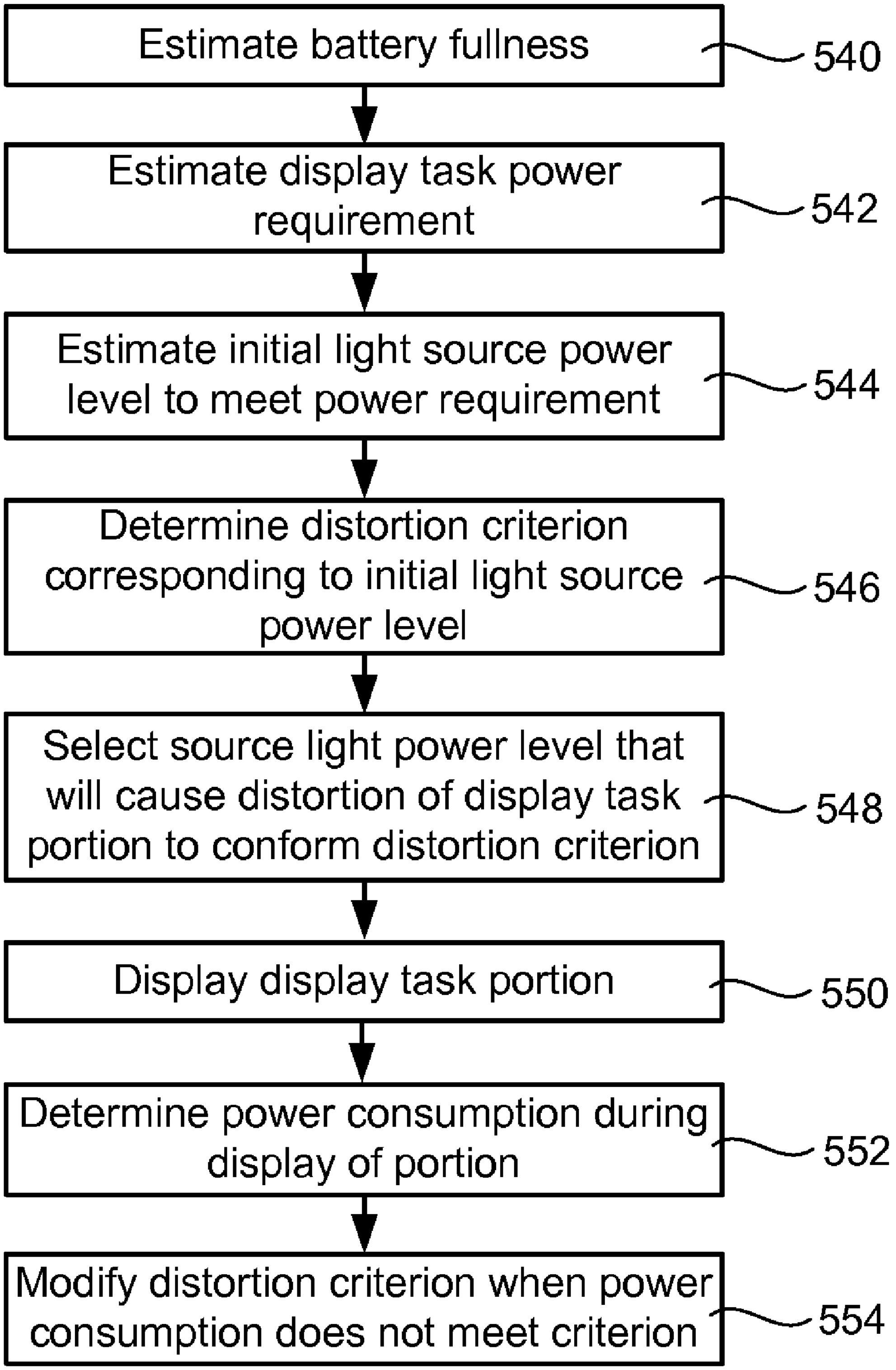
FIG. 37 is a flow chart showing embodiments comprising source light power level selection based on distortion criterion.

Some embodiments of the present invention may be described with reference to FIG. 37. These embodiments typically comprise a battery-powered device with limited power. In these embodiments, battery fullness or charge is estimated or measured 540. A display task power requirement may also be estimated or calculated 542. An initial light source power level may also be estimated or otherwise determined 544. This initial light source power level may be determined using the battery fullness and display task power requirement as described for constant power management above or by other methods.

A distortion criterion that corresponds to the initial light source power level may also be determined 546. This criterion may be the distortion value that occurs for an exemplary image at the initial light source power level. In some embodiments, the distortion value may be based on an uncorrected image, an image modified with an actual or estimated BP algorithm or another exemplary image.

Once the distortion criterion is determined 546, the first portion of the display task is evaluated and a source light power level that will cause the distortion of the first portion of the display task to conform to the distortion criterion is selected 548. The first portion of the display task is then displayed 550 using the selected source light power level and the power consumed during display of the portion is estimated or measured 552. When this power consumption does not meet a power requirement, the distortion criterion may be modified 554 to bring power consumption into compliance with the power requirement.

Figure 38B:
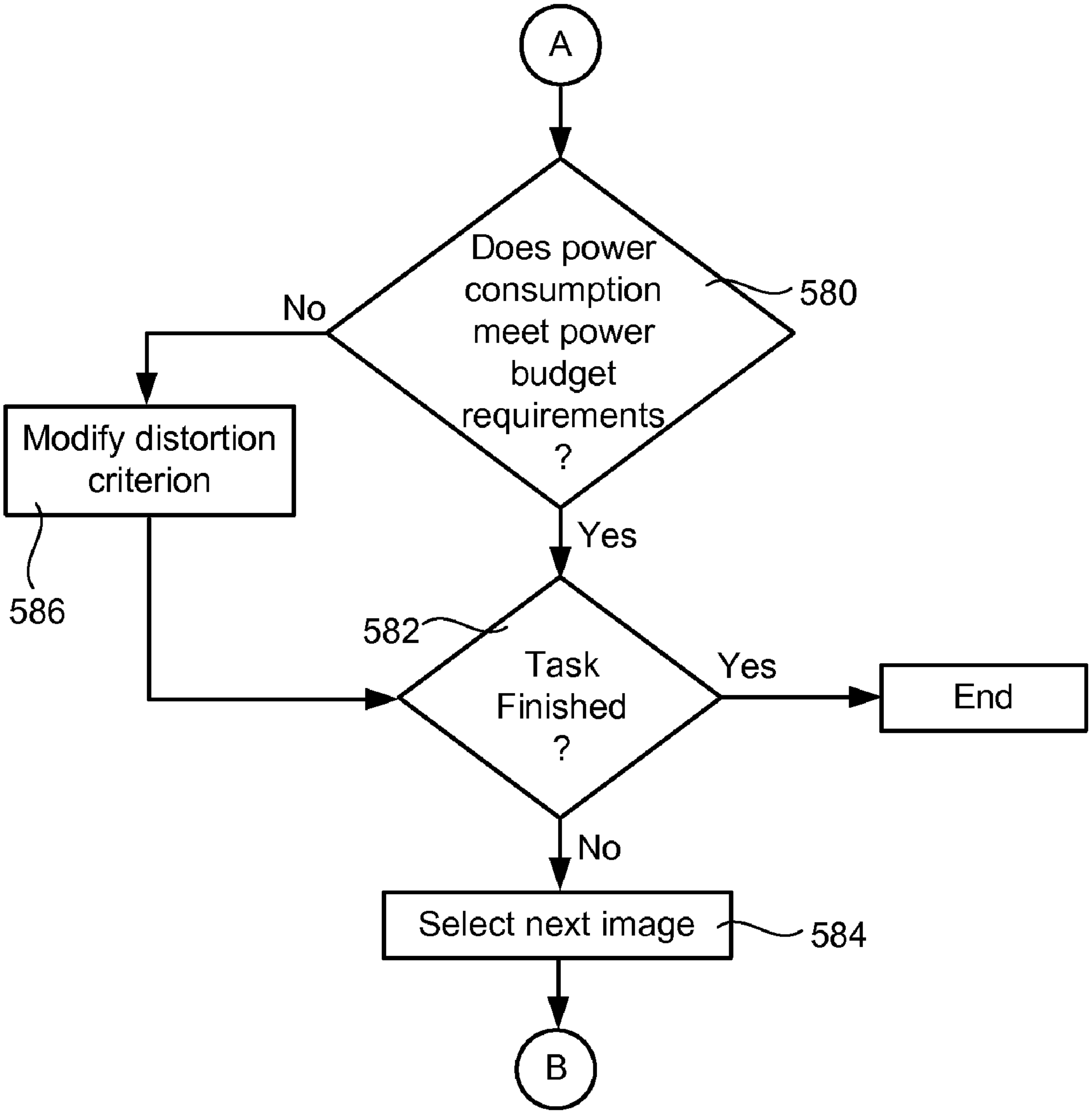

Some embodiments of the present invention may be described with reference to FIGS. 38A & 38B. In these embodiments, a power budget is established 560 and a distortion criterion is also established 562. These are both typically established with reference to a particular display task, such as a video sequence. An image is then selected 564, such as a frame or set of frames of a video sequence. A reduced source light power level is then estimated 566 for the selected image, such that the distortion resulting from the reduced light power level meets the distortion criterion. This distortion calculation may comprise application of estimated or actual brightness preservation (BP) methods to image values for the selected image.

The selected image may then be modified with BP methods 568 to compensate for the reduced light source power level. Actual distortion of the BP modified image may then be measured 570 and a determination may be made as to whether this actual distortion meets the distortion criterion 572. If the actual distortion does not meet the distortion criterion, the estimation process 574 may be adjusted and the reduced light source power level may be re-estimated 566. If the actual distortion does meet the distortion criterion, the selected image may be displayed 576. Power consumption during image display be then be measured 578 and compared to a power budget constraint 580. If the power consumption meets the power budget constraint, the next image, such as a subsequent set of video frames may be selected 584 unless the display task is finished 582, at which point the process will end. If a next image is selected 584, the process will return to point "B" where a reduced light source power level will be estimated 566 for that image and the process will continue as for the first image.

If the power consumption for the selected image does not meet a power budget constraint 580, the distortion criterion may be modified 586 as described for other embodiments above and a next image will be selected 584.

Improved Black-Level Embodiments

Some embodiments of the present invention comprise systems and methods for display black level improvement. Some embodiments use a specified backlight level and generate a luminance matching tone scale which both preserves brightness and improves black level. Other embodiments comprise a backlight modulation algorithm which includes black level improvement in its design. Some embodiments may be implemented as an extension or modification of embodiments described above.

Improved Luminance Matching (Target Matching Ideal Display)

The luminance matching formulation presented above, Equation 7, is used to determine a linear scaling of code values which compensates for a reduction in backlight. This has proven effective in experiments with power reduction to as low as 75%. In some embodiments with image dependant backlight modulation , the backlight can be significantly reduced, e.g. below 10%, for dark frames. For these embodiments, the linear scaling of code values derived in Equation 7 may not be appropriate since it can boost dark values excessively. While embodiments employing these methods may duplicate the full power output on a reduced power display, this may not serve to optimize output. Since the full power display has an elevated black level, reproducing this output for dark scenes does not achieve the benefit of a reduced black level made possible with a lower backlight power setting. In these embodiments, the matching criteria may be modified and a replacement for the result given in Equation 7 may be derived. In some embodiments, the output of an ideal display is matched. The ideal display may comprise a zero black level and the same maximum output, white level=W, as the full power display. The response of this exemplary ideal display to a code value, cv, may be expressed in Equation 22 in terms of the maximum output, W, display gamma and maximum code value.

Ideal Display — Equation 22

$$L_{ideal}(cv) = W \cdot \left(\frac{cv}{cv_{\text{Max}}}\right)^{\gamma}$$

In some embodiments, and exemplary LCD may have the same maximum output, W, and gamma, but a nonzero black level, B. This exemplary LCD may be modeled using the GOG model described above for full power output. The output scales with the relative backlight power for power less than 100%. The gain and offset model parameters may be determined by the maximum output, W, and black level, B, of the full power display, as shown in Equation 23.

Full Power *GOG* model — Equation 23

$$L_{fullpower}(cv) = \left(\text{Gain} \cdot \left(\frac{cv}{cvMax}\right) + \text{offset}\right)^{\gamma}$$

$$\text{offset} = B^{\frac{1}{\gamma}} \quad \text{Gain} = W^{\frac{1}{\gamma}} - B^{\frac{1}{\gamma}}$$

The output of the reduced power display with relative backlight power P may be determined by scaling the full power results by the relative power.

Actual *LCD* output *vs* Power and code value — Equation 24

$$L_{actual}(P, cv) = P \cdot \left(\left(W^{\frac{1}{\gamma}} - B^{\frac{1}{\gamma}}\right) \cdot \left(\frac{cv}{cvMax}\right) + B^{\frac{1}{\gamma}}\right)^{\gamma}$$

In these embodiments, the code values may be modified so that the outputs of the ideal and actual displays are equal, where possible. (If the ideal output is not less than or greater than that possible with a given power on the actual display)

Criteria for matching outputs Equation 25

$$L_{ideal}(x) = L_{actual}(P, \tilde{x})$$

$$W \cdot \left(\frac{x}{cv_{Max}}\right)^{\gamma} = P \cdot \left(\left(W^{\frac{1}{\gamma}} - B^{\frac{1}{\gamma}}\right) \cdot \left(\frac{\tilde{x}}{cvMax}\right) + B^{\frac{1}{\gamma}}\right)^{\gamma}$$

Some calculation solves for x̃ in terms of x, P, W, B.

Code Value relation for matching output Equation 26

$$\cdot\tilde{x} = \frac{\left(\frac{W}{P}\right)^{\frac{1}{\gamma}}}{\left(W^{\frac{1}{\gamma}} - B^{\frac{1}{\gamma}}\right)} \cdot x - \frac{cvMax \cdot B^{\frac{1}{\gamma}}}{\left(W^{\frac{1}{\gamma}} - B^{\frac{1}{\gamma}}\right)}$$

$$\cdot\tilde{x} = \frac{\left(\frac{1}{P}\right)^{\frac{1}{\gamma}}}{\left(1 - \left(\frac{B}{W}\right)^{\frac{1}{\gamma}}\right)} \cdot x - \frac{cvMax}{\left(\left(\frac{W}{B}\right)^{\frac{1}{\gamma}} - 1\right)}$$

$$\tilde{x} = \frac{\left(\frac{CR}{P}\right)^{\frac{1}{\gamma}}}{\left((CR)^{\frac{1}{\gamma}} - 1\right)} \cdot x - \frac{cvMax}{\left((CR)^{\frac{1}{\gamma}} - 1\right)}$$

These embodiments demonstrate a few properties of the code value relation for matching the ideal output on an actual display with non-zero black level. In this case, there is clipping at both the upper (x̃=cvMax) and lower (x̃=0) ends. These correspond to clipping input at $x_{low}$ and $x_{high}$ given by Equation 27

Clipping points Equation 27

$$x_{lower}(P) = cvMax \cdot \left(\frac{P}{CR}\right)^{\frac{1}{\gamma}}$$

$$x_{high}(P) = cvMax \cdot (P)^{\frac{1}{\gamma}}$$

These results agree with our prior development for other embodiments in which the display is assumed to have zero black level i.e. contrast ratio is infinite.

Backlight Modulation Algorithm

In these embodiments, a luminance matching theory that incorporates black level considerations, by doing a match between the display at a given power and a reference display with zero black level, to determine a backlight modulation algorithm. These embodiments use a luminance matching theory to determine the distortion an image must have when displayed with power P compared to being displayed on the ideal display. The backlight modulation algorithm may use a maximum power limit and a maximum distortion limit to select the least power that results in distortion below the specified maximum distortion.

Power Distortion

In some embodiments, given a target display specified by black level and maximum brightness at full power and an image to display, the distortion in displaying the image at a given power P may be calculated. The limited power and nonzero black level of the display can be emulated on the ideal reference display by clipping values larger than the brightness of the limited power display and by clipping values below the black level of the ideal reference. The distortion of an image may be defined as the MSE between the original image code values and the clipped code values, however, other distortion measures may be used in some embodiments.

The image with clipping is defined by the power dependant code value clipping limits introduced in Equation 27 is given in Equation 28.

Clipped image Equation 28

$$\tilde{I}(x, y, c, P) = \begin{cases} x_{low}(P) & I(x, y, c) \leq x_{low}(P) \\ I(x, y, c) & x_{low}(P) < I(x, y, c) < x_{high}(P) \\ x_{high}(P) & x_{high}(P) \leq I(x, y, c) \end{cases}$$

The distortion between the image on the ideal display and on the display with power P in the pixel domain becomes $$D(I, P) = \frac{1}{N} \cdot \sum_{x,y,c} \max_c \left| I(x, y, c) - \tilde{I}(x, y, c, P) \right|^2$$

Observe that this can be computed using the histogram of image code values.

$$D(I, P) = \sum_{n,c} \tilde{h}(n, c) \cdot \max_c |(n - \tilde{I}(n, P))|^2$$

The definition of the tone scale function can be used to derive an equivalent form of this distortion measure, shown as Equation 29.

Distortion measure Equation 29

$$D(I, P) = \sum_{n<cv_{low}} \tilde{h}(n, c) \cdot \max_c |(n - cv_{low}|^2 + \sum_{n>cv_{high}} \tilde{h}(n, c) \cdot \max_c |(n - cv_{high})|^2$$

This measure comprises a weighted sum of the clipping error at the high and low code values. A power/distortion curve may be constructed for an image using the expression of Equation 29. FIG. 39 is a graph showing power/distortion curves for various exemplary images. FIG. 39 shows a power/distortion plot 590 for a solid white image, a power/distortion plot 592 for a bright close-up of a yellow flower, a power/distortion plot 594 for a dark, low contrast image of a group of people, a power/distortion plot 596 for a solid black image and a power/distortion plot 598 for a bright image of a surfer on a wave.

As can be seen from FIG. 39, different images can have quite different/power-distortion relations. At the extremes, a black frame 596 has minimum distortion at zero backlight power with distortion rising sharply as power increases to 10%. Conversely, a white frame 590 has maximum distortion at zero backlight with distortion declining steadily until rapidly dropping to zero at 100% power. The bright surfing image 598 shows a steady decrease in distortion as power increases. The two other images 592 and 594 show minimum distortion at intermediate power levels.

Some embodiments of the present invention may comprise a backlight modulation algorithm that operates as follows:

1. Compute image histogram
2. Compute power distortion function for image
3. Calculate least power with distortion below distortion limit.
4. (Optional) limit selected power based on supplied power upper and lower limits
5. Select computed power for backlight In some embodiments, described in relation to FIGS. 40 and 41, the backlight value 604 selected by the BL modulation algorithm may be provided to the BP algorithm and used for tone scale design. Average power 602 and distortion 606 are shown. An upper bound on the average power 600 used in this experiment is also shown. Since the average power use is significantly below this upper bound the backlight modulation algorithm uses less power than simply using a fixed power equal to this average limit.

Development of a Smooth Tone Scale Function.

In some embodiments of the present invention, the smooth tone scale function comprises two design aspects. The first assumes parameters for the tone scale are given and determines a smooth tone scale function meeting those parameters. The second comprises an algorithm for selecting the design parameters.

Tone Scale Design Assuming Parameters

The code value relation defined by Equation 26 has slope discontinuities when clipped to the valid range [cvMin, cvMax]. In some embodiments of the present invention, smooth roll-off at the dark end may be defined analogously to that done at the bright end in Equation 7. These embodiments assume both a Maximum Fidelity Point (MFP) and a Least Fidelity Point (LFP) between which the tone scale agrees with Equation 26. In some embodiments, the tone scale may be constructed to be continuous and have a continuous first derivative at both the MFP and the LFP. In some embodiments, the tone scale may pass through the extreme points (ImageMinCV, cvMin) and (ImageMaxCV, cvMax). In some embodiments, the tone scale may be modified from an affine boost at both the upper and lower ends. Additionally, the limits of the image code values may be used to determine the extreme points rather than using fixed limits. It is possible to used fixed limits in this construction but problems may arise with large power reduction. In some embodiments, these conditions uniquely define a piecewise quadratic tone scale which as derived below.

Conditions:

Tone scale definition — Equation 30

$$TS(x)=\begin{cases} cvMin & cvMin \le x \le ImageMinCV \\ A\cdot(x-LFP)^2+B\cdot(x-LFP)+C & ImageMinCV < x < LFP \\ \alpha\cdot x+\beta & LFP \le x \le MFP \\ D\cdot(x-MFP)^2+E\cdot(x-MFP)+F & MFP < x < ImageMaxCV \\ cvMax & ImageMaxCV \le x \le cvMax \end{cases}$$

Tone scale slope — Equation 31

$$TS'(x)=\begin{cases} 2\cdot A\cdot(x-LFP)+B & 0 < x < LFP \\ \alpha & LFP \le x \le MFP \\ 2\cdot D\cdot(x-MFP)+E & x > MFP \end{cases}$$

Quick observation of continuity of the tone scale and first derivative at LFP and MFP yields.

$$B=\alpha$$

$$C=\alpha\cdot LFP+\beta$$

$$E=\alpha$$

$$F=\alpha\cdot MFP+\beta$$

Equation 32 Solution for tone scale parameters B, C, E, F

The end points determine the constants A and D as:

Solution for tone scale parameters $A$ and $D$ — Equation 33

$$A=\frac{cvMin-B\cdot(ImageMinCV-LFP)-C}{(ImageMinCV-LFP)^2}$$

$$D=\frac{cvMax-E\cdot(ImageMaxCV-MFP)-F}{(ImageMaxCV-MFP)^2}$$

In some embodiments, these relations define the smooth extension of the tone scale assuming MFP/LFP and ImageMaxCV/ImageMinCV are available. This leaves open the need to select these parameters. Further embodiments comprise methods and systems for selection of these design parameters.

Parameter Selection (MFP/LFP)

Some embodiments of the present invention described above and in related applications address only the MFP with ImageMaxCV equal to 255, cvMax was used in place of ImageMaxCV introduced in these embodiments. Those previously described embodiments had a linear tone scale at the lower end due to the matching based on the full power display rather than the ideal display. In some embodiments, the MFP was selected so that the smooth tone scale had slope zero at the upper limit, ImageMaxCV. Mathematically, the MFP was defined by:

$$TS'(ImageMaxCV)=0$$

$$2\cdot D(ImageMaxCV-MFP)+E=0$$

Equation 34 MFP selection criterion

The solution to this criterion relates the MFP to the upper clipping point and the maximum code value:

Prior $MFP$ selection criteria — Equation 35

$$MFP=2\cdot x_{high}-ImageMaxCV$$

$$MFP=2\cdot cvMax\cdot(P)^{\frac{1}{\gamma}}-ImageMaxCV$$

For modest power reduction such as P=80% this prior MFP selection criteria works well. For large power reduction, these embodiments may improve upon the results of previously described embodiments.

In some embodiments, we select an MFP selection criterion appropriate for large power reduction. Using the value ImageMaxCV directly in Equation 35 may cause problems. In images where power is low we expect a low maximum code value. If the maximum code value in an image, ImageMaxCV, is known to be small Equation 35 gives a reasonable value for the MFP but in some cases ImageMaxCV is either unknown or large, which can result in unreasonable i.e. negative MFP values. In some embodiments, if the maximum code value is unknown or too high, an alternate value may be selected for ImageMaxCV and applied in the result above.

In some embodiments, k may be defined as a parameter defining the smallest fraction of the clipped value $x_{high}$, the MFP can have. Then, k may be used to determine if the MFP calculated by Equation 35 is reasonable i.e.

$$MFP \geqq k \cdot x_{high} \quad \text{Equation 36 “Reasonable” MFP criteria}$$

If the calculated MFP is not reasonable, the MFP may be defined to be the smallest reasonable value and the necessary value of ImageMaxCV may be determined, Equation 37. The values of MFP and ImageMaxCV may then be used to determine the tone scale via as discussed below.

Correcting *ImageMaxCV* Equation 37

$$MFP = k \cdot x_{high}$$

$$k \cdot x_{high} = 2 \cdot cvMax \cdot (P)^{\frac{1}{\gamma}} - ImageMaxCV$$

$$ImageMaxCV = (2 - k) \cdot x_{high}$$

Steps for the MFP selection, of some embodiments, are summarized below:

1. Compute candidate MFP using ImageMaxCV (or CVMax if unavailable)
2. Test reasonableness using Equation 36
3. If unreasonable, define MFP based on fraction k of clipping code value
4. Calculate new ImageMaxCV using Equation 37.
5. Compute smooth tone scale function using MFP, ImageMaxCV and power.

Similar techniques may be applied to select the LFP at the dark end using ImageMinCV and $x_{low}$.

Exemplary tone scale designs based on smooth tone scale design algorithms and automatic parameter selection are shown in FIGS. 42-45. FIGS. 42 and 43 show an exemplary tone scale design where a backlight power level of 11% has been selected. A line 616 corresponding to the linear section of the tone scale design between the MFP 610 and the LFP 612 is shown. The tone scale design 614 curves away from line 616 above the MFP 610 and below the LFP 612, but is coincident with the line 616 between the LFP 612 and the MFP 610. FIG. 41 is zoomed-in image of the lark region of the tone scale design of FIG. 42. The LFP 612 is clearly visible and the lower curve 620 of the tone scale design can be seen curving away from the linear extension 622.

FIGS. 44 and 45 show an exemplary tone scale design wherein the backlight level has been selected at 89% of maximum power. FIG. 44 shows a line 634 coinciding with the linear portion of the tone scale design. Line 634 represents an ideal display response. The tone scale design 636 curves away 636, 638 from the ideal linear display representation 634 above the MFP 630 and below the LFP 632. FIG. 45 shows a zoomed-in view of the dark end of the tone scale design 636 below the LFP 640 where the tone scale design 642 curves away from the ideal display extension 644.

In some embodiments of the present invention, the distortion calculation can be modified by changing the error calculation between the ideal and actual display images. In some embodiments, the MSE may be replaced with a sum of distorted pixels. In some embodiments, the clipping error at upper and lower regions may be weighed differently.

Some embodiments of the present invention may comprise an ambient light sensor. If an ambient light sensor is available, the sensor can be used to modify the distortion metric including the effects of surround illumination and screen reflection. This can be used to modify the distortion metric and hence the backlight modulation algorithm. The ambient information can be used to control the tone scale design also by indicating the relevant perceptual clipping point at the black end.

Color Preservation Embodiments

Some embodiments of the present invention comprise systems and methods for preserving color characteristics while enhancing image brightness. In some embodiments, brightness preservation comprises mapping the full power gamut solid into the smaller gamut solid of a reduced power display. In some embodiments different methods are used for color preservation. Some embodiments preserve the hue/saturation of a color in exchange for a reduction in luminance boost.

Some non-color-preserving embodiments described above process each color channel independently operating to give a luminance match on each color channel. In those non-color-preserving embodiments, highly saturated or highlight colors can be become desaturated and/or change in hue following processing. Color-preserving embodiments address these color artifacts, but, in some case, may slightly reduce the luminance boost.

Some color-preserving embodiments may also employ a clipping operation when the low pass and high pass channels are recombined. Clipping each color channel independently can again result in a change in color. In embodiments employing color-preserving clipping, a clipping operation may be used to maintain hue/saturation. In some cases, this color-preserving clipping may reduce the luminance of clipped values below that of other non-color-preserving embodiments.

Some embodiments of the present invention may be described with reference to FIG. 46. In these embodiments, an input image 650 is read and code values corresponding to different color channels for a specified pixel location are determined 652. In some embodiments, the input image may be in a format that has separate color channel information recorded in the image file. In an exemplary embodiment the image may be recorded with red, green and blue (RGB) color channels. In other embodiments, an image file may be recorded in a cyan, magenta, yellow and black (CMYK) format, an Lab, YUV or another format. An input image may be in a format comprising a separate luminance channel, such as Lab, or a format without a separate luminance channel, such as RGB. When an image file does not have separate color channel data readily available, the image file may be converted to format with color channel data.

Once code values for each color channel are determined 652, the maximum code value among the color channel code values is then determined 654. This maximum code value may then be used to determine parameters of a code value adjustment model 656. The code value adjustment model may be generated in many ways. A tone-scale adjustment curve, gain function or other adjustment models may be used in some embodiments. In an exemplary embodiments, a tone scale adjustment curve that enhances the brightness of the image in response to a reduced backlight power setting may be used. In some embodiments, the code value adjustment model may comprise a tone-scale adjustment curve as described above in relation to other embodiments. The code value adjustment curve may then be applied 658 to each of the color channel code values. In these embodiments, application of the code value adjustment curve will result in the same gain value being applied to each color channel. Once the adjustments are performed, the process will continue for each pixel 660 in the image.

Some embodiments of the present invention may be described with reference to FIG. 47. In these embodiments, an input image is read 670 and a first pixel location is selected 672. The code values for a first color channel are determined 674 for the selected pixel location and the code values for a second color channel are determined 676 for the selected pixel location. These code values are then analyzed and one of them is selected 678 based on a code value selection criterion. In some embodiments, the maximum code value may be selected. This selected code value may then be used as input for a code value adjustment model generator 680, which will generate a model. The model may then be applied 682 to both the first and second color channel code values with substantially equal gain being applied to each channel. In some embodiments, a gain value obtained from the adjustment model may be applied to all color channels. Processing may then proceed to the next pixel 684 until the entire image is processed.

Some embodiments of the present invention may be described with reference to FIG. 48. In these embodiments, an input image 690 is input to the system. The image is then filtered 692 to create a first frequency range image. In some embodiments, this may be a low-pass image or some other frequency range image. A second frequency range image 694 may also be generated. In some embodiments, the second frequency range image may be created by subtracting the first frequency range image from the input image. In some embodiments, where the first frequency range image is a low-pass (LP) image, the second frequency range image may be a high-pass (HP) image. A code value for a first color channel in the first frequency range image may then be determined 696 for a pixel location and a code value for a second color channel in the first frequency range image may also be determined 698 at the pixel location. One of the color channel code values is then selected 700 by comparison of the code values or their characteristics. In some embodiments, a maximum code value may be selected. An adjustment model may then be generated or accessed 702 using the selected code value as input. This may result in a gain multiplier that may be applied 704 to the first color channel code value and the second color channel code value.

Some embodiments of the present invention may be described with reference to FIG. 49. In these embodiments, an input image 710 may be input to a pixel selector 712 that may identify a pixel to be adjusted. A first color channel code value reader 714 may read a code value for the selected pixel for a first color channel. A second color channel code value reader 716 may also read a code value for a second color channel at the selected pixel location. These code values may be analyzed in a analysis module 718, where one of the code values will be selected based on a code value characteristic. In some embodiments, a maximum code value may be selected. This selected code value may then be input to a model generator 720 or model selector that may determine a gain value or model. This gain value or model may then be applied 722 to both color channel code values regardless of whether the code value was selected by the analysis module 718. In some embodiments, the input image may be accessed 728 in applying the model. Control may then be passed 726 back to the pixel selector 712 to iterate through other pixels in the image.

Some embodiments of the present invention may be described with reference to FIG. 50. In these embodiments, an input image 710 may be input to a filter 730 to obtain a first frequency range image 732 and a second frequency range image 734. The first frequency range image may be converted to allow access to separate color channel code values 736. In some embodiments, the input image may allow access to color channel code values without any conversion. A code value for a first color channel of the first frequency range 738 may be determined and a code value for a second color channel of the first frequency range 740 may e determined.

These code values may be input to a code value characteristic analyzer 742, which may determine code value characteristics. A code value selector 744 may then select one of the code values based on the code value analysis. This selection may then be input to an adjustment model selector or generator 746 that will generate or select a gain value or gain map based on the code value selection. The gain value or map may then be applied 748 to the first frequency range code values for both color channels at the pixel being adjusted. This process may be repeated until the entire first frequency range image has been adjusted 750. A gain map may also be applied 753 to the second frequency range image 734. In some embodiments, a constant fain factor may be applied to all pixels in the second frequency range image. In some embodiments, the second frequency range image may be a high-pass version of the input image 710. The adjusted first frequency range image 750 and the adjusted second frequency range image 753 may be added or otherwise combined 754 to create an adjusted output image 756.

Some embodiments of the present invention may be described with reference to FIG. 51. In these embodiments, an input image 710 may be sent to a filter 760 or other some other processor for dividing the image into multiple frequency range images. In some embodiments, filter 760 may comprise a low-pass (LP) filter and a processor for subtracting an LP image created with the LP filter from the input image to create a high-pass (HP) image. The filter module 760 may output two or more frequency-specific images 762, 764, each having a specific frequency range. A first frequency range image 762 may have color channel data for a first color channel 766 and a second color channel 768. The code values for these color channels may be sent to a code value characteristic evaluator 770 and/or code value selector 772. This process will result in the selection of one of the color channel code values. In some embodiments, the maximum code value from the color channel data for a specific pixel location will be selected. This selected code value may be passed to an adjustment mode generator 774, which will generate a code value adjustment model. In some embodiments, this adjustment model may comprise a gain map or gain value. This adjustment model may then be applied 776 to each of the color channel code values for the pixel under analysis. This process may be repeated for each pixel in the image resulting in a first frequency range adjusted image 778.

A second frequency range image 764 may optionally be adjusted with a separate gain function 765 to boost its code values. In some embodiments no adjustment may be applied. In other embodiments, a constant gain factor may be applied to all code values in the second frequency range image. This second frequency range image may be combined with the adjusted first frequency range image 778 to form an adjusted combined image 781.

In some embodiments, the application of the adjustment model to the first frequency range image and/or the application of the gain function to the second frequency range image may cause some image code values to exceed the range of a display device or image format. In these cases, the code values may need to be "clipped" to the required range. In some embodiments, a color-preserving clipping process 782 may be used. In these embodiments, code values that fall outside a specified range may be clipped in a manner that preserves the relationship between the color values. In some embodiments, a multiplier may be calculated that is no greater than the maximum required range value divide by the maximum color channel code value for the pixel under analysis. This will result in a "gain" factor that is less than one and that will reduce the "oversize" code value to the maximum value of the required range. This "gain" or clipping value may be applied to all of the color channel code values to preserve the color of the pixel while reducing all code values to value that are less than or equal to the maximum value or the specified range. Applying this clipping process results in an adjusted output image 784 that has all code values within a specified range and that maintains the color relationship of the code values.

Some embodiments of the present invention may be described in relation to FIG. 52. In these embodiments, color-preserving clipping is used to maintain color relationships while limiting code values to a specified range. In some embodiments, a combined adjusted image 792 may correspond to the combined adjusted image 781 described in relation to FIG. 51. In other embodiments the combined adjusted image 792 may be any other image that has code values that need to be clipped to a specified range.

In these embodiments, a first color channel code value is determined 794 and a second color channel code value is determined 796 for a specified pixel location. These color channel code values 794, 796 are evaluated in a code value characteristic evaluator 798 to determine selective code value characteristic and select a color channel code value. In some embodiments, the selective characteristic will be a maximum value and the higher code value will be selected as input for the adjustment generator 800. The selected code value may be used as input to generate a clipping adjustment 800. In some embodiments, this adjustment will reduce the maximum code value to a value within the specified range. This clipping adjustment may then be applied to all color channel code values. In an exemplary embodiment, the code values of the first color channel and the second color channel will be reduced 802 by the same factor thereby preserving the ratio of the two code values. The application of this process to all pixel in an image will result in an output image 804 with code values that fall within a specified range.

Some embodiments of the present invention may be described with reference to FIG. 53. In these embodiments, methods are implemented in the RGB domain by manipulating the gain applied to all three color components based on the maximum color component. In these embodiments, an input image 810 is processed by frequency decomposition 812. In an exemplary embodiment, a low-pass (LP) filter 814 is applied to the image to create an LP image 820 that is then subtracted from the input image 810 to create a high-pass (HP) image 826. In some embodiments, a spatial 5x5 rect filter may be used for the LP filter. At each pixel in the LP image 820, the maximum value or the three color channels (R, G & B) is selected 816 and input to an LP gain map 818, which selects an appropriate gain function to be applied to all color channel values for that particular pixel. In some embodiments, the gain at a pixel with values [r, g, b] may be determined by a 1-D LUT indexed by max(r, g, b). The gain at value x may be derived from value of a Photometric matching tone scale curve, described above, at the value x divided by x.

A gain function 834 may also be applied to the HP image 826. In some embodiments, the gain function 834 may be a constant gain factor. This modified HP image is combined 830 with the adjusted LP image to form an output image 832. In some embodiments, the output image 832 may comprise code values that are out-of-range for an application. In these embodiments, a clipping process may be applied as explained above in relation to FIGS. 51 and 52.

In some embodiments of the present invention described above, the code value adjustment model for the LP image may be designed so that for pixels whose maximum color component is below a parameter, e.g. Maximum Fidelity Point, the gain compensates for a reduction in backlight power level. The Low Pass gain smoothly rolls off to 1 at the boundary of the color gamut in such a way that the processed Low Pass signal remains within Gamut.

In some embodiments, processing the HP signal may be independent of the choice of processing the low pass signal. In embodiments which compensate for reduced backlight power, the HP signal may be processed with a constant gain which will preserve the contrast when the power is reduced. The formula for the HP signal gain in terms of the full and reduced backlight powers and display gamma is given in 5. In these embodiments, the HP contrast boost is robust against noise since the gain is typically small e.g. gain is 1.1 for 80% power reduction and gamma 2.2.

In some embodiments, the result of processing the LP signal and the HP signal is summed and clipped. Clipping may be applied to the entire vector of RGB samples at each pixel scaling all three components equally so that the largest component is scaled to 255. Clipping occurs when the boosted HP value added to the LP value exceed 255 and is typically relevant for bright signals with high contrast only. Generally, the LP signal is guaranteed not to exceed the upper limit by the LUT construction. The HP signal may cause clipping in the sum but the negative values of the HP signal will never clip thereby maintaining some contrast even when clipping does occur.

Embodiments of the present invention may attempt to optimize the brightness of an image or they may attempt to optimize color preservation or matching while increasing brightness. Typically there is a tradeoff of a color shift when maximizing luminance or brightness. When the color shift is prevented, typically the brightness will suffer. Some embodiments of the present invention may attempt to balance the tradeoff between color shift and brightness by forming a weighted gain applied to each color component as shown in Equation 38.

$$\text{WeightedGain}(cv_x, \alpha)=\alpha\cdot\text{Gain}(cv_x)+(1-\alpha)\cdot\text{Gain}(\max(cv_R, cv_G, cv_B)) \quad \text{Equation 38 Weighted Gain}$$

This weighted gain varies between maximal luminance match at, alpha 0, to minimal color artifacts, at alpha 1. Note that when all code values are below the MFP parameter all three gains are equal.

Display-Model-Based, Distortion-Related Embodiments

The term "backlight scaling" may refer to a technique for reducing an LCD backlight and simultaneously modifying the data sent to the LCD to compensate for the backlight reduction. A prime aspect of this technique is selecting the backlight level. Embodiments of the present invention may select the backlight illumination level in an LCD using backlight modulation for either power savings or improved dynamic contrast. The methods used to solve this problem may be divided into image dependant and image independent techniques. The image dependent techniques may have a goal of bounding the amount of clipping imposed by subsequent backlight compensation image processing.

Some embodiments of the present invention may use optimization to select the backlight level. Given an image, the optimization routine may choose the backlight level to minimize the distortion between the image as it would appear on a hypothetical reference display and the image as it would appear on the actual display.

The following terms may be used to describe elements of embodiments of the present invention:

1. Reference display model: A reference display model may represent the desired output from a display such as an LCD. In some embodiments, a reference display model may model an ideal display with zero black level or a display with unlimited dynamic range.
2. Actual display model: A model of the output of an actual display. In some embodiments, the actual display output may be modeled for different backlight levels and the actual display may be modeled as having a non-zero black level. In some embodiments, a backlight selection algorithm may depend upon the display contrast ratio through this parameter.
3. Brightness Preservation (BP): Processing of an original image to compensate for a reduced backlight level. The image as it would appear on the actual display is the output of the display model at a given backlight level on the brightened image. Some exemplary cases are:
   - No brightness preservation: The unprocessed image data is sent to the LCD panel. In this case, the backlight selection algorithm
   - Linear boost brightness compensation. The image is processed using a simple affine transformation to compensate for the backlight reduction. Though this simple brightness preservation algorithm sacrifices image quality if actually used for backlight compensation, this is an effective tool to select the backlight value.
   - Tone Scale Mapping: An image is processed using a tone scale map that may comprise linear and non-linear segments. Segments may be used to limit clipping and enhance contrast.
4. Distortion Metric. A display model and brightness preservation algorithm may be used to determine the image as it would appear on an actual display. The distortion between this output and the image on the reference display may then be computed. In some embodiments, the distortion may be calculated based on the image code values alone. The distortion depends on a choice of error metric, in some embodiments a Mean Square Error may be used.
5. Optimization criteria. The distortion can be minimized subject to different constraints.

For example, in some embodiments the following criteria may be used:

- Minimize Distortion on each frame of a video sequence
- Minimize Maximum distortion subject to an average backlight constraint
- Minimize Average distortion subject to an average backlight constraint Display Models:

In some embodiments of the present invention, the GoG model may be used for both a reference display model and an actual display model. This model may be modified to scale based on the backlight level. In some embodiments, a reference display may be modeled as an ideal display with zero black level and maximum output W. An actual display may be modeled as having the same maximum output W at full backlight and a black level of B at full backlight. The contrast ratio is W/B. The contrast ratio is infinite when the black level is zero. These models can be expressed mathematically using $CV_{Max}$ to denote the maximum image code value in the equations below.

Model Of Reference (Ideal) Display output — Equation 39

$$Y_{ideal}(cv) = W \cdot \left(\frac{cv}{cv_{Max}}\right)^{\gamma}$$

For an actual LCD with maximum output W and minimum output B at full backlight level i.e. P=1; the output is modeled as scaling with relative backlight level P. The contrast ratio CR=W/B is independent of backlight level.

Model Of Actual *LCD* — Equation 40

$$Y_{Actual}(P, cv) = P \cdot \left(\text{Gain} \cdot \frac{cv}{cv_{Max}} + \text{Offset}\right)^{\gamma}$$

$$\text{Offset} = B^{\frac{1}{\gamma}} \quad \text{Gain} = W^{\frac{1}{\gamma}} - B^{\frac{1}{\gamma}}$$

$$B(P) = P \cdot B \quad W(P) = P \cdot W$$

$$CR = W / B$$

Brightness Preservation

In this exemplary embodiment, a BP process based on a simple boost and clip is used wherein the boost is chosen to compensate for the backlight reduction where possible. The following derivation shows the tone scale modification which provides a luminance match between the reference display and the actual display at a given backlight. Both the maximum output and black level of the actual display scale with backlight. We note that the output of the actual display is limited to below the scaled output maximum and above the scaled black level. This corresponds to clipping the luminance matching tone scale output to 0 and $CV_{max}$.

Criteria for matching outputs — Equation 41

$$Y_{ideal}(cv) = Y_{actual}(P, cv')$$

$$W \cdot \left(\frac{cv}{cv_{Max}}\right)^{\gamma} = P \cdot \left(\left(W^{\frac{1}{\gamma}} - B^{\frac{1}{\gamma}}\right) \cdot \left(\frac{cv'}{cvMax}\right) + B^{\frac{1}{\gamma}}\right)^{\gamma}$$

$$cv' = \frac{cvMax}{\left(W^{\frac{1}{\gamma}} - B^{\frac{1}{\gamma}}\right)} \cdot \left(\left(\frac{W}{P} \cdot \left(\frac{cv}{cv_{Max}}\right)^{\gamma}\right)^{\frac{1}{\gamma}} - B^{\frac{1}{\gamma}}\right)$$

$$cv' = \frac{1}{P^{\frac{1}{\gamma}} \cdot \left(1 - \left(\frac{B}{W}\right)^{\frac{1}{\gamma}}\right)} \cdot cv - \left(\frac{B}{W}\right)^{\frac{1}{\gamma}} \cdot \frac{cvMax}{\left(1 - \left(\frac{B}{W}\right)^{\frac{1}{\gamma}}\right)}$$

The clipping limits on cv' imply clipping limits on the range of luminance matching.

Clipping Limits Equation 42

$$cv' \geq 0$$

$$\Rightarrow$$

$$\frac{1}{P^{\frac{1}{\gamma}}\cdot\left(1-\left(\frac{B}{W}\right)^{\frac{1}{\gamma}}\right)}\cdot\cdot cv \geq \left(\frac{B}{W}\right)^{\frac{1}{\gamma}}\cdot\frac{cvMax}{\left(1-\left(\frac{B}{W}\right)^{\frac{1}{\gamma}}\right)}$$

$$cv \geq cvMax\cdot\left(\frac{B}{W}\right)^{\frac{1}{\gamma}}\cdot P^{\frac{1}{\gamma}}$$

$$cv' \leq cvMax$$

$$\Rightarrow$$

$$\frac{1}{P^{\frac{1}{\gamma}}\cdot\left(1-\left(\frac{B}{W}\right)^{\frac{1}{\gamma}}\right)}\cdot cv-\left(\frac{B}{W}\right)^{\frac{1}{\gamma}}\cdot\frac{cvMax}{\left(1-\left(\frac{B}{W}\right)^{\frac{1}{\gamma}}\right)} \leq cvMax$$

$$cv \leq cvMax\cdot P^{\frac{1}{\gamma}}$$

Clipping points Equation 43

$$x_{low}(P) = cvMax\cdot\left(\frac{P}{CR}\right)^{\frac{1}{\gamma}}$$

$$x_{high}(P) = cvMax\cdot(P)^{\frac{1}{\gamma}}$$

The tone scale provides a match of output for code values above a minimum and below a maximum where the minimum and maximum depend upon the relative backlight power P and the actual display contrast ratio CR=W/B.

Distortion Calculation

Various modified images created and used in embodiments of the present invention may be described with reference to FIG. 54. An original image I 840 may be used as input in creating each of these exemplary modified images. In some embodiments, an original input image 840 is processed 842 to yield an ideal output, $Y_{Ideal}$ 844. The ideal image processor, a reference display 842 may assume that the ideal display has a zero black level. This output, $Y_{Ideal}$ 844. may represent the original image 840 as seen on a reference (Ideal) display. In some embodiments, assuming a backlight level is given, the distortion caused by representing the image with this backlight level on the actual LCD may be computed.

In some embodiments, brightness preservation 846 may be used to generate an image I' 850 from the image I 840. The image I' 850 may then be sent to the actual LCD processor 854 along with the selected backlight level. The resulting output is labeled Yactual 858.

The reference display model may emulate the output of the actual display by using an input image I* 852.

The output of the actual LCD 854 is the result of passing the original image I 840 through the luminance matching tone scale function 846 to get the image I' 850. This may not exactly reproduce the reference output depending upon the backlight level. However, the actual display output can be emulated on the reference display 842. The image I* 852 denotes the image data sent to the reference display 842 to emulate the actual display output, thereby creating $Y_{emulated}$ 860. The image I* 852 is produced by clipping the image I 840 to the range determined by the clipping points defined above in relation to Equation 43 and elsewhere. In some embodiments, I* may be described mathematically as:

Clipped Image Equation 44

$$I^*(cv, P) = \begin{cases} x_{low}(P) & cv \leq x_{low}(P) \\ cv & x_{low}(P) < cv < x_{high}(P) \\ x_{high}(P) & x_{high}(P) \leq cv \end{cases}$$

In some embodiments, distortion may be defined as the difference between the output of the reference display with image I and the output of the actual display with backlight level P and image I'. Since image I* emulates the output of the actual display on the reference display, the distortion between the reference and actual display equals the distortion between the images I and I* both on the reference display.

$$D(Y_{Ideal}, Y_{Actual})=D(Y_{Ideal}, Y_{Emulated}) \quad \text{Equation 45}$$

Since both images are on the reference display, the distortion can be measured between the image data only not needing the display output.

$$D(Y_{Ideal}, Y_{Emulated})=D(I,I^*) \quad \text{Equation 46}$$

Image Distortion Measure

The analysis above shows the distortion between the representation of the image I 840 on the reference display and the representation on the actual display is equivalent to the distortion between that of images I 840 and I* 852 both on the reference display. In some embodiments, a pointwise distortion metric may be used to define the distortion between images. Given the pointwise distortion, d, the distortion between images can be computed by summing the difference between the images I and I*. Since the image I* emulates the luminance match, the error consists of clipping at upper and lower limits. In some embodiments, a normalized image histogram h(x) may be used to define the distortion of an image versus backlight power.

Equation 47

$$D(I, I^*) = \sum_x d(x, T^*(x, P))$$

$$D(I, P) = \sum_{x<cv_{low}(P)} \tilde{h}(x)\cdot d(x-cv_{low}(P)) + \sum_{x>cv_{high}(P)} \tilde{h}(x)\cdot d(x-cv_{high}(P))$$

Backlight vs Distortion Curve

Given a reference display, actual display, distortion definition, and image , the distortion may be computed at a range of backlight levels. When combined, this distortion data may form a backlight vs distortion curve. A backlight vs distortion curve may be illustrated using a sample frame, which is a dim image of a view looking out of a dark closet, and an ideal display model with zero black level, an actual LCD model-with 1000:1 contrast ratio, and a Mean Square Error MSE error metric. FIG. 55 is a graph of the histogram of image code values for this exemplary image.

In some embodiments, the distortion curve may be computed by calculating the distortion for a range of backlight values using a histogram. FIG. 56 is a graph of an exemplary distortion curve corresponding to the histogram of FIG. 55. For this exemplary image, at low backlight values, the brightness preservation is unable to effectively compensate for the reduced backlight resulting in a dramatic increase in distortion 880. At high backlight levels, the limited contrast ratio causes the black level to be elevated 882 compared to the ideal display. A minimum distortion range exists and, in some embodiments, the lowest backlight value giving this minimum distortion 884 may be selected by the minimum distortion algorithm.

Optimization Algorithm

In some embodiments, the distortion curve, such as the one shown in FIG. 56 may be used to select the backlight value. In some embodiments, the minimum distortion power for each frame may be selected. In some embodiments, when the minimum distortion value is not unique, the least power 884 which gives this minimum distortion may be selected. Results applying this optimization criterion to a brief DVD clip are shown in FIG. 57, which plots the selected backlight power against video frame number. In this case the average selected backlight 890 is roughly 50%.

Image Dependency

To illustrate the image-dependent nature of some embodiments of the present invention, exemplary test images with varying content were selected and the distortion in these images was calculated for a range of backlight values. FIG. 39 is a plot of the backlight vs distortion curves for these exemplary images. FIG. 39 comprises plots for: Image A 596, a completely black image; Image B 590, a completely white image; Image C 594, a very dim photograph of a group of people and Image D 598, a bright image of a surfer on a wave.

Note that the shape of the curve depends strongly on the image content. This is to be expected as the backlight level balances distortion due to loss of brightness and distortion due to elevated black level. The black image 596 has least distortion at low backlight. The white image 590 has least distortion at full backlight. The dim image 594 has least distortion at an intermediate backlight level which uses the finite contrast ratio as an efficient balance between elevated black level and reduction of brightness.

Contrast Ratio

The display contrast ratio may enter into the definition of the actual display. FIG. 58 illustrates the minimum MSE distortion backlight determination for different contrast ratios of the actual display. Note that at the limit of 1:1 contrast ratio 900, the minimum distortion backlight depends upon the image Average Signal Level (ASL). At the opposite extreme of infinite contrast ratio (zero black level), the minimum distortion backlight depends upon the image maximum 902.

In some embodiments of the present invention, a reference display model may comprise a display model with an ideal zero black level. In some embodiments, a reference display model may comprise a reference display selected by visual brightness model and, in some embodiments a reference display model may comprise an ambient light sensor.

In some embodiments of the present invention, an actual display model may comprise a transmissive GoG model with finite black level. In some embodiments, an actual display model may comprise a model for a transflective display where output is modeled as dependent upon both the ambient light and reflective portion of the display.

In some embodiments of the present invention, Brightness Preservation (BP) in the backlight selection process may comprise a linear boost with clipping. In other embodiments, the backlight selection process may comprise tone scale operators with a smooth roll-off and/or a two channel BP algorithm.

In some embodiments of the present inventions, a distortion metric may comprise a Mean Square Error (MSE) in the image code values as a point-wise metric. In some embodiments, the distortion metric may comprise pointwise error metrics including a sum of absolute differences, a number of clipped pixels and/or histogram based percentile metrics.

In some embodiments of the present invention, optimization criteria may comprise selection of a backlight level that minimizes distortion in each frame. In some embodiments, optimization criteria may comprise average power limitations that minimize maximum distortion or that minimize average distortion.

LCD Dynamic Contrast Embodiments

Liquid Crystal Displays (LCDs) typically suffer from a limited contrast ratio. For instance, the black level of a display may be elevated due to backlight leakage or other problems. this may cause black areas to look gray rather than black. Backlight modulation can mitigate this problem by lowering the backlight level and associated leakage thereby reducing the black level as well. However, used without compensation, this technique will have the undesirable effect of reducing the display brightness. Image compensation may be used to restore the display brightness lost due to backlight dimming. Compensation has typically been confined to restoring the brightness of the full power display.

Some embodiments of the present invention, described above, comprise backlight modulation that is focused on power savings. In those embodiments, the goal is to reproduce the full power output at lower backlight levels. This may be achieved by simultaneously dimming the backlight and brightening the image. An improvement in black level or dynamic contrast is a favorable side effect in those embodiments. In these embodiments, the goal is to achieve image quality improvement. Some embodiments may result in the following image quality improvements:

1. Lower black level due to reduced backlight,
2. Improved saturation of dark colors due to reduced leakage caused by reducing backlight
3. Brightness improvement, if compensation stronger than the backlight reduction is used.
4. Improved dynamic contrast, i.e. maximum in bright frame of a sequence divided by minimum in a dark frame
5. Intra frame contrast in dark frames.

Some embodiments of the present invention may achieve one or more of these benefits via two essential techniques: backlight selection and image compensation. One challenge is to avoid flicker artifacts in video as both the backlight and the compensated image will vary in brightness. Some embodiments of the present invention may use a target tone curve to reduce the possibility of flicker. In some embodiments, the target curve may have a contrast ratio that exceeds that of the panel (with a fixed backlight). A target curve may serve two purposes. First, the target curve may be used in selecting the backlight. Secondly, the target curve may be used to determine the image compensation. The target curve influences the image quality aspects mentioned above. A target curve may extend from a peak display value at full backlight brightness to a minimum display value at lowest backlight brightness. Accordingly, the target curve will extend below the range of typical display values achieved with full backlight brightness.

In some embodiments, the selection of a backlight luminance or brightness level may correspond to a selection of an interval of the target curve corresponding to the native panel contrast ratio. This interval moves as the backlight varies. At full backlight, the dark area of the target curve cannot be represented on the panel. At low backlight, the bright area of the target curve cannot be represented on the panel. In some embodiments, to determine the backlight, the panel tone curve, the target tone curve, and an image to display is given. The backlight level may be selected so that the contrast range of the panel with selected backlight most nearly matches the range of image values under the target tone curve.

In some embodiments, an image may be modified or compensated so that the display output falls on the target curve as much as possible. If the backlight is too high, the dark region of the target curve cannot be achieved. Similarly if the backlight is low, the bright region of the target curve cannot be achieved. In some embodiments, flicker may be minimized by using a fixed target for the compensation. In these embodiments, both backlight brightness and image compensation vary, but the display output approximates the target tone curve, which is fixed.

In some embodiments, the target tone curve may summarize one or more of the image quality improvements listed above. Both backlight selection and image compensation may be controlled through the target tone curve. Backlight brightness selection may be performed to "optimally" represent an image. In some embodiments, the distortion based backlight selection algorithm, described above, may be applied with a specified target tone curve and a panel tone curve.

In some exemplary embodiments, a Gain-Offset-Gamma Flare (GOGF) model may be used for the tone curves, as shown in equation 49. In some embodiments, the value of 2.2 may be used for gamma and zero may be used for the offset leaving two parameters, Gain and Flare. Both panel and target tone curves may be specified with these two parameters. In some embodiments, the Gain determines the maximum brightness and the contrast ratio determines the additive flare term.

Tone Curve Model — Equation 48

$$T(c) = M\cdot\left(\left(1-\frac{1}{CR}\right)\cdot c^{\gamma}+\frac{1}{CR}\right)$$

where CR is the contrast ratio of the display, M is the maximum panel output, c is an image code value, T is a tone curve value and γ is a gamma value.

To achieve dynamic contrast improvement, the target tone curve differs from the panel tone curve. In the simplest application, the contrast ratio, CR, of the target is larger than that of the panel. An exemplary panel tone curves is represented in Equation 49, Exemplary Panel Tone Curve — Equation 49

$$T_{Panel}(c) = M_{Panel}\cdot\left(\left(1-\frac{1}{CR_{Panel}}\right)\cdot c^{\gamma}+\frac{1}{CR_{Panel}}\right)$$

where CR is the contrast ratio of the panel, M is the maximum panel output, c is an image code value, T is a panel tone curve value and γ is a gamma value.

An exemplary target tone curve is represented in Equation 50,

Exemplary Target Tone Curve — Equation 50

$$T_{Target}(c) = M_{Target}\cdot\left(\left(1-\frac{1}{CR_{Target}}\right)\cdot c^{\gamma}+\frac{1}{CR_{Target}}\right)$$

where CR is the contrast ratio of the target, M is the maximum target output (e.g., max. panel output at full backlight brightness), c is an image code value, T is a target tone curve value and γ is a gamma value.

Aspects of some exemplary tone curves may be described in relation to FIG. 60. FIG. 59 is a log-log plot of code values on the horizontal axis and relative luminance on the vertical axis. Three tone curves are shown therein: a panel tone curve 1000, a target tone curve 1001 and a power law curve 1002. The panel tone curve 1000 extends from the panel black point 1003 to the maximum panel value 105. The target tone curve extends from the target black point 1004 to the maximum target/panel value 1005. The target black point 1004 is lower than the panel black point 1003 as it benefits from a lower backlight brightness, however, the full range of the target tone curve cannot be exploited for a single image as the backlight can have only one brightness level for any given frame, hence the maximum target/panel value 1005 cannot be achieved when the backlight brightness is reduced to obtain the lower target black point 1004. Embodiments of the present invention select the range of the target tone curve that is most appropriate for the image being displayed and for the desired performance goal.

Various target tone curves may be generated to achieve different priorities. For example, if power savings is the primary goal, the values of M and CR, for the target curve may be set equal to the corresponding values in the panel tone curve. In this power saving embodiment, the target tone curve is equal to the native panel tone curve. Backlight modulation is used to save power while the image displayed is virtually the same as that on the display with full power, except at the top end of the range, which is unobtainable at lower backlight settings.

An exemplary power saving tone curve is illustrated in FIG. 60. In these embodiments, the panel and target tone curves are identical 1010. The backlight brightness is reduced thereby enabling the possibility of a lower possible target curve 1011, however, this potential is not used in these embodiments. Instead, the image is brightened, through compensation of image code values, to match the panel tone curvelO10. When this is not possible, at the panel limit due to the reduced backlight for power savings 1013, the compensation may be rounded off 1012 to avoid clipping artifacts. This roundoff may be achieved according to methods described above in relation to other embodiments. In some embodiments, clipping may be allowed or may not occur due to a limited dynamic range in the image. In those cases, the roundoff 1012 may not be necessary and the target tone curve may simply follow the panel tone curve at the top end of the range 1014

In another exemplary embodiment, when a lower black level is the primary goal, the value of M for the target curve may be set equal to the corresponding value in the panel tone curve, but the value of CR for the target curve may be set equal to 4 times the corresponding value in the panel tone curve. In these embodiments, the target tone curve is selected to decrease the black level. The display brightness is unchanged relative to the full power display. The target tone curve has the same maximum M as the panel but has a higher contrast ratio. In the example above, the contrast ratio is 4 times the native panel contrast ratio. Alternatively, the target tone curve may comprise a round off curve at the top end of its range. Presumably the backlight can be modulated by a factor of 4:1.

Some embodiments which prioritize black level reduction may be described in relation to FIG. 61. In these embodiments, a panel tone curve 1020 is calculated as described above, for example, using Equation 49. A target tone curve 1021 is also calculated for a reduced backlight brightness level and higher contrast ratio. At the top end of the range, the target tone curve 1024 may extend along the panel tone curve. Alternatively, the target tone curve may employ a round-off curve 1023, which may reduce clipping near the display limit 1022 for a reduced backlight level.

In another exemplary embodiment, when a brighter image is the primary goal, the value of M for the target curve may be set equal to 1.2 times the corresponding value in the panel tone curve, but the value of CR for the target curve may be set equal to the corresponding value in the panel tone curve. The target tone curve is selected to increase the brightness keeping the same contrast ratio. (Note the black level is elevated.) The target maximum M is larger than the panel maximum. Image compensation will be used to brighten the image to achieve this brightening.

Some embodiments which prioritize image brightness may be described in relation to FIG. 62. In these embodiments, the panel tone curve and target tone curve are substantially similar near the bottom end of the range 1030. However, above this region, the panel tone curve 1032 follows a typical path to the maximum display output 1033. The target tone curve, however, follows an elevated path 1031, which provides for brighter image code values in this region. Toward the top end of the range, the target curve 1031 may comprise a round-off curve 1035, which rounds off the target curve to the point 1033 at which the display can no longer follow the target curve due to the reduced backlight level.

In another exemplary embodiment, when an enhanced image, with lower black level and brighter midrange, is the primary goal, the value of M for the target curve may be set equal to 1.2 times the corresponding value in the panel tone curve, and the value of CR for the target curve may be set equal to 4 times the corresponding value in the panel tone curve. The target tone curve is selected to both increase the brightness and reduce the black level. The target maximum is larger than the panel maximum M and the contrast ratio is also larger than the panel contrast ratio. This target tone curve may influence both the backlight selection and the image compensation. The backlight will be reduced in dark frames to achieve the reduced black level of the target. Image compensation may be used even at full backlight to achieve the increased brightness.

Some embodiments which prioritize image brightness and a lower black level may be described in relation to FIG. 63. In these embodiments, a panel tone curve 1040 is calculated as described above, for example, using Equation 49. A target tone curve 1041 is also calculated, however, the target tone curve 1041 may begin at a lower black point 1045 to account for a reduced backlight level. The target tone curve 1041 may also follow an elevated path to brighten image code values in the midrange and upper range of the tone scale. Since the display, with reduced backlight level, cannot reach the maximum target value 1042 or even the maximum panel value 1043, a round-off curve 1044 may be employed. The round-off curve 1044 may terminate the target tone curve 1041 at a maximum reduced-backlight panel value 1046. Various methods, described in relation to other embodiments above, may be used to determine round-off curve characteristics.

Some embodiments of the present invention may be described in relation to FIG. 64. In these embodiments, a plurality of target tone curves may be calculated and a selection may be made from the set of calculated curves based on image characteristics, performance goals or some other criterion. In these embodiments, a panel tone curve 1127 may be generated for a full backlight brightness situation with an elevated black level 1120. Target tone curves 1128 and 1129 may also be generated. These target tone curves 1128 and 1129 comprise a black level transition region 1122 wherein a curve transitions to a black level point, such as black level point 1121. These curves also comprise a common region wherein input points from any of the target tone curves are mapped to the same output points. In some embodiment, these target tone curves may also comprise a brightness round-off curve 1126, wherein a curve rounds off to a maximum brightness level 1125, such as described above for other embodiments. A curve may be selected from this set of target tone curves based on image characteristics. For example, and not by way of limitation, an image with many very dark pixels may benefit from a lower black level and curve 1128, with a dimmed backlight and lower black level, may be selected for this image. An image with many bright pixel values may influence selection of curve 1127, with a higher maximum brightness 1124. Each frame of a video sequence may influence selection of a different target tone curve. In not managed, use of different tone curves may cause flicker and unwanted artifacts in the sequence. However, the common region 1123, shared by all target tone curves of these embodiments serves to stabilize temporal effects and reduce flicker and similar artifacts.

Some embodiments of the present invention may be described in relation to FIG. 65. In these embodiments, a set of target tone curves, such as target tone curve 1105 may be generated. These target tone curves may comprise different black level transition regions 1102, which may correspond to different backlight brightness levels. This set of target tone curves also comprises an enhanced common region 1101 in which all curves in the set share the same mapping. In some embodiments, these curves may also comprise brightness round-off curves 1103 that transition from the common region to a maximum brightness level. In an exemplary enhanced target tone curve 1109, the curve may begin at black level point 1105 and transition to the enhanced common region 1101, the curve may then transition from the enhanced common region to maximum brightness level 1106 with a round-off curve. In some embodiments, the brightness round-off curve may not be present. These embodiments differ from those described with reference to FIG. 65 in that the common region is above the panel tone curve. This maps input pixel values to higher output values thereby brightening the displayed image. In some embodiments, a set of enhanced target tone curve may be generated and selectively used for frames of an image sequence. These embodiments share the common region the serves to reduce flicker and similar artifacts. In some embodiments, a set of target tone curves and a set of enhanced target tone curves may be calculated and stored for selective use depending on image characteristics and/or performance goals.

Some embodiments of the present invention may be described in relation to FIG. 66. In the methods of FIG. 66, target tone curve parameters are determined 1050. In some embodiments, these parameters may comprise a maximum target panel output, a target contrast ratio and or a target panel gamma value. Other parameters may also be used to define a target tone curve that may be used to adjust or compensate an image to produce a performance goal.

In these embodiments, a panel tone curve 1051 may also be calculated. A panel tone curve is shown to illustrate the differences between typical panel output and a target tone curve. A panel tone curve 1051 relates characteristics of the display panel to be used for display and may be used to create a reference image from which error or distortion measurements may be made. This curve 1051 may be calculated based on a maximum panel output, M, and a panel contrast ratio, CR for a given display. In some embodiments, this curve may be based on a maximum panel output, M, a panel contrast ratio, CR, a panel gamma value, $\gamma$, and image code values, c.

One or more target tone curves (TTCs) may be calculated 1052. In some embodiments, a family of TTCs may be calculated with each member of the family being based on a different backlight level. In other embodiments, other parameters may be varied. In some embodiments, the target tone curve may be calculated using a maximum target output, M, and a target contrast ratio, CR. In some embodiments, this target tone curve may be based on a maximum target output, M, a target contrast ratio, CR, a display gamma value, γ, and image code values, c. In some embodiments, the target tone curve may represent desired modifications to the image. For example, a target tone curve may represent one or more of a lower black level, brighter image region, compensated region, and/or a round-off curve. A target tone curve may be represented as a look-up-table (LUT), may be calculated via hardware or software or may be represented by other means.

A backlight brightness level may be determined 105. In some embodiments, the backlight level selection may be influenced by performance goals, such as power savings, black level criteria or other goals. In some embodiments, the backlight level may be determined so as to minimize distortion or error between a processed or enhanced image and an original image as displayed on a hypothetical reference display. When image values are predominantly very dark, a lower backlight level may be most appropriate for image display. When image values are predominantly bright, a higher backlight level may be the best choice for image display. In some embodiments an image processed with the panel tone curve may be compared to images processed with various TTCs to determine an appropriate TTC and a corresponding backlight level.

In some embodiments of the present invention, specific performance goals may also be considered in backlight selection and image compensation selection methods. For example, when power savings has been identified as a performance goal, lower backlight levels may have a priority over image characteristic optimization. Conversely, when image brightness is the performance goal, lower backlight levels may have lower priority.

A backlight level may be selected 1053 so as to minimize the error or distortion of an image with respect to the target tone curve, a hypothetical reference display or some other standard. In some embodiments, methods disclosed in U.S. patent application Ser. No. 11/460,768, entitled “Methods and Systems for Distortion-Related Source Light Management,” filed Jul. 28, 2006, which is hereby incorporated herein by reference, may be used to select backlight levels and compensation methods.

After target tone curve calculation, an image may be adjusted or compensated 1054 with the target tone curve to achieve performance goals or compensate for a reduced backlight level. This adjustment or compensation may be performed with reference to the target tone curve.

After backlight selection 1053 and compensation or adjustment 1054, the adjusted or compensated image may be displayed with the selected backlight level 1055.

Some embodiments of the present invention may be described with reference to FIG. 67. In these embodiments, an image enhancement or processing goal is established 1060. This goal may comprise power savings, a lower black level, image brightening, tone scale adjustment or other processing or enhancement goals. Based on the processing or enhancement goal, target tone curve parameters may be selected 1061. In some embodiments, parameter selection may be automated and based on the enhancement or processing goals. In some exemplary embodiments, these parameters may comprise a maximum target output, M, and a target contrast ratio, CR. In some exemplary embodiments, these parameters may comprise a maximum target output, M, a target contrast ratio, CR, a display gamma value, γ, and image code values, c.

A target tone curve (TTC) may be calculated 1062 based on the selected target tone curve parameters. In some embodiments, a set of TTCs may be calculated. In some embodiments, the set may comprise curves corresponding to varying backlight levels, but with common TTC parameters. In other embodiments, other parameters may be varied.

A backlight brightness level may be selected 1063. In some embodiments, the backlight level may be selected with reference to image characteristics. In some embodiments, the backlight level may be selected based on a performance goal. In some embodiments, the backlight level may be selected based on performance goals and image characteristics. In some embodiments, the backlight level may be selected by selecting a TTC that matches a performance goal or error criterion and using the backlight level that corresponds to that TTC.

Once a backlight level is selected 1063, a target tone curve corresponding to that level is selected by association. The image may now be adjusted, enhanced or compensated 1064 with the target tone curve. The adjusted image may then be displayed 1065 on the display using the selected backlight level.

Some embodiments of the present invention may be described with reference to FIG. 68. In these embodiments, image display performance goals are identified 1070. This may be performed through a user interface whereby a user selects performance goals directly. This may also be performed through a user query whereby a user identifies priorities from which performance goals are generated. A performance goal may also be identified automatically based on image analysis, display device characteristics, device usage history or other information.

Based on the performance goal, target tone curve parameters may be automatically selected or generated 1071. In some exemplary embodiments, these parameters may comprise a maximum target output, M, and a target contrast ratio, CR. In some exemplary embodiments, these parameters may comprise a maximum target output, M, a target contrast ratio, CR, a display gamma value, γ, and image code values, c.

One or more target tone curves may be generated 1072 from the target tone curve parameters. A target tone curve may be represented as an equation, a series of equations, a table (e.g., LUT) or some other representation.

In some embodiments, each TTC will correspond to a backlight level. A backlight level may be selected 1073 by finding the corresponding TTC that meets a criterion. In some embodiments, a backlight selection may be made by other methods. If a backlight is selected independently of the TTC, the TTC corresponding to that backlight level may also be selected.

Once a final TTC is selected 1073, it may be applied 1074 to an image to enhance, compensate or otherwise process the image for display. The processed image may then be displayed 1075.

Some embodiments of the present invention may be described with reference to FIG. 69. In these embodiments, image display performance goals are identified 1080. This may be performed through a user interface whereby a user selects performance goals directly. This may also be performed through a user query whereby a user identifies priorities from which performance goals are generated. A performance goal may also be identified automatically based on image analysis, display device characteristics, device usage history or other information. Image analysis may also be performed 1081 to identify image characteristics.

Based on the performance goal, target tone curve parameters may be automatically selected or generated 1082. A backlight level, which may be directly identified or may be implied via a maximum display output value and a contrast ratio, may also be selected. In some exemplary embodiments, these parameters may comprise a maximum target output, M, and a target contrast ratio, CR. In some exemplary embodiments, these parameters may comprise a maximum target output, M, a target contrast ratio, CR, a display gamma value, γ, and image code values, c.

A target tone curve may be generated 1083 from the target tone curve parameters. A target tone curve may be represented as an equation, a series of equations, a table (e.g., LUT) or some other representation. Once this curve is generated 1083, it may be applied 1084 to an image to enhance, compensate or otherwise process the image for display. The processed image may then be displayed 1085.

Color Enhancement and Brightness Enhancement

Some embodiments of the present invention comprise color enhancement and brightness enhancement or preservation. In these embodiments, specific color values, ranges or regions may be modified to enhance color aspects along with brightness enhancement or preservation. In some embodiments these modifications or enhancements may be performed on a low-pass (LP) version of an image. In some embodiments, specific color enhancement processes may be used.

Some embodiments of the present invention may be described with reference to FIG. 70. In these embodiments, an image 1130 may be filtered 1131 with a low-pass (LP) filter to produce an LP image 1125. This LP image 1125 may be subtracted 1134 or otherwise combined with the original image 1130 to produce a high-pass (HP) image 1135. The LP image may then be processed with a tonescale process 1133, such as a brightness preservation (BP) process or a similar process for brightening image features, compensating for a reduced backlight level or otherwise modifying the LP image 1125 as described above in relation to other embodiments. The resulting processed LP image may then be combined with the HP image 1135 to produce a tonescale enhanced image, which may then be processed with a bit-depth extension (BDE) process 1139. In the BDE process 1139, specially-designed noise patterns or dither patterns may be applied to the image to decrease susceptibility to contouring artifacts from subsequent processing that reduce image bit-depth. Some embodiments may comprise a BDE process as described in U.S. patent application Ser. No. 10/775,012, entitled "Methods and Systems for Adaptive Dither Structures," filed Feb. 9, 2004 and invented by Scott J. Daly and Xiao-Fan Feng, said application is hereby incorporated herein by reference. Some embodiments may comprise a BDE process as described in U.S. patent application Ser. No. 10/645,952, entitled "Systems and Methods for Dither Structure Creation and Application," filed Aug. 22, 2003 and invented by Xiao-Fan Feng and Scott J. Daly, said application is incorporated herein by reference. Some embodiments may comprise a BDE process as described in U.S. patent application Ser. No. 10/676,891, entitled "Systems and Methods for Multi-Dimensional Dither Structure Creation and Application," filed Sep. 30, 2003 and invented by Xiao-Fan Feng and Scott J. Daly, said application is incorporated herein by reference. The resulting BDE-enhanced image 1129 may then be displayed or further processed. The BDE-enhanced image 1129 will be less-likely to show contouring artifacts when its bit-depth is reduced as explained in the applications, which are incorporated by reference above.

Some embodiments of the present invention may be described with reference to FIG. 71. In these embodiments, an image 1130 may be low-pass (LP) filtered 1131 to create an LP version of the image. This LP version may be sent to a color enhancement module 1132 for processing. The color enhancement module 1132 may comprise color detection functions, color map refinement functions, color region processing functions and other functions. In some embodiments, color enhancement module 1132 may comprise skin-color detection functions, skin-color map refinement functions and skin-color region processing as well as non-skin-color region processing. Functions in the color enhancement module 1132 may result in modified color values for image elements, such as pixel intensity values.

After color modification, the color-modified LP image may be sent to a brightness preservation or brightness enhancement module 1133. This module 1133 is similar to many embodiments described above in which image values are adjusted or modified with a tonescale curve or similar method to improve brightness characteristics. In some embodiments, the tonescale curve may be related to a source light or backlight level. In some embodiments, the tonescale curve may compensate for a reduced backlight level. In some embodiments, the tonescale curve may brighten the image or otherwise modify the image independently of any backlight level.

The color-enhanced, brightness-enhanced image may then be combined with a high-pass (HP) version of the image. In some embodiments, the HP version of the image may be created by subtracting 1134 the LP version from the original image 1130, resulting in a HP version of the image 1135. The combination 1137 of the color-enhanced, brightness-enhanced image and the HP version of the image 1135 produces an enhanced image 1138.

Some embodiments of the present invention may comprise image-dependent backlight selection and/or a separate gain process for the HP image. These two additional elements are independent, separable elements, but will be described in relation to an embodiment comprising both elements as illustrated in FIG. 72. In this exemplary embodiment, an image 1130 may be input to a filter module 1131 where an LP image 1145 may be produced. The LP image 1145 may then be subtracted from the original image 1130 to produce an HP image 1135. The LP image 1145 may also be sent to a color enhancement module 1132. In some embodiments, the original image 1130 may also be sent to a backlight selection module 1140 for use in determining a backlight brightness level.

The color enhancement module 1132 may comprise color detection functions, color map refinement functions, color region processing functions and other functions. In some embodiments, color enhancement module 1132 may comprise skin-color detection functions, skin-color map refinement functions and skin-color region processing as well as non-skin-color region processing. Functions in the color enhancement module 1132 may result in modified color values for image elements, such as pixel intensity values.

A brightness preservation (BP) or brightness enhancement tonescale module 1141 may receive the LP image 1145 for processing with a tonescale operation. The tonescale operation may depend on backlight selection information received from the backlight selection module 1140. When brightness preservation is achieved with the tonescale operation, backlight selection information is useful in determining the tonescale curve. When only brightness enhancement is performed without backlight compensation, backlight selection information may not be needed.

The HP image 1135 may also be processed in an HP gain module 1136 using methods described above for similar embodiments. Gain processing in the HP gain module will result in a modified HP image 1147. The modified LP image 1146 resulting from tonescale processing in the tonescale module 1141 may then be combined 1142 with the modified HP image 1147 to produce an enhanced image 1143

The enhanced image 1143 may be displayed on a display using backlight modulation with a backlight 1144 that has received backlight selection data from the backlight selection module 1140. Accordingly, an image may be displayed with a reduced or otherwise modulated backlight setting, but with modified image values that compensate for the backlight modulation. Similarly, a brightness enhanced image comprising LP tonescale processing and HP gain processing may be displayed with full backlight brightness.

Some embodiments of the present invention may be described with reference to FIG. 73. In these embodiments, an original image 1130 is input to a filter module 1150, which may generate an LP image 1155. In some embodiments, the filter module may also generate a histogram 1151. The LP image 1155 may be sent to the color enhancement module 1156 as well as a subtraction process 1157, where the LP image 1155 will be subtracted from the original image 1130 to form an HP image 1158. In some embodiments, the HP image 1158 may also be subjected to a coring process 1159, wherein some high-frequency elements are removed from the HP image 1158. This coring process will result is a cored HP image 1160, which may then be processed 1161 with a gain map 1162 to achieve brightness preservation, enhancement or other processes as described above for other embodiments. The gain mapping process 1161 will result in a gain-mapped HP image 1168.

The LP image 1155, sent to the color enhancement module 1156, may be processed therein with color detection functions, color map refinement functions, color region processing functions and other functions. In some embodiments, color enhancement module 1156 may comprise skin-color detection functions, skin-color map refinement functions and skin-color region processing as well as non-skin-color region processing. Functions in the color enhancement module 1156 may result in modified color values for image elements, such as pixel intensity values, which may be recorded as a color-enhanced LP image 1169.

The color-enhanced LP image 1169 may then be processed in a BP tonescale or enhancement tonescale module 1163. A brightness preservation (BP) or brightness enhancement tonescale module 1163 may receive the color-enhanced LP image 1169 for processing with a tonescale operation. The tonescale operation may depend on backlight selection information received from the backlight selection module 1154. When brightness preservation is achieved with the tonescale operation, backlight selection information is useful in determining the tonescale curve. When only brightness enhancement is performed without backlight compensation, backlight selection information may not be needed. The tonescale operation performed within the tonescale module 1163 may be dependent on image characteristics, performance goals of the application and other parameters regardless of backlight information.

In some embodiments, the image histogram 1151 may be delayed 1152 to allow time for the color enhancement 1156 and tonescale 1163 modules to perform their functions. In these embodiments, the delayed histogram 1153 may be used to influence backlight selection 1154. In some embodiments, the histogram from a previous frame may be used to influence backlight selection 1154. In some embodiments, the histogram from two frames back from the current frame may be used to influence backlight selection 1154. Once backlight selection is performed the backlight selection data may be used by the tonescale module 1163.

Once the color-enhanced LP image 1169 is processed through the tonescale module 1163, the resulting color-enhanced, brightness-enhanced LP image 1176 may be combined 1164 with the gain-mapped HP image 1168. In some embodiments, this process 1164 may be an addition process. In some embodiments, the combined, enhanced image 1177 resulting from this combination process 1164 will be the final product for image display. This combined, enhanced image 1177 may be displayed on a display using a backlight 1166 modulated with a backlight setting received from the backlight selection module 1154.

Some color enhancement modules of the present invention may be described with reference to FIG. 74. In these embodiments, an LP image 1170 may be input to a color enhancement module 1171. Various processes may be applied to the LP image 1170 in the color enhancement module 1171. A skin-color detection process 1172 may be applied to the LP image 1170. A skin-color detection process 1172 may comprise analysis of the color of each pixel in the LP image 1170 and assignment of a skin-color likelihood value based on the pixel color. This process may result in a skin-color likelihood map. In some embodiments, a look-up table (LUT) may be used to determine the likelihood that a color is a skin color. Other methods may also be used to determine a skin-color likelihood. Some embodiments may comprise skin color detection methods described above and in other applications that are incorporated herein by reference.

The resulting skin-color likelihood map may be processed by a skin-color map refinement process 1173. The LP image 1170 may also be input to or accessed by this refinement process 1173. In some embodiments, this refinement process 1173 may comprise an image-driven, non-linear low-pass filter. In some embodiments, the refinement process 1173 may comprise an averaging process applied to the skin-color map value when the corresponding image color value is within a specific color-space-distance to a neighboring pixel's color value and when the image pixel and the neighboring pixel are within a specific spatial distance. The skin-color map modified or refined by this process may then be used to identify a skin-color region in the LP image. A region outside the skin-color region may also be identified as a non-skin-color region.

In the color enhancement module 1171, the LP image 1170 may then be differentially processed by applying a color modification process 1174 to the skin-color region only. In some embodiments, a color modification process 1174 may be applied only to the non-skin-color region. In some embodiments, a first color modification process may be applied to the skin-color region and a second color modification process may be applied to the non-skin-color region. Each of these color modification processes will result in a color-modified or enhanced LP image 1175. In some embodiments, the enhanced LP image may be further processed in a tonescale module, e.g. BP or enhancement tonescale module 1163.

Some embodiments of the present invention may be described with reference to FIG. 75. In these embodiments, an image 1130 may be low-pass (LP) filtered 1131 to create an LP version of the image. This LP version may be sent to a color enhancement module 1132 for processing. The color enhancement module 1132 may comprise color detection functions, color map refinement functions, color region processing functions and other functions. In some embodiments, color enhancement module 1132 may comprise skin-color detection functions, skin-color map refinement functions and skin-color region processing as well as non-skin-color region processing. Functions in the color enhancement module 1132 may result in modified color values for image elements, such as pixel intensity values.

After color modification, the color-modified LP image may be sent to a brightness preservation or brightness enhancement module 1133. This module 1133 is similar to many embodiments described above in which image values are adjusted or modified with a tonescale curve or similar method to improve brightness characteristics. In some embodiments, the tonescale curve may be related to a source light or backlight level. In some embodiments, the tonescale curve may compensate for a reduced backlight level. In some embodiments, the tonescale curve may brighten the image or otherwise modify the image independently of any backlight level.

The color-enhanced, brightness-enhanced image may then be combined with a high-pass (HP) version of the image. In some embodiments, the HP version of the image may be created by subtracting 1134 the LP version from the original image 1130, resulting in a HP version of the image 1135. The combination 1137 of the color-enhanced, brightness-enhanced image and the HP version of the image 1135 produces an enhanced image 1138.

In these embodiments a bit-depth extension (BDE) process 1139 may be performed on the enhanced image 1138. This BDE process 1139 may reduce the visible artifacts that occur when bit-depth is limited. Some embodiments may comprise BDE processes as described in patent applications mentioned above that are incorporated herein by reference.

Some embodiments of the present invention may be described with reference to FIG. 76. These embodiments are similar to those described with reference to FIG. 73, but comprise additional bit-depth extension processing.

In these embodiments, an original image 1130 is input to a filter module 1150, which may generate an LP image 1155. In some embodiments, the filter module may also generate a histogram 1151. The LP image 1155 may be sent to the color enhancement module 1156 as well as a subtraction process 1157, where the LP image 1155 will be subtracted from the original image 1130 to form an HP image 1158. In some embodiments, the HP image 1158 may also be subjected to a coring process 1159, wherein some high-frequency elements are removed from the HP image 1158. This coring process will result is a cored HP image 1160, which may then be processed 1161 with a gain map 1162 to achieve brightness preservation, enhancement or other processes as described above for other embodiments. The gain mapping process 1161 will result in a gain-mapped HP image 1168.

The LP image 1155, sent to the color enhancement module 1156, may be processed therein with color detection functions, color map refinement functions, color region processing functions and other functions. In some embodiments, color enhancement module 1156 may comprise skin-color detection functions, skin-color map refinement functions and skin-color region processing as well as non-skin-color region processing. Functions in the color enhancement module 1156 may result in modified color values for image elements, such as pixel intensity values, which may be recorded as a color-enhanced LP image 1169.

The color-enhanced LP image 1169 may then be processed in a BP tonescale or enhancement tonescale module 1163. A brightness preservation (BP) or brightness enhancement tonescale module 1163 may receive the color-enhanced LP image 1169 for processing with a tonescale operation. The tonescale operation may depend on backlight selection information received from the backlight selection module 1154. When brightness preservation is achieved with the tonescale operation, backlight selection information is useful in determining the tonescale curve. When only brightness enhancement is performed without backlight compensation, backlight selection information may not be needed. The tonescale operation performed within the tonescale module 1163 may be dependent on image characteristics, performance goals of the application and other parameters regardless of backlight information.

In some embodiments, the image histogram 1151 may be delayed 1152 to allow time for the color enhancement 1156 and tonescale 1163 modules to perform their functions. In these embodiments, the delayed histogram 1153 may be used to influence backlight selection 1154. In some embodiments, the histogram from a previous frame may be used to influence backlight selection 1154. In some embodiments, the histogram from two frames back from the current frame may be used to influence backlight selection 1154. Once backlight selection is performed the backlight selection data may be used by the tonescale module 1163.

Once the color-enhanced LP image 1169 is processed through the tonescale module 1163, the resulting color-enhanced, brightness-enhanced LP image 1176 may be combined 1164 with the gain-mapped HP image 1168. In some embodiments, this process 1164 may be an addition process. In some embodiments, the combined, enhanced image 1177 resulting from this combination process 1164 may be processed with a bit-depth extension (BDE) process 1165. This BDE process 1165 may reduce the visible artifacts that occur when bit-depth is limited. Some embodiments may comprise BDE processes as described in patent applications mentioned above that are incorporated herein by reference.

After BDE processing 1165, enhanced image 1169 may be displayed on a display using a backlight 1166 modulated with a backlight setting received from the backlight selection module 1154.

Some embodiments of the present invention may be described with reference to FIG. 77. In these embodiments, an image 1180 may be filtered 1181 with a low-pass (LP) filter to produce an LP image 1183. This LP image 1183 may be subtracted 1182 or otherwise combined with the original image 1180 to produce a high-pass (HP) image 1189. The LP image may then be processed with a color enhancement module 1184. In the color enhancement module 1184, various processes may be applied to the LP image. A skin-color detection process 1185 may be applied to the LP image 1183. A skin-color detection process 1185 may comprise analysis of the color of each pixel in the LP image 1183 and assignment of a skin-color likelihood value based on the pixel color. This process may result in a skin-color likelihood map. In some embodiments, a look-up table (LUT) may be used to determine the likelihood that a color is a skin color. Other methods may also be used to determine a skin-color likelihood. Some embodiments may comprise skin-color detection methods described above and in other applications that are incorporated herein by reference.

The resulting skin-color likelihood map may be processed by a skin-color map refinement process 1186. The LP image 1183 may also be input to or accessed by this refinement process 1186. In some embodiments, this refinement process 1186 may comprise an image-driven, non-linear low-pass filter. In some embodiments, the refinement process 1186 may comprise an averaging process applied to values in the skin-color map when the corresponding image color value is within a specific color-space-distance to a neighboring pixel's color value and when the image pixel and the neighboring pixel are within a specific spatial distance. The skin-color map modified or refined by this process may then be used to identify a skin-color region in the LP image. A region outside the skin-color region may also be identified as a non-skin-color region.

In the color enhancement module 1184, the LP image 1183 may then be differentially processed by applying a color modification process 1187 to the skin-color region only. In some embodiments, a color modification process 1187 may be applied only to the non-skin-color region. In some embodiments, a first color modification process may be applied to the skin-color region and a second color modification process may be applied to the non-skin-color region. Each of these color modification processes will result in a color-modified or enhanced LP image 1188.

This enhanced LP image 1188 may then be added or otherwise combined with the HP image 1189 to produce an enhanced image 1192.

Some embodiments of the present invention may be described with reference to FIG. 78. In these embodiments, an image 1180 may be filtered 1181 with a low-pass (LP) filter to produce an LP image 1183. This LP image 1183 may be subtracted 1182 or otherwise combined with the original image 1180 to produce a high-pass (HP) image 1189. The LP image may then be processed with a color enhancement module 1184. In the color enhancement module 1184, various processes may be applied to the LP image. A skin-color detection process 1185 may be applied to the LP image 1183. A skin-color detection process 1185 may comprise analysis of the color of each pixel in the LP image 1183 and assignment of a skin-color likelihood value based on the pixel color. This process may result in a skin-color likelihood map. In some embodiments, a look-up table (LUT) may be used to determine the likelihood that a color is a skin color. Other methods may also be used to determine a skin-color likelihood. Some embodiments may comprise skin-color detection methods described above and in other applications that are incorporated herein by reference.

The resulting skin-color likelihood map may be processed by a skin-color map refinement process 1186. The LP image 1183 may also be input to or accessed by this refinement process 1186. In some embodiments, this refinement process 1186 may comprise an image-driven, non-linear low-pass filter. In some embodiments, the refinement process 1186 may comprise an averaging process applied to values in the skin-color map when the corresponding image color value is within a specific color-space-distance to a neighboring pixel's color value and when the image pixel and the neighboring pixel are within a specific spatial distance. The skin-color map modified or refined by this process may then be used to identify a skin-color region in the LP image. A region outside the skin-color region may also be identified as a non-skin-color region.

In the color enhancement module 1184, the LP image 1183 may then be differentially processed by applying a color modification process 1187 to the skin-color region only. In some embodiments, a color modification process 1187 may be applied only to the non-skin-color region. In some embodiments, a first color modification process may be applied to the skin-color region and a second color modification process may be applied to the non-skin-color region. Each of these color modification processes will result in a color-modified or enhanced LP image 1188.

This enhanced LP image 1188 may then be added or otherwise combined with the HP image 1189 to produce an enhanced image, which may then be processed with a bit-depth extension (BDE) process 1191. In the BDE process 1191, specially-designed noise patterns or dither patterns may be applied to the image to decrease susceptibility to contouring artifacts from subsequent processing that reduce image bit-depth. Some embodiments may comprise BDE processes as described in patent applications mentioned above that are incorporated herein by reference. The resulting BDE-enhanced image 1193 may then be displayed or further processed. The BDE-enhanced image 1193 will be less-likely to show contouring artifacts when its bit-depth is reduced as explained in the applications, which are incorporated by reference above.

Some embodiments of the present invention comprise details of implementing high quality backlight modulation and brightness preservation under the constraints of hardware implementation. These embodiments may be described with reference to embodiments illustrated in FIGS. 73 and 76.

Some embodiments comprise elements that reside in the backlight selection 1154 and BP tonescale 1163 blocks in FIGS. 73 and 76. Some of these embodiments may reduce memory consumption and real-time computation demands.

Histogram Calculation

In these embodiments, the histogram is calculated on image code values rather than luminance values. Thus no color conversion is needed. In some embodiments, the initial algorithm may calculate the histogram on all samples of an image. In these embodiments, the histogram calculation cannot be completed until the last sample of the image is received. All samples must be obtained and the histogram must be completed before the backlight selection and compensating tone curve design can be done.

These embodiments have several complexity issues:

- Need for a frame buffer as a the first pixel cannot be compensated until the histogram is completed—RAM
- Little time is available for the histogram and backlight selection calculations as other functional elements are stalled waiting for results—Computation
- Large number of image samples which must be processed to compute a histogram on all image samples—Computation
- For 10-bit image data, a 10-bit histogram requires a relatively large memory for holding data and large number of points to be examined in the distortion optimization—RAM and Computation Some embodiments of the present invention comprise techniques for overcoming these issues. To eliminate the need for a frame buffer, the histogram of a prior frame may be used as input to the backlight selection algorithm. The histogram from frame n is used as input for frame n+1, n+2 or another subsequent frame thereby eliminating the need for a frame buffer.

To allow time for computation, the histogram may be delayed one or more additional frames so the histogram from frame n is used as input for backlight selection of frame n+2, n+3, etc. This allows the backlight selection algorithm time from the end of frame n to the start of a subsequent frame, e.g., n+2, to calculate.

In some embodiments, a temporal filter on the output of the backlight selection algorithm may be used to reduce the sensitivity to this frame delay in backlight selection relative to the input frame.

To reduce the number of samples which must be processed in computing each histogram, some embodiments may use a block rather than individual pixels. For each color plane and each block, the maximum sample is computed. The histogram may be computed on these block maximums. In some embodiments, the maximum is still computed on each color plane. Thus an image with M blocks will have 3-M inputs to the histogram.

In some embodiments, the histogram may be computed on input data quantized to a small bit range i.e. 6-bits. In these embodiments, the RAM required for holding the histogram is reduced. Also, in distortion-related embodiments, the operations needed for the distortion search are reduced as well.

A exemplary histogram calculation embodiment is described below in the form of code as Function 1.

Function 1

```
/************************************************************
*************/
//
ComputeHistogram
// Comutes histogram based on maximum on block
// block size and histogram bitdepth set in defines
// Relevant Globals
// gHistogramBlockSize
// gN_HistogramBins
// N_PIPELINE_CODEVALUES
/************************************************************
*************/
void ComputeHistogram(SHORT
*pSource[NCOLORS],IMAGE_SIZE size,UINT32 *pHistogram)
{
  SHORT cv;
  SHORT bin;
  SHORT r,c,k;
  SHORT block;
  SHORT cvMax;
  SHORT BlockRowCount;
  SHORT nHistogramBlocksWide;
  nHistogramBlocksWide=size.width/gHistogramBlockSize;
  /* Clear histogram */
  for(bin=0;bin<gN_HistogramBins;bin++)
    pHistogram[bin]=0;
  // use max over block for histogram don't mix colors
  // track max in each scan line of block and do max over scanlines
  // initialize
  BlockRowCount=0;
  for(k=0;k<NCOLORS;k++)
    for(block=0;block<nHistogramBlocksWide;block++)
      MaxBlockCodeValue[k][block]=0;
  for(r=0;r<size.height;r++)
  {
    // single scan line
    for(c=0;c<size.width;c++)
    {
      block=c/gHistogramBlockSize;
      for(k=0;k<NCOLORS;k++)
      {
        cv=pSource[k][r*size.width+c];
        if(cv>MaxBlockCodeValue[k][block])
          MaxBlockCodeValue[k][block]=cv;
      }
    }
    // Finished line of blocks?
    if(r==(gHistogramBlockSize*(BlockRowCount+1)−1))
    {
      // update histogram and advance BlockRowCount
      for(k=0;k<NCOLORS;k++)
        for(block=0;block<nHistogramBlocksWide;block++)
        {
          cvMax=MaxBlockCodeValue[k][block];
bin=(SHORT)((cvMax*(int)gN_HistogramBins+
(N_PIPELINE_CODEVALUES/2))/
((SHORT)N_PIPELINE_CODEVALUES));
          pHistogram[bin]++;
        }
      BlockRowCount=BlockRowCount+1;
      // reset maximums
```

-continued

Function 1

```
      for(k=0;k<NCOLORS;k++)
        for(block=0;block<nHistogramBlocksWide;block++)
          MaxBlockCodeValue[k][block]=0;
    }
  }
  return;
}
```

Target and Actual Display Models

In some embodiments, the distortion and compensation algorithms depend upon a power function used to describe the target and reference displays. This power function or "gamma" may be calculated off-line in integer representation. In some embodiments, this real-time calculation may utilize pre-computed integer values of the gamma power function. Sample code, listed below as Function 2, describes an exemplary embodiment.

Function 2

```
void InitPowerOfGamma(void)
{
  int i;
  //Init ROM table here
  for(i=0;i<N_PIPELINE_CODEVALUES;i++)
  {
    PowerOfGamma[i]=pow(i/
    ((double)N_PIPELINE_CODEVALUES−1),GAMMA);
IntPowerOfGamma[i]=
(UINT32)((1<<N_BITS_INT_GAMMA)*PowerOfGamma[i]+0.5);
  }
  return;
}
```

In some embodiments, both the target and actual displays may be modeled with a two parameter GOG-F model which is used in real-time to control the distortion based backlight selection process and the backlight compensation algorithm. In some embodiments, both the target (reference) display and the actual panel may be modeled as having a 2.2 gamma power rule with an additive offset. The additive offset may determine the contrast ratio of the display.

Calculation of Distortion Weights

In some embodiments, for each backlight level and input image, the distortion between the desired output image and the output at a given backlight level may be computed. The result is a weight for each histogram bin and each backlight level. By computing the distortion weights only for the needed backlight levels the size of the RAM used is kept to a minimum or a reduced level. In these embodiments, the on-line computation allows the algorithm to adapt to different choices of reference or target display. This computation involves two elements, the image histogram and a set of distortion weights. In other embodiments, the distortion weights for all possible backlight values were computed off-line and stored in ROM. To reduce the ROM requirements, the distortion weights can be calculated for each backlight level of interest for each frame. Given the desired and panel display models and a list of backlight levels, the distortion weights for these backlight levels may be computed for each frame. Sample code for an exemplary embodiment is shown below as Function 3.

Function 3

```
/*************************************************************
// void ComputeBackLightDistortionWeight
// computes distoriton needs large bitdepth
// comutes distortion weights for a list of selected backlight levels and
panel parameters
// Relevant Globals
// MAX_BACKLIGHT_SEARCH
// N_BITS_INT_GAMMA
// N_PIPELINE_CODEVALUES
// IntPowerOfGamma
// gN_HistogramBins
*************************************************************
************/
void ComputeBackLightDistortionWeight(SHORT nBackLightsSearched,
                    SHORT BlackWeight,
                    SHORT WhiteWeight,
                    SHORT PanelCR,
                    SHORT TargetCR,
                    SHORT BackLightLevelReference,
                    SHORT
BackLightLevelsSearched[MAX_BACKLIGHT_SEARCH])
{
  SHORT b;
  SHORT bin;
  SHORT cvL,cvH;
  _int64 X,Y,D,Dmax;
  Dmax=(1<<30);
  Dmax=Dmax*Dmax;
  for(b=0;b<nBackLightsSearched;b++)
  {
    SHORT r,q;
    r=N_PIPELINE_CODEVALUES/gN_HistogramBins;
    // find low and high code values for each backlight searched
    // PanelOutput=BackLightSearched*((1-PanelFlare)*y^Gamma+
    PanelFlare)
    // TargetOutput=BackLightLevelReference*((1-
    TargetFlare)*x^Gamma+TargetFlare)
    // for cvL, find x such that minimum paneloutput is achieved on
    targetoutput
    // TargetOutput(cvL)=min(PanelOutput)=
    BackLightSearched*PanelFlare
    // BackLightLevelReference*((1-
TargetFlare)*cvL^Gamma+TargetFlare)=BackLightSearched/PanelCR
    // BackLightLevelReference/TargetCR*((TargetCR-
1)*cvL^Gamma+1)=BackLightSearched/PanelCR
    // PanelCR*BackLightLevelReference*((TargetCR-
1)*cvL^Gamma+1)=TargetCR*BackLightSearched
    // PanelCR*BackLightLevelReference*((TargetCR-
1)*IntPowerOfGamma[cvL]+(1<<N_BITS_INT_GAMMA))=
TargetCR*BackLightSearched*(1<<N_BITS_INT_GAMMA))
    X=TargetCR;
    X=X*BackLightLevelsSearched[b];
    X=X*(1<<N_BITS_INT_GAMMA);
    for(cvL=0;cvL<N_PIPELINE_CODEVALUES;cvL++)
    {
      Y=IntPowerOfGamma[cvL];
      Y=Y*(TargetCR-1);
      Y=Y+(1<<N_BITS_INT_GAMMA);
      Y=Y*BackLightLevelReference;
      Y=Y*PanelCR;
      if(X<=Y)
        break;
    }
    // for cvH, find x such that maximum paneloutput is achieved on
    targetoutput
    // TargetOutput(cvH)=max(PanelOutput)=BackLightSearched*1
    // BackLightLevelReference*((1-
TargetFlare)*cvH^Gamma+TargetFlare)=BackLightSearched
    // BackLightLevelReference/TargetCR*((TargetCR-
1)*cvH^Gamma+1)=BackLightSearched
    // BackLightLevelReference((TargetCR-
1)*cvH^Gamma+1)=TargetCR*BackLightSearched
    // BackLightLevelReference((TargetCR-
1)*IntPowerOfGamma[cvH]+(1<<N_BITS_INT_GAMMA))=
TargetCR*BackLightSearched*(1<<N_BITS_INT_GAMMA)
    X=TargetCR;
    X=X*BackLightLevelsSearched[b];
    X=X*(1<<N_BITS_INT_GAMMA);
```

-continued

Function 3

```
    for(cvH=(N_PIPELINE_CODEVALUES-1);cvH>=0;cvH--)
    {
      Y=IntPowerOfGamma[cvH];
      Y=Y*(TargetCR-1);
      Y=Y+(1<<N_BITS_INT_GAMMA);
      Y=Y*BackLightLevelReference;
      if(X>=Y)
        break;
    }
    // build distortion weights
    for(bin=0;bin<gN_HistogramBins;bin++)
    {
      SHORT k;
      D=0;
    for(q=0;q<r;q++)
    {
      k=r*bin+q;
      if(k<=cvL)
        D+=BlackWeight*(cvL - k)*(cvL - k);
      else if(k>=cvH)
        D+=WhiteWeight*(k-cvH)*(k-cvH);
    }
    if(D>Dmax)
      D=Dmax;
    gBackLightDistortionWeights[b][bin]=(UINT32)D;
      }
  }
  return;
}
```

Sub-Sampled Search for Backlight

In some embodiments, the backlight selection algorithm may comprise a process that minimizes the distortion between the target display output and the panel output at each backlight level. To reduce both the number of backlight levels which must be evaluated and the number of distortion weights which must be computed and stored, a subset of backlight levels may be used in the search.

In some embodiments, two exemplary methods of sub-sampling the search may be used. In the first method, the possible range of backlight levels is coarsely quantized, e.g., to 4 bits. This subset of quantized levels is searched for the minimum distortion. In some embodiments, the absolute minimum and maximum values may also be used for completeness. In a second method, a range of values around the backlight level found for the last frame is used. For instance +-4, +-2, +-1 and +0 from the backlight level of the last frame are searched together with the absolute minimum and maximum levels. In this latter method, limitations in the search range impose some limitation on the variation in selected backlight level. In some embodiments, scene cut detection is used to control the subsampling. Within a scene, the BL search centers a small search window around the backlight of the last frame. At a scene cut boundary, the search allocates a small number of points through out the range of possible BL values. Subsequent frames in the same scene use the prior method of centering the search around the BL of the previous frame unless another scene cut is detected.

Calculation of a Single BP Compensation Curve

In some embodiments, several different backlight levels may be used during operation. In other embodiments, compensating curves for an exhaustive set of backlight levels was computed off-line then stored in ROM for image compensation in real-time. This memory requirement may be reduced by noting that in each frame only a single compensating curve is needed. Thus, the compensating tone curve is computed and saved in RAM each frame. In some embodiments, the design of the compensating curve is as used in the offline design. Some embodiments may comprise a curve with linear boost up to a Maximum Fidelity Point (MFP) followed by a smooth roll-off as described above.

Temporal Filter

One concern in a system with backlight modulation is flicker. This may be reduced through the use of image processing compensation techniques. However, there are a few limitations to compensation which may result in artifacts if the backlight variation is rapid. In some situations, the black and white points track the backlight and cannot be compensated in all cases. Also, in some embodiments, the backlight selection may be based on data from a delayed frame and thus may differ from the actual frame data. To regulate black/white level flicker and allow the histogram to be delayed in the backlight computation, a temporal filter may be used to smooth the actual backlight value sent to the backlight control unit and the corresponding compensation.

Incorporating Brightness Changes

For various reasons, a user may wish to change the brightness of a display. An issue is how to do this within the backlight modulation environment. Accordingly, some embodiments may provide for manipulation of the brightness of the reference display leaving the backlight modulation and brightness compensation components unchanged. The code below, described as Function 4, illustrates an exemplary embodiment where the reference backlight index is either set to the maximum or set to a value dependent upon the average picture level (APL) if the APL is used to vary the maximum display brightness.

Function 4

```
/*************************************************************
  if(gStoredMode)
  {
    BackLightIndexReference=N_BACKLIGHT_VALUES-1;
  }
  else
  {
    APL=ComputeAPL(pHistogram);
    // temporal filter APL
    if(firstFrame)
    {
      for(i=(APL_FILTER_LENGTH-1);i>=0;i--)
      {
        APL_History[i]=APL;
      }
    }
    for(i=(APL_FILTER_LENGTH-1);i>=1;i--)
    {
      APL_History[i]=APL_History[i-1];
    }
    APL_History[0]=APL;
    APL=0;
    for(i=0;i<APL_FILTER_LENGTH;i++)
      APL=APL+APL_History[i]*IntAplFilterTaps[i];
    APL=(APL+(1<<(APL_FILTER_SHIFT-
    1)))>>APL_FILTER_SHIFT;
    BackLightIndexReference=APL2BackLightIndex[APL];
  }
```

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for adjusting image characteristics, said method comprising:

a) creating an image histogram for an image, said histogram comprising a plurality of bins;

b) selecting a subset of backlight illumination levels from a set of possible backlight illumination levels, said selecting being dependent on characteristics of said image;

c) calculating a display reference model using a first pre-computed integer representation of a gamma power function;

d) calculating a display target model using a second pre-computed integer representation of a gamma power function;

e) determining a distortion weight for each histogram bin at each selected backlight illumination level in said subset using said display reference model and said display target model;

f) determining backlight-specific frame distortion values by multiplying said distortion weights by their corresponding histogram bin counts for each of said selected backlight illumination levels; and g) illuminating a backlight at a selected backlight illumination level from said subset based on said backlight-specific frame distortion values.

2. A method as described in claim 1 wherein said image is divided into blocks and said image histogram registers only a maximum image code value for each block.

3. A method as described in claim 1 wherein said image is divided into color channel images, each color channel image is divided into blocks and said image histogram registers only a maximum image code value for each block in each color channel.

4. A method as described in claim 1 wherein said subset of backlight illumination levels is determined by quantizing said set of possible backlight illumination levels.

5. A method as described in claim 1 wherein said subset of backlight illumination levels is determined by selecting a range of backlight illumination levels in relation to a backlight illumination level selected for a previously-processed frame.

6. A method as described in claim 1 wherein said selecting a backlight illumination level comprises selecting the backlight illumination level with a backlight-specific frame distortion value showing the least distortion.

7. A method as described in claim 1 wherein said distortion weight is proportional to the difference between an image code value processed with said display reference model and said code value processed with said display target model.

8. A method as described in claim 1 further comprising temporally filtering a selection determined by said selecting a backlight illumination level to avoid extreme backlight illumination level variations.

9. A method for adjusting image characteristics, said method comprising:

a) determining, in a first color channel of an image, a maximum code value for each of a plurality of blocks in a first color channel of an image;

b) determining, in a second color channel of said image, a maximum code value for each of a plurality of blocks in a second color channel of an image;

c) creating a histogram of said maximum code values from said first color channel and said second color channel;

d) selecting a subset of backlight illumination levels from a set of possible backlight illumination levels, said selecting being dependent on characteristics of said image;

e) calculating a display reference model using a first pre-computed integer representation of a gamma power function;

f) calculating a display target model using a second pre-computed integer representation of a gamma power function;

g) determining a distortion weight for each histogram bin at each selected backlight illumination level in said subset using said display reference model and said display target model;

h) determining backlight-specific frame distortion values by multiplying said distortion weights by their corresponding histogram bin counts for each of said selected backlight illumination levels; and i) illuminating a backlight at a selected backlight illumination level from said subset based on said backlight-specific frame distortion values.

10. A method as described in claim 9 wherein said subset of backlight illumination levels is determined by quantizing said set of possible backlight illumination levels.

11. A method as described in claim 9 wherein said subset of backlight illumination levels is determined by selecting a range of backlight illumination levels in relation to a backlight illumination level selected for a previously-processed frame.

12. A method as described in claim 9 wherein said selecting a backlight illumination level comprises selecting the backlight illumination level with a backlight-specific frame distortion value showing the least distortion.

13. A method as described in claim 9 wherein said distortion weight is related to the difference between an image code value processed with said display reference model and said code value processed with said display target model.

14. A method as described in claim 9 further comprising temporally filtering a selection determined by said selecting a backlight illumination level to avoid extreme backlight illumination level variations.

15. A method as described in claim 9 further comprising calculating a tonescale correction curve for said image based on said selected backlight illumination level.

16. A method for adjusting image characteristics, said method comprising:

a) determining, in a first color channel of an image, a maximum code value for each of a plurality of blocks in a first color channel of an image;

b) determining, in a second color channel of said image, a maximum code value for each of a plurality of blocks in a second color channel of an image;

c) creating a histogram of said maximum code values from said first color channel and said second color channel;

d) selecting a subset of backlight illumination levels from a set of possible backlight illumination levels, said selecting being dependent on characteristics of said image, wherein said subset of backlight illumination levels is selected with a limited search around a previous frame backlight illumination level when a scene cut is not detected between said previous frame and said image, and said subset of backlight illumination levels is determined with reference to the entire range of backlight illumination levels when a scene cut is detected between said previous frame and said image;

e) calculating a display reference model using a first pre-computed integer representation of a gamma power function;

f) calculating a display target model using a second pre-computed integer representation of a gamma power function; and g) illuminating a backlight at a selected backlight illumination level from said subset based on backlight-specific frame distortion values.

* * * * *